US012681970B2

(12) United States Patent
Hudetz et al.

(10) Patent No.: US 12,681,970 B2
(45) Date of Patent: Jul. 14, 2026

(54) SEMANTIC SEARCH AND SUMMARIZATION FOR ELECTRONIC DOCUMENTS

(71) Applicant: DocuSign, Inc., San Francisco, CA (US)

(72) Inventors: Casey Hudetz, San Francisco, CA (US); Keenan Wells, San Francisco, CA (US); Yan He, San Francisco, CA (US); Alexey Zakhvatov, San Francisco, CA (US); Yan Pui Lam, San Francisco, CA (US); Soumya Srivastava, San Francisco, CA (US); Mario M. Grebelski, San Francisco, CA (US); Souleiman Hasan, San Francisco, CA (US); Abhinav U. Sharma, San Francisco, CA (US); Navin Albert, San Francisco, CA (US)

(73) Assignee: Docusign, Inc., San Francisco, CA (US)

( * ) Notice: Subject to any disclaimer, the term of this patent is extended or adjusted under 35 U.S.C. 154(b) by 128 days.

(21) Appl. No.: 18/204,419

(22) Filed: Jun. 1, 2023

(65) Prior Publication Data

US 2024/0370479 A1    Nov. 7, 2024

Related U.S. Application Data

(60) Provisional application No. 63/463,647, filed on May 3, 2023.

(51) Int. Cl.
*G06F 16/334* (2025.01)
*G06F 16/31* (2019.01)
(Continued)

(52) U.S. Cl.
CPC ........ *G06F 16/3347* (2019.01); *G06F 16/316* (2019.01); *G06F 40/30* (2020.01); *G06V 30/416* (2022.01)

(58) Field of Classification Search
CPC .... G06F 16/3347; G06F 16/316; G06F 40/30; G06V 30/416
See application file for complete search history.

(56) References Cited

U.S. PATENT DOCUMENTS

| | | | |
|---|---|---|---|
| 11,294,974 B1 | 4/2022 | Shukla | |
| 11,567,975 B1 | 1/2023 | Day, Jr. | |

(Continued)

OTHER PUBLICATIONS

International Search Report and Written Opinion for International Application No. PCT/US2024/024882, dated Jun. 28, 2024, 16 pages.

(Continued)

*Primary Examiner* — Stella L. Woo
(74) *Attorney, Agent, or Firm* — KDW FIRM PLLC

(57) ABSTRACT

Techniques for an artificial intelligence (AI) platform to search a document collection are described. Embodiments may use AI and machine learning techniques within a framework of an electronic document management system to perform semantic searching of an electronic document or a collection of electronic documents for certain types of information. The AI platform may summarize the information in a natural language representation of a human language. Other embodiments are described and claimed.

20 Claims, 32 Drawing Sheets

```
┌──────────────────────────────────────────────────┐
│ RECEIVE A SEARCH QUERY FOR INFORMATION WITHIN AN  │
│ ELECTRONIC DOCUMENT IN A NATURAL LANGUAGE         │
│ REPRESENTATION 1302                               │
└──────────────────────────────────────────────────┘
                        │
                        ▼
┌──────────────────────────────────────────────────┐
│ GENERATE A CONTEXTUALIZED EMBEDDING FOR THE       │
│ SEARCH QUERY TO FORM A SEARCH VECTOR 1304         │
└──────────────────────────────────────────────────┘
                        │
                        ▼
┌──────────────────────────────────────────────────┐
│ RETRIEVE A SET OF CANDIDATE DOCUMENT VECTORS      │
│ THAT ARE SEMANTICALLY SIMILAR TO THE SEARCH       │
│ VECTOR FROM A DOCUMENT INDEX OF CONTEXTUALIZED    │
│ EMBEDDINGS FOR THE ELECTRONIC DOCUMENT 1306       │
└──────────────────────────────────────────────────┘
                        │
                        ▼
┌──────────────────────────────────────────────────┐
│ SEND A REQUEST TO A GENERATIVE ARTIFICIAL         │
│ INTELLIGENCE (AI) MODEL FOR AN ABSTRACTIVE        │
│ SUMMARY OF DOCUMENT CONTENT FOR A SUBSET OF       │
│ CANDIDATE DOCUMENT VECTORS, THE ABSTRACTIVE       │
│ SUMMARY TO COMPRISE A NATURAL LANGUAGE            │
│ REPRESENTATION 1308                               │
└──────────────────────────────────────────────────┘
                        │
                        ▼
┌──────────────────────────────────────────────────┐
│ RECEIVE A RESPONSE WITH THE ABSTRACTIVE SUMMARY   │
│ FROM THE GENERATIVE AI MODEL 1310                 │
└──────────────────────────────────────────────────┘
```

(51) Int. Cl.
    *G06F 40/30*        (2020.01)
    *G06V 30/416*       (2022.01)

(56)                References Cited

U.S. PATENT DOCUMENTS

| 11,861,143 | B1 |  | 1/2024 | Vandivere |  |
| 11,875,240 | B1 |  | 1/2024 | Bosnjakovic |  |
| 11,947,902 | B1 |  | 4/2024 | Grimshaw |  |
| 11,954,102 | B1 |  | 4/2024 | Palaniappan |  |
| 11,962,546 | B1 |  | 4/2024 | Hattangady |  |
| 2018/0329990 | A1 |  | 11/2018 | Severn |  |
| 2019/0163817 | A1 |  | 5/2019 | Milenova |  |
| 2019/0303835 | A1 |  | 10/2019 | Saha |  |
| 2019/0311021 | A1 | * | 10/2019 | Hayslett | H04L 9/3247 |
| 2020/0019769 | A1 |  | 1/2020 | Leibovitz |  |
| 2020/0133967 | A1 |  | 4/2020 | Shukla |  |
| 2020/0184012 | A1 | * | 6/2020 | Stoyanovsky | G06F 40/56 |
| 2020/0320249 | A1 | * | 10/2020 | Hwang | G06N 3/08 |
| 2020/0387531 | A1 | * | 12/2020 | Agnihotram | G06F 40/30 |
| 2020/0410157 | A1 |  | 12/2020 | Van De Kerkhof |  |
| 2021/0182996 | A1 |  | 6/2021 | Cella |  |
| 2021/0294829 | A1 |  | 9/2021 | Bender |  |
| 2021/0382881 | A1 |  | 12/2021 | Ishikawa et al. |  |
| 2022/0215186 | A1 |  | 7/2022 | Unni |  |
| 2022/0237230 | A1 | * | 7/2022 | Zovic | G06F 16/901 |
| 2022/0237373 | A1 |  | 7/2022 | Singh Bawa |  |
| 2023/0027310 | A1 |  | 1/2023 | Muralidharan |  |
| 2023/0252224 | A1 |  | 8/2023 | Tran |  |
| 2023/0308474 | A1 |  | 9/2023 | Thompson |  |
| 2023/0326222 | A1 |  | 10/2023 | Hron, II |  |
| 2023/0367969 | A1 |  | 11/2023 | Chaturvedi |  |
| 2024/0020538 | A1 |  | 1/2024 | Socher |  |
| 2024/0028631 | A1 |  | 1/2024 | Gong |  |
| 2024/0086433 | A1 |  | 3/2024 | Carlson |  |
| 2024/0104131 | A1 | * | 3/2024 | Tambi | G06F 40/289 |
| 2024/0126981 | A1 |  | 4/2024 | Shahinian |  |
| 2024/0169088 | A1 |  | 5/2024 | Neelappa |  |
| 2024/0169331 | A1 |  | 5/2024 | Kolchin |  |
| 2024/0176321 | A1 |  | 5/2024 | Shapiro |  |
| 2024/0289356 | A1 |  | 8/2024 | Fox |  |
| 2024/0289366 | A1 | * | 8/2024 | Hranj | G06F 16/345 |
| 2024/0303516 | A1 |  | 9/2024 | Bergonzo |  |
| 2024/0346086 | A1 |  | 10/2024 | Jha |  |
| 2024/0362286 | A1 |  | 10/2024 | He |  |
| 2024/0411527 | A1 |  | 12/2024 | Groenewegen |  |

OTHER PUBLICATIONS

International Search Report for International Application No. PCT/US2024/039985, filing date Jul. 29, 2024, 15 pages.

* cited by examiner

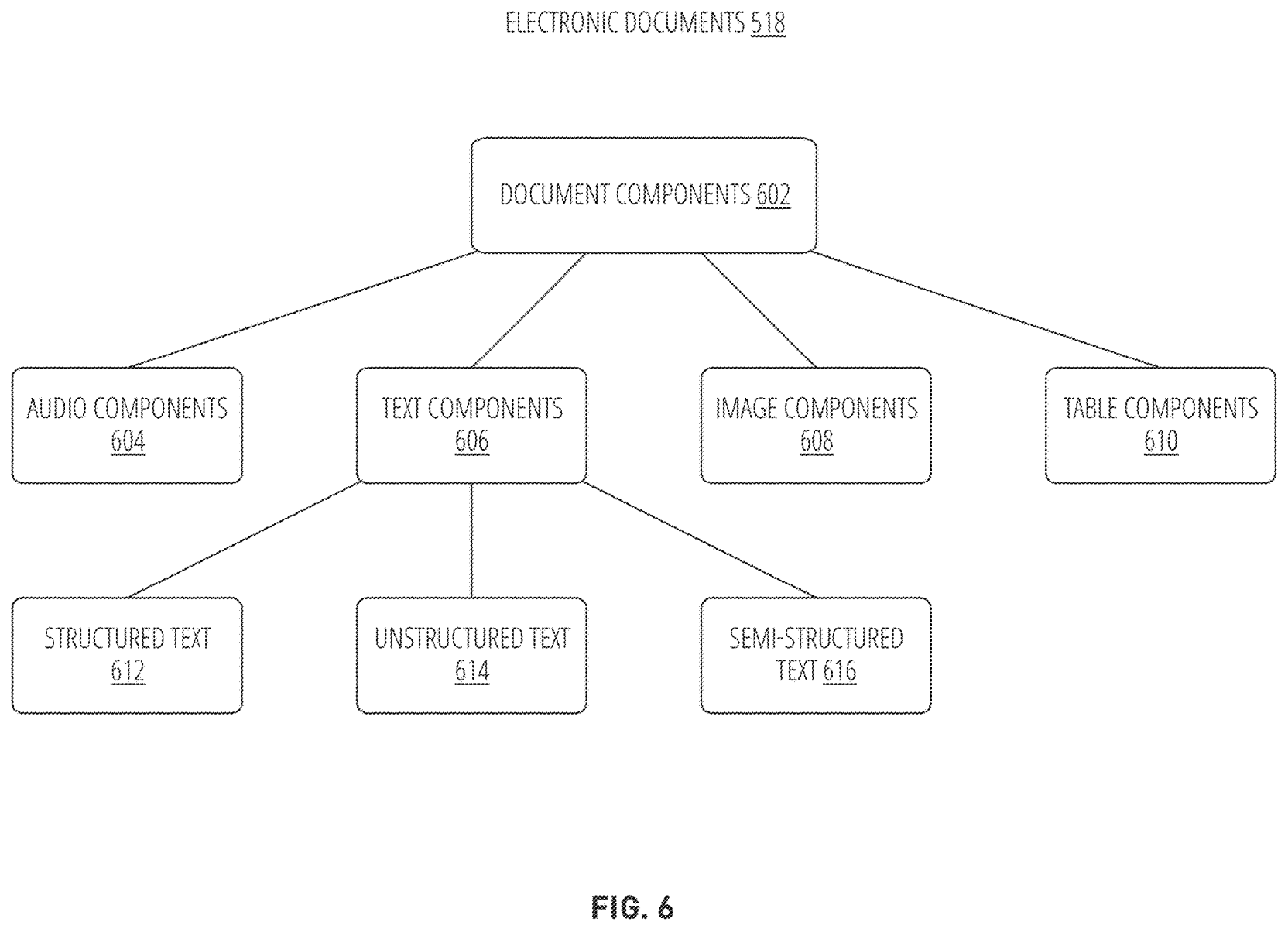

ELECTRONIC DOCUMENTS 518

DOCUMENT COMPONENTS 602

AUDIO COMPONENTS 604

TEXT COMPONENTS 606

IMAGE COMPONENTS 608

TABLE COMPONENTS 610

STRUCTURED TEXT 612

UNSTRUCTURED TEXT 614

SEMI-STRUCTURED TEXT 616

FIG. 6

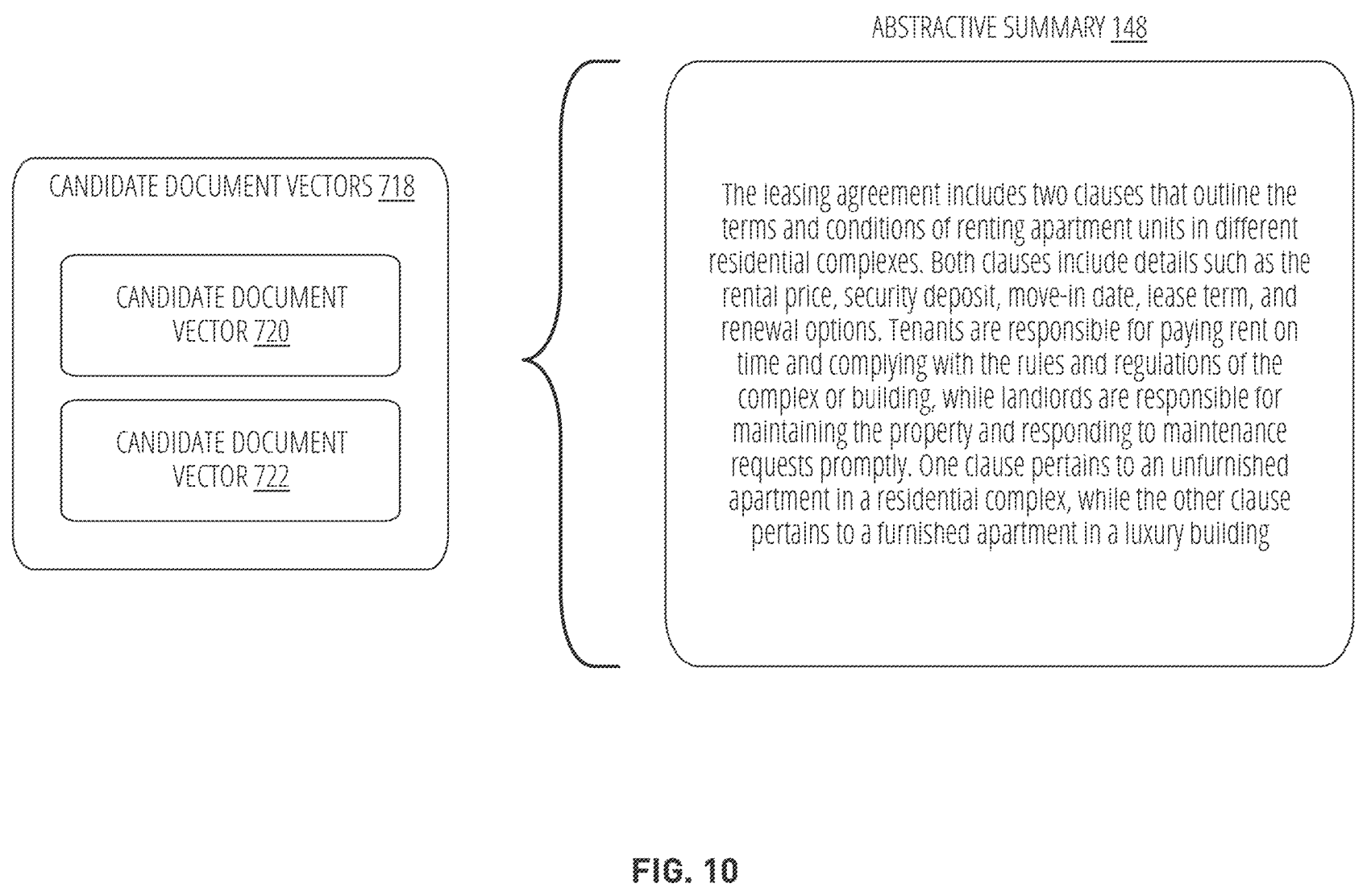

ABSTRACTIVE SUMMARY 148

The leasing agreement includes two clauses that outline the terms and conditions of renting apartment units in different residential complexes. Both clauses include details such as the rental price, security deposit, move-in date, lease term, and renewal options. Tenants are responsible for paying rent on time and complying with the rules and regulations of the complex or building, while landlords are responsible for maintaining the property and responding to maintenance requests promptly. One clause pertains to an unfurnished apartment in a residential complex, while the other clause pertains to a furnished apartment in a luxury building

CANDIDATE DOCUMENT VECTORS 718

CANDIDATE DOCUMENT VECTOR 720

CANDIDATE DOCUMENT VECTOR 722

FIG. 10

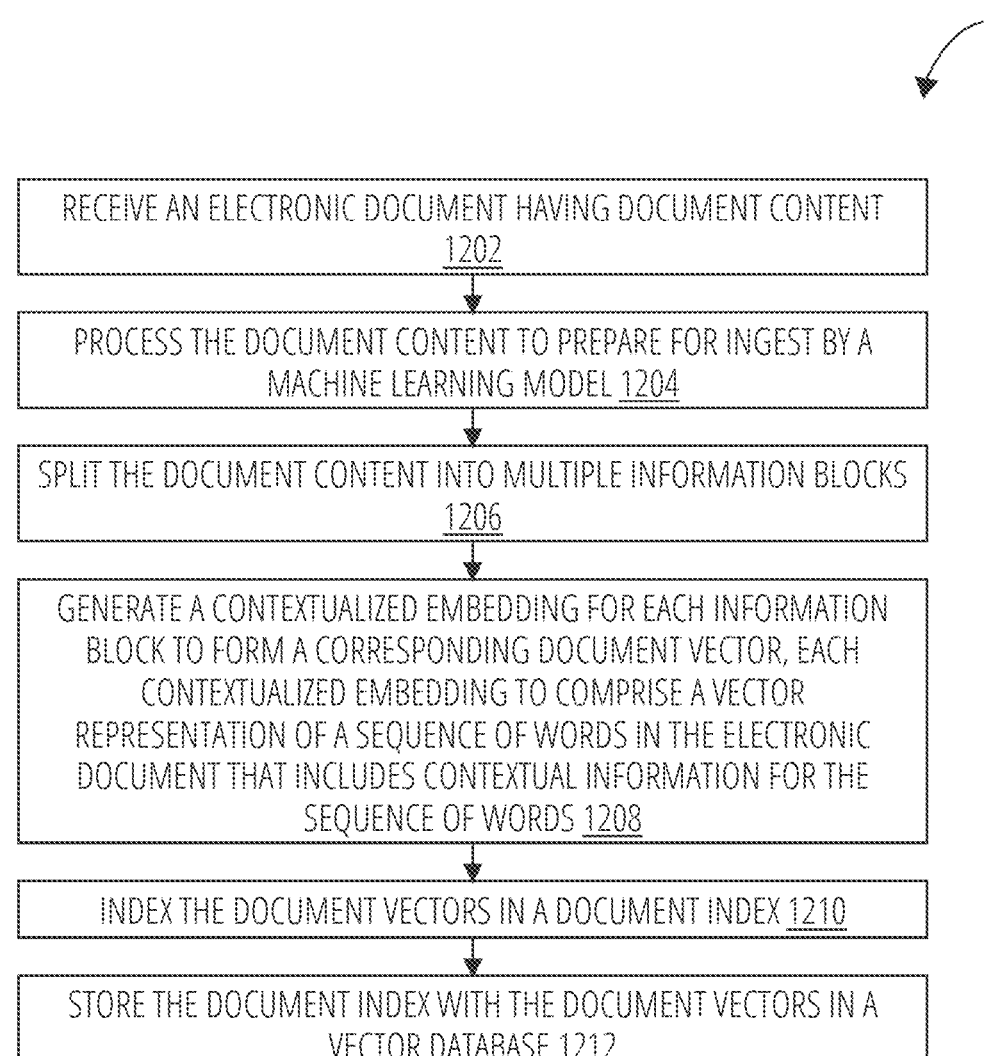

1200

RECEIVE AN ELECTRONIC DOCUMENT HAVING DOCUMENT CONTENT
1202

PROCESS THE DOCUMENT CONTENT TO PREPARE FOR INGEST BY A
MACHINE LEARNING MODEL 1204

SPLIT THE DOCUMENT CONTENT INTO MULTIPLE INFORMATION BLOCKS
1206

GENERATE A CONTEXTUALIZED EMBEDDING FOR EACH INFORMATION
BLOCK TO FORM A CORRESPONDING DOCUMENT VECTOR, EACH
CONTEXTUALIZED EMBEDDING TO COMPRISE A VECTOR
REPRESENTATION OF A SEQUENCE OF WORDS IN THE ELECTRONIC
DOCUMENT THAT INCLUDES CONTEXTUAL INFORMATION FOR THE
SEQUENCE OF WORDS 1208

INDEX THE DOCUMENT VECTORS IN A DOCUMENT INDEX 1210

STORE THE DOCUMENT INDEX WITH THE DOCUMENT VECTORS IN A
VECTOR DATABASE 1212

FIG. 12

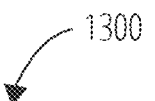

RECEIVE A SEARCH QUERY FOR INFORMATION WITHIN AN ELECTRONIC DOCUMENT IN A NATURAL LANGUAGE REPRESENTATION 1302

GENERATE A CONTEXTUALIZED EMBEDDING FOR THE SEARCH QUERY TO FORM A SEARCH VECTOR 1304

RETRIEVE A SET OF CANDIDATE DOCUMENT VECTORS THAT ARE SEMANTICALLY SIMILAR TO THE SEARCH VECTOR FROM A DOCUMENT INDEX OF CONTEXTUALIZED EMBEDDINGS FOR THE ELECTRONIC DOCUMENT 1306

SEND A REQUEST TO A GENERATIVE ARTIFICIAL INTELLIGENCE (AI) MODEL FOR AN ABSTRACTIVE SUMMARY OF DOCUMENT CONTENT FOR A SUBSET OF CANDIDATE DOCUMENT VECTORS, THE ABSTRACTIVE SUMMARY TO COMPRISE A NATURAL LANGUAGE REPRESENTATION 1308

RECEIVE A RESPONSE WITH THE ABSTRACTIVE SUMMARY FROM THE GENERATIVE AI MODEL 1310

Figure 21:
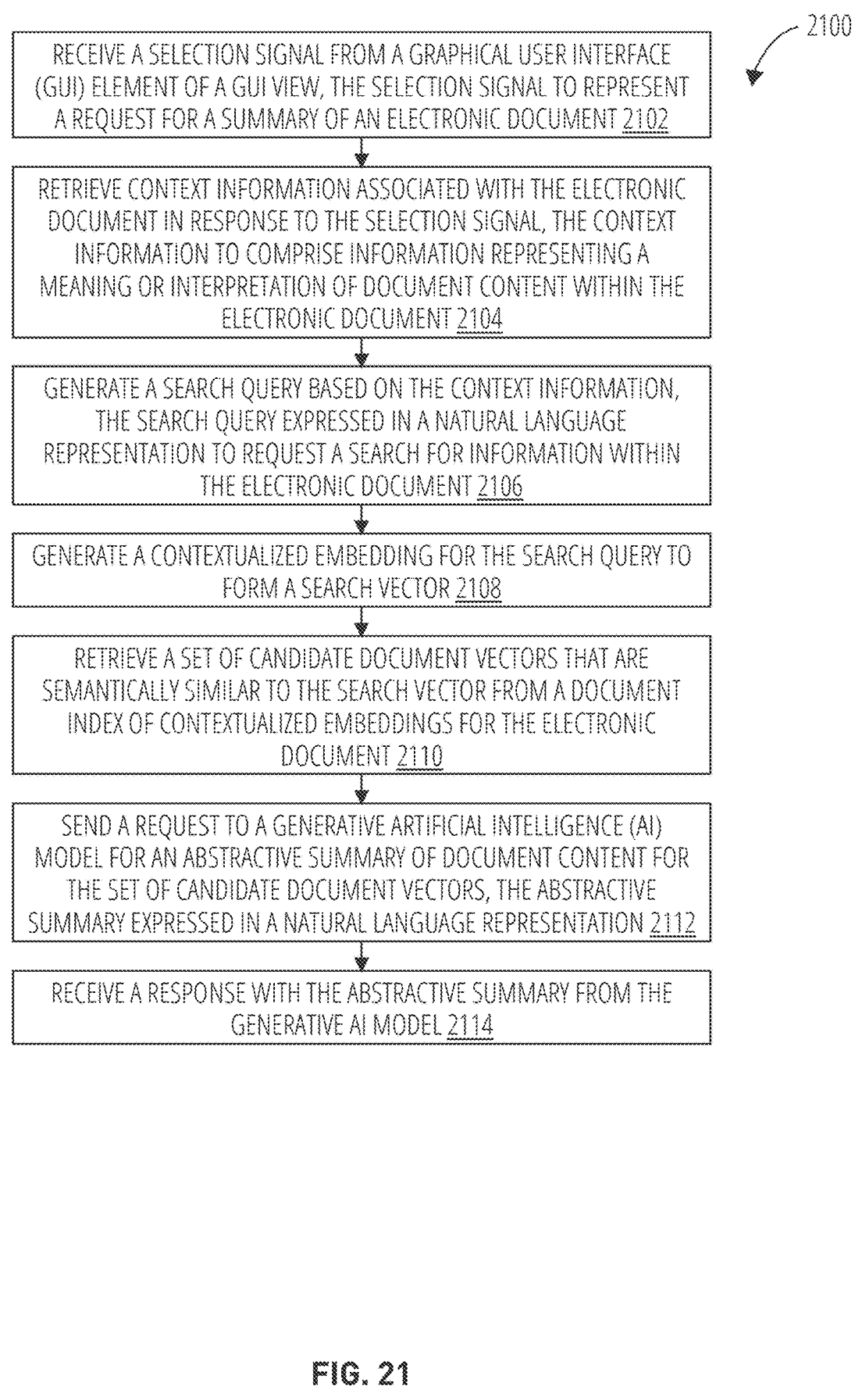

RECEIVE A SELECTION SIGNAL FROM A GRAPHICAL USER INTERFACE (GUI) ELEMENT OF A GUI VIEW, THE SELECTION SIGNAL TO REPRESENT A REQUEST FOR A SUMMARY OF AN ELECTRONIC DOCUMENT 2102

RETRIEVE CONTEXT INFORMATION ASSOCIATED WITH THE ELECTRONIC DOCUMENT IN RESPONSE TO THE SELECTION SIGNAL, THE CONTEXT INFORMATION TO COMPRISE INFORMATION REPRESENTING A MEANING OR INTERPRETATION OF DOCUMENT CONTENT WITHIN THE ELECTRONIC DOCUMENT 2104

GENERATE A SEARCH QUERY BASED ON THE CONTEXT INFORMATION, THE SEARCH QUERY EXPRESSED IN A NATURAL LANGUAGE REPRESENTATION TO REQUEST A SEARCH FOR INFORMATION WITHIN THE ELECTRONIC DOCUMENT 2106

GENERATE A CONTEXTUALIZED EMBEDDING FOR THE SEARCH QUERY TO FORM A SEARCH VECTOR 2108

RETRIEVE A SET OF CANDIDATE DOCUMENT VECTORS THAT ARE SEMANTICALLY SIMILAR TO THE SEARCH VECTOR FROM A DOCUMENT INDEX OF CONTEXTUALIZED EMBEDDINGS FOR THE ELECTRONIC DOCUMENT 2110

SEND A REQUEST TO A GENERATIVE ARTIFICIAL INTELLIGENCE (AI) MODEL FOR AN ABSTRACTIVE SUMMARY OF DOCUMENT CONTENT FOR THE SET OF CANDIDATE DOCUMENT VECTORS, THE ABSTRACTIVE SUMMARY EXPRESSED IN A NATURAL LANGUAGE REPRESENTATION 2112

RECEIVE A RESPONSE WITH THE ABSTRACTIVE SUMMARY FROM THE GENERATIVE AI MODEL 2114

Figure 22:
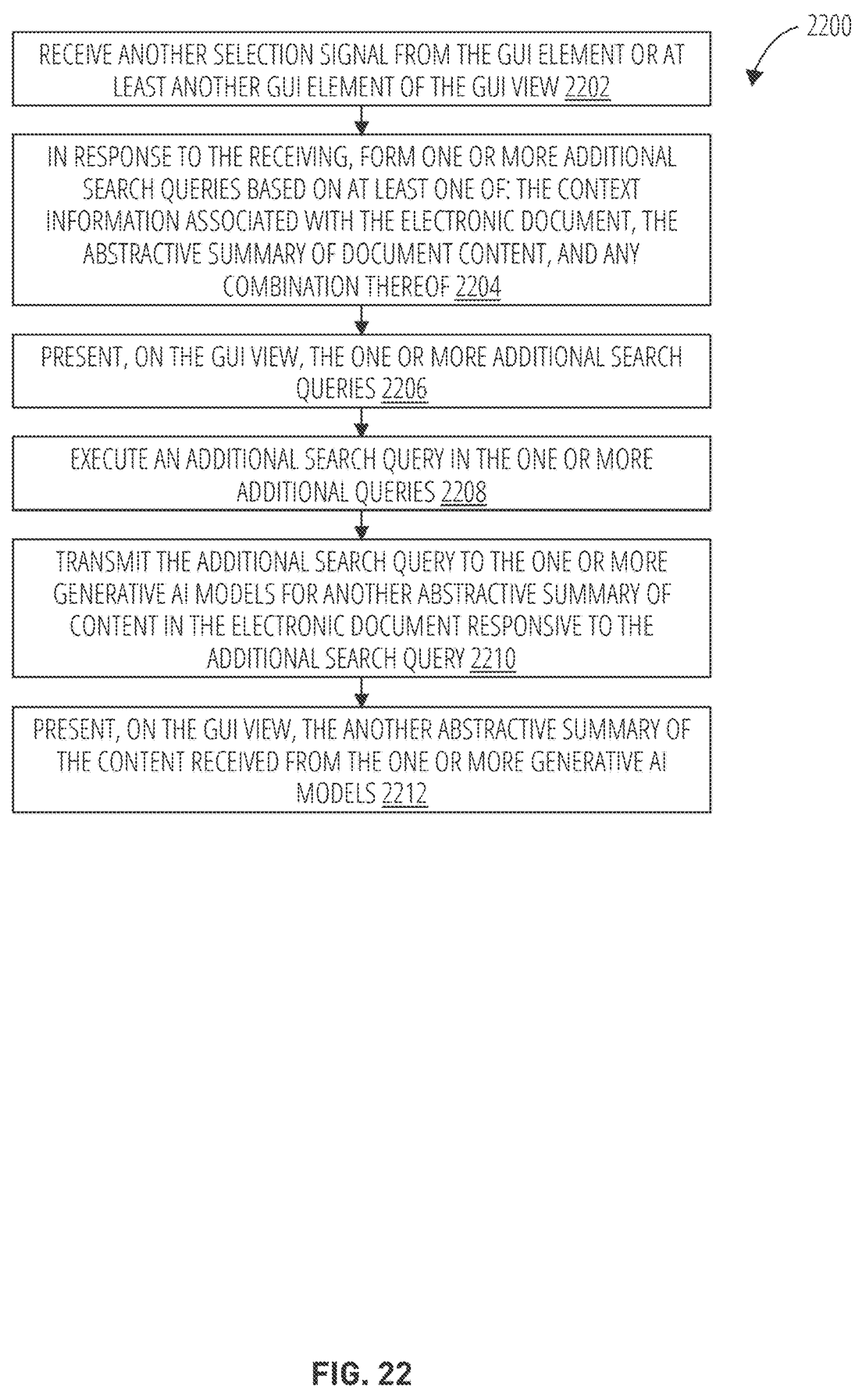

RECEIVE ANOTHER SELECTION SIGNAL FROM THE GUI ELEMENT OR AT LEAST ANOTHER GUI ELEMENT OF THE GUI VIEW 2202

IN RESPONSE TO THE RECEIVING, FORM ONE OR MORE ADDITIONAL SEARCH QUERIES BASED ON AT LEAST ONE OF: THE CONTEXT INFORMATION ASSOCIATED WITH THE ELECTRONIC DOCUMENT, THE ABSTRACTIVE SUMMARY OF DOCUMENT CONTENT, AND ANY COMBINATION THEREOF 2204

PRESENT, ON THE GUI VIEW, THE ONE OR MORE ADDITIONAL SEARCH QUERIES 2206

EXECUTE AN ADDITIONAL SEARCH QUERY IN THE ONE OR MORE ADDITIONAL QUERIES 2208

TRANSMIT THE ADDITIONAL SEARCH QUERY TO THE ONE OR MORE GENERATIVE AI MODELS FOR ANOTHER ABSTRACTIVE SUMMARY OF CONTENT IN THE ELECTRONIC DOCUMENT RESPONSIVE TO THE ADDITIONAL SEARCH QUERY 2210

PRESENT, ON THE GUI VIEW, THE ANOTHER ABSTRACTIVE SUMMARY OF THE CONTENT RECEIVED FROM THE ONE OR MORE GENERATIVE AI MODELS 2212

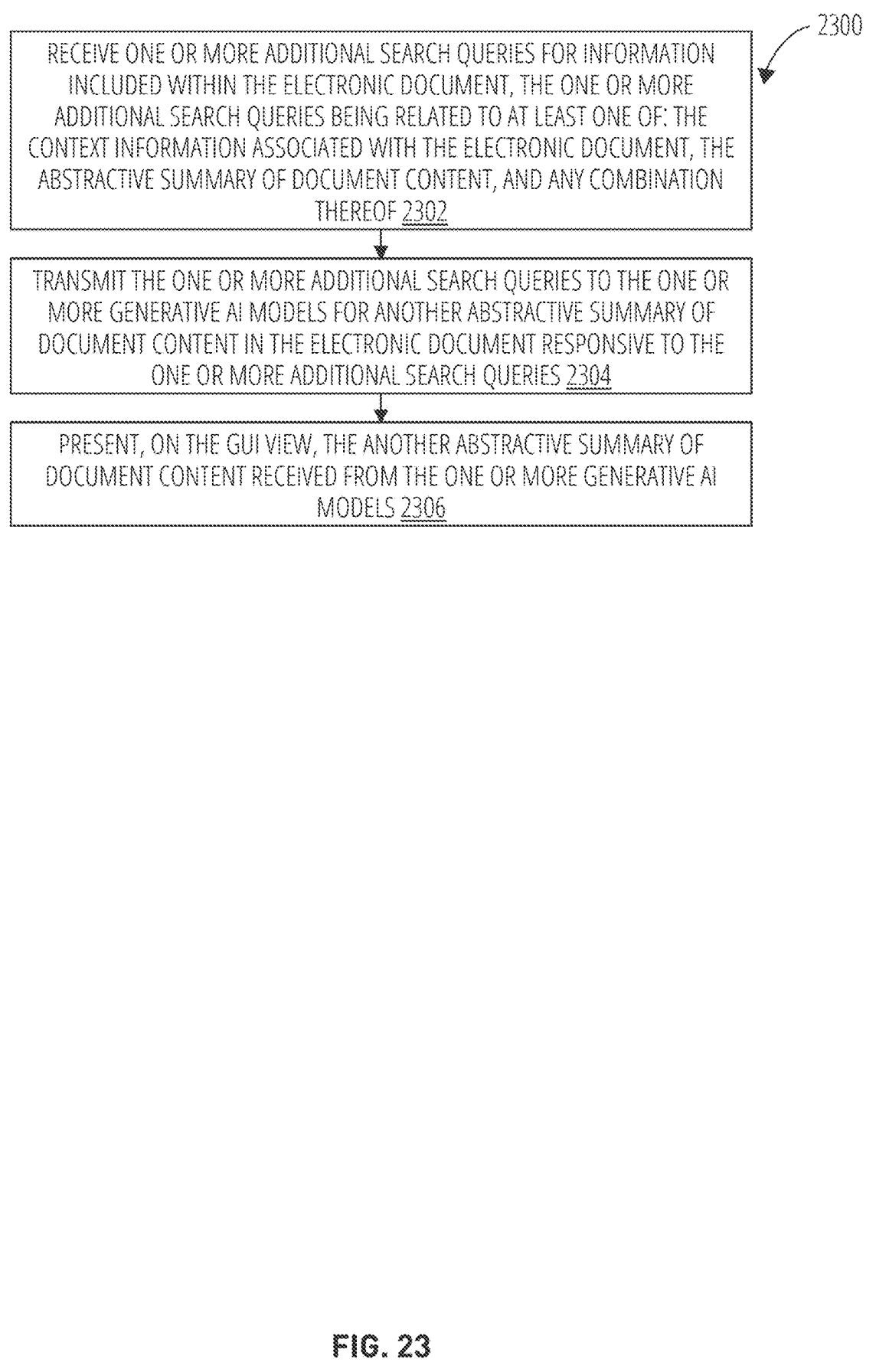

RECEIVE ONE OR MORE ADDITIONAL SEARCH QUERIES FOR INFORMATION INCLUDED WITHIN THE ELECTRONIC DOCUMENT, THE ONE OR MORE ADDITIONAL SEARCH QUERIES BEING RELATED TO AT LEAST ONE OF: THE CONTEXT INFORMATION ASSOCIATED WITH THE ELECTRONIC DOCUMENT, THE ABSTRACTIVE SUMMARY OF DOCUMENT CONTENT, AND ANY COMBINATION THEREOF 2302

TRANSMIT THE ONE OR MORE ADDITIONAL SEARCH QUERIES TO THE ONE OR MORE GENERATIVE AI MODELS FOR ANOTHER ABSTRACTIVE SUMMARY OF DOCUMENT CONTENT IN THE ELECTRONIC DOCUMENT RESPONSIVE TO THE ONE OR MORE ADDITIONAL SEARCH QUERIES 2304

PRESENT, ON THE GUI VIEW, THE ANOTHER ABSTRACTIVE SUMMARY OF DOCUMENT CONTENT RECEIVED FROM THE ONE OR MORE GENERATIVE AI MODELS 2306

FIG. 23

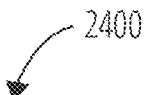

RETRIEVE CONTEXT INFORMATION ASSOCIATED WITH THE ELECTRONIC DOCUMENT IN RESPONSE TO A SELECTION SIGNAL REPRESENTING A REQUEST FOR A SUMMARY OF AN ELECTRONIC DOCUMENT, THE CONTEXT INFORMATION TO COMPRISE INFORMATION REPRESENTING A MEANING OR INTERPRETATION OF DOCUMENT CONTENT WITHIN THE ELECTRONIC DOCUMENT, THE SELECTION SIGNAL RECEIVED FROM A GRAPHICAL USER INTERFACE (GUI) ELEMENT OF A GUI VIEW 2402

GENERATE A SEARCH QUERY BASED ON THE CONTEXT INFORMATION, THE SEARCH QUERY EXPRESSED IN A NATURAL LANGUAGE REPRESENTATION TO REQUEST A SEARCH FOR INFORMATION WITHIN THE ELECTRONIC DOCUMENT 2404

GENERATE A CONTEXTUALIZED EMBEDDING FOR THE SEARCH QUERY TO FORM A SEARCH VECTOR 2406

RETRIEVE A SET OF CANDIDATE DOCUMENT VECTORS THAT ARE SEMANTICALLY SIMILAR TO THE SEARCH VECTOR FROM A DOCUMENT INDEX OF CONTEXTUALIZED EMBEDDINGS FOR THE ELECTRONIC DOCUMENT 2408

SEND A REQUEST TO A GENERATIVE ARTIFICIAL INTELLIGENCE (AI) MODEL FOR AN ABSTRACTIVE SUMMARY OF DOCUMENT CONTENT FOR THE SET OF CANDIDATE DOCUMENT VECTORS, THE ABSTRACTIVE SUMMARY EXPRESSED IN A NATURAL LANGUAGE REPRESENTATION 2410

RECEIVE A RESPONSE WITH THE ABSTRACTIVE SUMMARY FROM THE GENERATIVE AI MODEL 2412

FIG. 24

2500

GENERATE A SEARCH QUERY BASED ON A CONTEXT INFORMATION, THE SEARCH QUERY EXPRESSED IN A NATURAL LANGUAGE REPRESENTATION TO REQUEST A SEARCH FOR INFORMATION WITHIN THE ELECTRONIC DOCUMENT, THE CONTEXT INFORMATION BEING ASSOCIATED WITH AN ELECTRONIC DOCUMENT AND INCLUDES INFORMATION REPRESENTING A MEANING OR INTERPRETATION OF DOCUMENT CONTENT WITHIN THE ELECTRONIC DOCUMENT 2502

GENERATE A CONTEXTUALIZED EMBEDDING FOR THE SEARCH QUERY TO FORM A SEARCH VECTOR 2504

RETRIEVE A SET OF CANDIDATE DOCUMENT VECTORS THAT ARE SEMANTICALLY SIMILAR TO THE SEARCH VECTOR FROM A DOCUMENT INDEX OF CONTEXTUALIZED EMBEDDINGS FOR THE ELECTRONIC DOCUMENT 2506

SEND A REQUEST TO A GENERATIVE ARTIFICIAL INTELLIGENCE (AI) MODEL FOR AN ABSTRACTIVE SUMMARY OF DOCUMENT CONTENT FOR THE SET OF CANDIDATE DOCUMENT VECTORS, THE ABSTRACTIVE SUMMARY EXPRESSED IN A NATURAL LANGUAGE REPRESENTATION 2508

RECEIVE A RESPONSE WITH THE ABSTRACTIVE SUMMARY FROM THE GENERATIVE AI MODEL 2510

COMPUTER-READABLE STORAGE MEDIUM 3002

COMPUTER EXECUTABLE INSTRUCTIONS 3004

SEMANTIC SEARCH AND SUMMARIZATION FOR ELECTRONIC DOCUMENTS

The present application claims priority to U.S. Provisional Patent Appl. No. 63/463,647 to Hudetz et al., filed May 3, 2023, and entitled "Graphic User Interface for Semantic Search and Summarization of Electronic Documents", and incorporates its disclosure herein by reference in its entirety.

BACKGROUND

An electronic document management platform allows organizations to manage a growing collection of electronic documents, such as electronic agreements. An electronic agreement may be tagged with a visual element for receiving an electronic signature. An electronic signature is data that is logically associated with other data and used by a signatory to sign the associated data. This type of signature has a same legal standing as a handwritten signature as long as it adheres to certain regulatory requirements. While regulatory requirements may vary based on a given jurisdiction, an electronic signature typically has one or more of the following properties: (1) a signatory is uniquely identified and linked to an electronic signature; (2) the signatory has sole control of any cryptographic credentials used to create the electronic signature; (3) the electronic signature identifies when associated data is modified after signing; and (4) the electronic signature becomes invalid when associated data is modified after signing.

It is worthy to note that electronic signatures are different from digital signatures. An electronic signature is intended to provide a secure and accurate identification method for a signatory during a transaction. A digital signature is a cryptographic scheme for verifying authenticity of digital messages or documents. Digital signatures are often used to implement electronic signatures to increase security. However, not all electronic signatures use digital signatures.

Due to constantly evolving legal and technical requirements imposed on electronic documents, an entire ecosystem of processes, devices, systems and networks continuously evolve around the safe and secure contract lifecycle management (CLM), such as generation, delivery, management, searching and storage of electronic documents.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 6 illustrates electronic documents 518 in accordance with one embodiment.

FIG. 10 illustrates an abstractive summary 148 in accordance with one embodiment.

FIG. 12 illustrates a logic flow 1200 in accordance with one embodiment.

FIG. 13 illustrates a logic flow 1300 in accordance with one embodiment.

FIG. 21 illustrates a routine 2100 in accordance with one embodiment.

FIG. 22 illustrates a routine 2200 in accordance with one embodiment.

FIG. 23 illustrates a routine 2300 in accordance with one embodiment.

FIG. 24 illustrates a routine 2400 in accordance with one embodiment.

FIG. 25 illustrates a routine 2500 in accordance with one embodiment.

DETAILED DESCRIPTION

Figure 1:
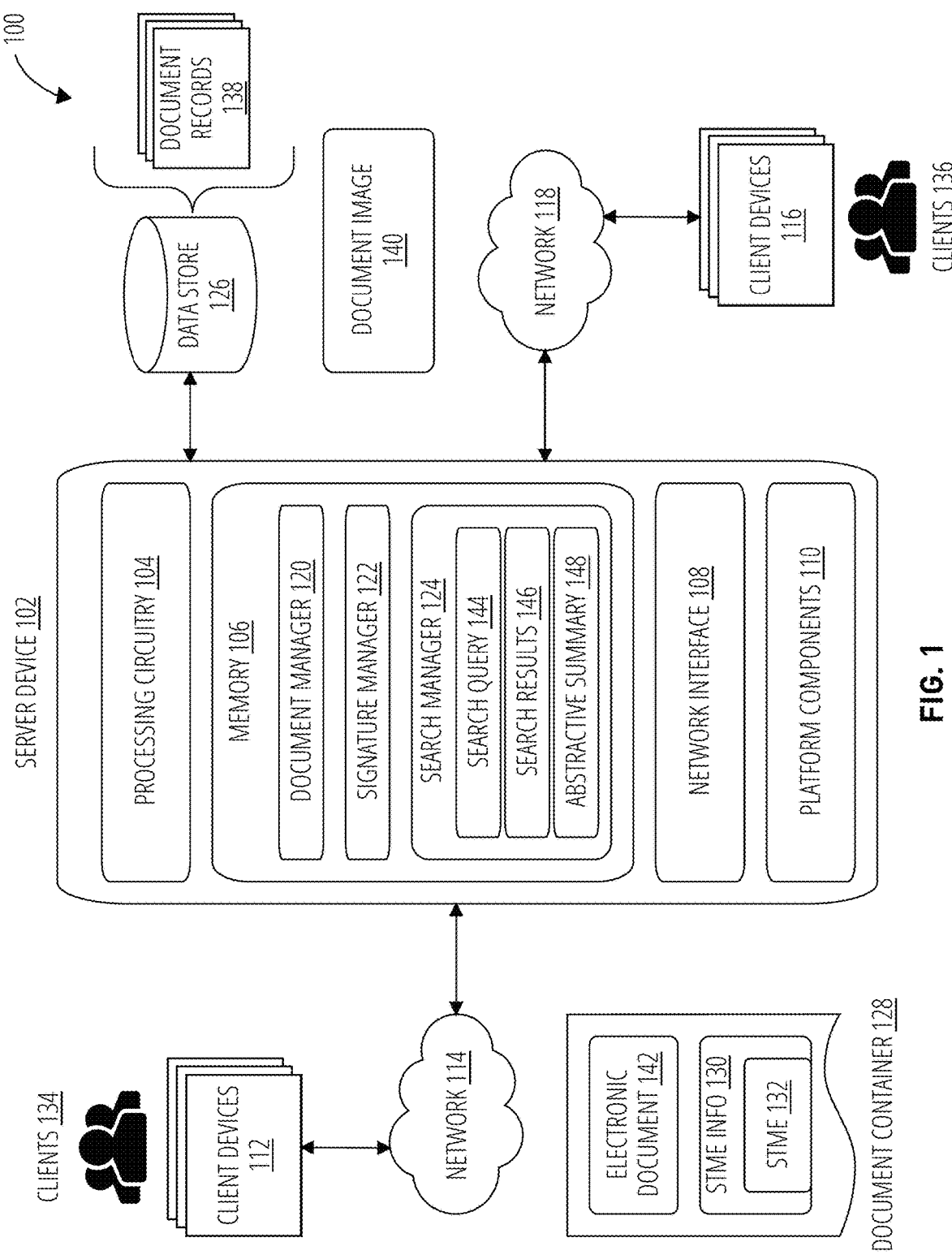
FIG. 1 illustrates a system 100 in accordance with one embodiment.

Embodiments disclosed herein are generally directed to techniques for managing a collection of electronic documents within a document management environment. In general, a document may comprise a multimedia record. The term "electronic" may refer to technology having electrical, digital, magnetic, wireless, optical, electromagnetic, or similar capabilities. The term "electronic document" may refer to any electronic multimedia content intended to be used in an electronic form. An electronic document may be part of an electronic record. The term "electronic record" may refer to a contract or other record created, generated, sent, communicated, received, or stored by an electronic mechanism. An electronic document may have an electronic signature. The term "electronic signature" may refer to an electronic sound, symbol, or process, attached to or logically associated with an electronic document, such as a contract or other record, and executed or adopted by a person with the intent to sign the record.

An online electronic document management system provides a host of different benefits to users (e.g., a client or customer) of the system. One advantage is added convenience in generating and signing an electronic document, such as a legally-binding agreement. Parties to an agreement can review, revise and sign the agreement from anywhere around the world on a multitude of electronic devices, such as computers, tablets and smartphones.

In some cases, a user may need to search for information contained within an electronic document. For example, an electronic agreement may be lengthy and filled with technical, legal or business terms with complex goals and outcomes. Therefore a user may need to search for information within an electronic document, such as warranty terms, contractual obligations, pricing information, and so forth. Furthermore, during an electronic signing (e-signing) negotiation or process, multiple parties may make extensive modifications or revisions over time to an electronic agreement. A number of revisions typically increases as a function of a length and complexity of an agreement. Consequently, a user may search an electronic document to find revisions to ensure they are acceptable.

Conventional document management systems typically provide search tools to allow a user to perform searches for information within an electronic document (e.g., intra-document searches) or across multiple electronic documents (e.g., inter-document searches) stored as part of a collection of documents (e.g., a document corpus). However, search tools for an electronic document are typically limited to variations of lexical searches. Lexical searching is a process of searching for a particular word or group of words within a given text or corpus. It involves looking for matches of the specified search terms exactly as they appear in the text, without any variations or alterations in spelling, punctuation, or word order. Lexical searching can be useful in a variety of contexts, such as language analysis, information retrieval, and content management. For example, it can be used to identify instances of a specific keyword or phrase in a large dataset, to extract relevant information from unstructured text, or to monitor online conversations for particular topics or keywords.

While lexical searching can be a useful tool in many situations, it also has some limitations and potential problems. For example, lexical searching only looks for exact matches of the specified search terms, which means that it may miss relevant information that uses similar or related words or phrases. Lexical searching may also return false positives, or instances where the specified search terms appear in the text but are not actually relevant to the desired search results. This can happen, for example, if the search terms appear in a different context or with a different meaning than intended. Lexical searching may also miss instances of the search terms due to differences in spelling, punctuation, or word order. For example, if the search term is "color," it may miss instances of "colour" or "colorful." Some words or phrases may have multiple meanings, which can lead to ambiguity in lexical searching. For example, the word "bank" could refer to a financial institution or the side of a river. One particular challenge for lexical searching is that it does not capture or address contextual differences in words or phrases. The meaning of a word or phrase can depend on the context in which it appears. Lexical searching may miss or misinterpret instances of the search terms if it does not take into account the surrounding text or the overall meaning of the document.

Another particular challenge for lexical searching is that even when matches are found, it may be cumbersome to review the search results. This may be exacerbated when the search results includes erroneous information, extraneous information or large blocks of information that require manual review by a user.

Embodiments attempt to solve these and other challenges associated with searching for information within an electronic document or across a collection of documents. Some embodiments introduce advanced intra-document search capability that returns results based on semantic similarity and also generates an abstractive summary with the search query as well as relevant snippets in mind. A user reviews an electronic agreement and needs to retrieve important business information such as identifying payment terms or terms of conditions. The user may enter a search query input such as "Payment terms and conditions" or just ask a question "What would happen if we don't comply with the provisions?" in a search box of graphical user interface (GUI) and hits an Enter key. The user will see a list of relevant search snippets and an abstractive summary of the sections/parts of the document that are relevant to the query. Each of the relevant snippets will be clickable which will take the user to the specific section with highlighted content in the contract. This will greatly improve the search experience over the current keyword based lexicon search and help to expedite the process of reviewing large agreements.

Summarization of relevant snippets in the document will reduce the time to review the document and allow customers to quickly understand important information like terms of use, risks, etc. and eventually reduce the time to sign. Time is money and too much of both are spent on contract review. Contracts are verbose, cumbersome to read, and need hours of manual review to identify salient and actionable pieces of information. According to an Enterprise Legal Regulation (ELR) Report, two in five legal respondents (40%) spend four to five hours—at least half of every business day—reviewing and managing contracts. That means half of their work weeks, quarters, and fiscal years are spent manually reviewing contracts. Meanwhile, contract review is an important step when users look for specific contracts. However, contract lifecycle management (CLM) users do not have a reliable way to ascertain the relevance of the documents they get in the search results. Summarization of document content can help users cut through the clutter associated with manual reviews. An accurate summary of the sections/parts of the document relevant to a search query will empower users to review their contracts faster and focus on the real needs of their business. This will lead to significant risk reduction for their overall business by enabling them to act in a timely manner on contracts.

Embodiments implement various artificial intelligence (AI) and machine learning (ML) (AI/ML) techniques to improve searching for information in one or more electronic documents managed by an electronic document management system. In one embodiment, for example, AI/ML techniques are used to improve searching for information from a document corpus of electronic documents, such as electronic documents with an electronic signature ("signed electronic documents") and electronic documents without an electronic signature ("unsigned electronic documents"). In some cases, the document corpus may be associated with a particular entity, such as a customer or client of the electronic document management company, and may therefore contain proprietary, strategic and valuable business information.

The AI/ML techniques are designed to search one or more electronic documents within a document corpus to identify and extract defined sets of information, sometimes referred to herein as "information blocks." The document corpus may include signed electronic documents and unsigned electronic documents associated with a defined entity, such as agreements or contracts for a customer, business or organization. The electronic documents may comprise various multimedia components, such as written text, spoken text, audio, images, videos, web content, animations, and so forth.

In various embodiments, an electronic document management system may implement a set of improved search tools and algorithms to perform lexical searching, semantic searching, or a combination of both. In one embodiment, for example, a system may implement semantic searches to improve search results for a user. Semantic search capability can be very helpful in quickly locating the relevant information within an electronic document, such as an electronic agreement. It saves time compared to manually going through the entire document and it can be especially useful in cases where the document is very long or complex.

Semantic searching is a process of searching for information by understanding the meaning behind the search query and the content being searched. It involves analyzing the context, relationships, and connections between words and concepts to provide more accurate and relevant search results. Unlike lexical searching, which relies on exact matches of search terms, semantic searching takes into account the overall meaning and intent of the query, as well as the meaning and relationships between words and phrases within the content being searched. This enables semantic search engines to deliver more precise and personalized results, even when the search terms used may not be an exact match with the content being searched. Semantic searching uses advanced technologies such as natural language processing (NLP), machine learning, and artificial intelligence (AI) to analyze and understand the meaning and relationships between words and concepts in order to provide more accurate and relevant search results. It is particularly useful for searching large and complex datasets, such as scientific papers, legal documents, and other types of unstructured data, where traditional keyword-based searches may not be effective.

While semantic searching provides clear technical advantages over lexical searches, semantic search by itself may not provide a user, such as a legal representative or business person, with a clear understanding of the entire context of the information for which they are searching. Consequently, as an addition or alternative, the AI/ML techniques are designed to implement a generative artificial intelligence (AI) platform that uses a large language module (LLM) to assist in contract management. A combination of both semantic search capabilities with a short summary of the relevant information based on a search query provides an optimal solution. This combination provides an overview of the information and highlights it in the agreement to make sure none of the details are missed. A user may use the semantic search capability to quickly locate relevant information and then use the summarization to get a clear understanding of the details.

Embodiments may implement a generative AI to provide an abstractive summary of search results relevant to a given search request or search query. An abstractive summary is a type of summary that is created by generating new text that captures the main points and ideas of the original content in a more concise and readable format. Unlike extractive summaries, which simply select and condense existing text, abstractive summaries use natural language processing (NLP) and machine learning algorithms to create new text that conveys the essence of the original content in a more coherent and natural way. Abstractive summaries are particularly useful for summarizing long and complex documents, such as research papers, news articles, and legal documents, where extracting a summary directly from the text may be difficult or result in a summary that is too long or difficult to read. By generating a new summary that captures the most important information and ideas from the original content in a more readable format, abstractive summaries can help readers quickly understand and digest the key takeaways without having to read the entire document. As a result, the abstractive summary may ensure information returned in a search result is not missed and actionable, which is particularly useful for large documents with multiple sections complex terminology, typically found in the legal, technical and business industry.

Embodiments may include a method, apparatus, system and computer-readable medium (CRM) that includes various structures and circuitry to implement functions or operations to facilitate semantic searching of an electronic document to produce improved search results, and/or summarizing some or all of the search results in a natural language such as a human language for better readability and understanding by a human reader. The embodiments may reduce an amount of time needed to review electronic documents, such as electronic agreements that are subject to a negotiation process and multiple revisions. Embodiments help a user to understand important information such as terms and conditions, risks, payment terms, and other legal and business provisions. Embodiments empower customers and signatories to act timely on agreements. These advantages are achieved by providing more comprehensive search results from an electronic document via a semantic search, and summarizing at least a portion of the search results to bring salient and actionable information in the electronic document to the forefront for analysis by a user.

In one embodiment, for example, a method may include receiving a search query to search for information within an electronic document by a cloud search service, such as an online electronic document management system. The search query may comprise any free form text in a natural language representation of a human language. The method may generate a contextualized embedding for the natural language query request to form a search vector. A contextualized embedding may comprise a vector representation of a sequence of words in the search query that includes contextual information for the sequence of words. The method may include searching a document index of contextualized embeddings for the electronic document with the search vector, where each contextualized embedding comprises a vector representation of a sequence of words in the electronic document that includes contextual information for the sequence of words. The search results may include a set of candidate document vectors that are semantically similar to the search vector.

The method may further include sending a natural language generation (NLG) request to a generative artificial intelligence (AI) model. The generative AI model may comprise a machine learning model that implements a large language model (LLM) to support natural language processing (NLP) operations, such as natural language understanding (NLU), natural language generation (NLG), and other NLP operations. The NLG request may request an abstractive summary of document content for a subset of candidate document vectors from the set of candidate document vectors. The abstractive summary may comprise a natural language representation of the human language. The method may include receiving a NLG response with the abstractive summary from the generative AI model. Other embodiments are described and claimed.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

FIG. 1 illustrates an embodiment of a system 100. The system 100 may be suitable for implementing one or more embodiments as described herein. In one embodiment, for example, the system 100 may comprise an electronic document management platform (EDMP) suitable for managing a collection of electronic documents. An example of an EDMP includes a product or technology offered by Docu-Sign®, Inc., located in San Francisco, California ("Docu-Sign"). DocuSign is a company that provides electronic signature technology and digital transaction management services for facilitating electronic exchanges of contracts and signed documents. An example of a DocuSign product is a DocuSign Agreement Cloud that is a framework for generating, managing, signing and storing electronic documents on different devices. It may be appreciated that the system 100 may be implemented using other EDMA, technologies and products as well. For example, the system 100 may be implemented as an online signature system, online document creation and management system, an online workflow management system, a multi-party communication and interaction platform, a social networking system, a marketplace and financial transaction management system, a customer record management system, and other digital transaction management platforms. Embodiments are not limited in this context.

The system 100 may implement an EDMP as a cloud computing system. Cloud computing is a model for providing on-demand access to a shared pool of computing resources, such as servers, storage, applications, and services, over the Internet. Instead of maintaining their own physical servers and infrastructure, companies can rent or lease computing resources from a cloud service provider. In a cloud computing system, the computing resources are hosted in data centers, which are typically distributed across multiple geographic locations. These data centers are designed to provide high availability, scalability, and reliability, and are connected by a network infrastructure that allows users to access the resources they need. Some examples of cloud computing services include Infrastructure-as-a-Service (IaaS), Platform-as-a-Service (PaaS), and Software-as-a-Service (SaaS).

The system 100 may implement various search tools and algorithms designed to search for information within an electronic document or across a collection of electronic documents. Within the context of a cloud computing system, the system 100 may implement a cloud search service accessible to users via a web interface or web portal front-end server system. A cloud search service is a managed service that allows developers and businesses to add search capabilities to their applications or websites without the need to build and maintain their own search infrastructure. Cloud search services typically provide powerful search capabilities, such as faceted search, full-text search, and auto-complete suggestions, while also offering features like scalability, availability, and reliability. A cloud search service typically operates in a distributed manner, with indexing and search nodes located across multiple data centers for high availability and faster query responses. These services typically offer application program interfaces (APIs) that allow developers to easily integrate search functionality into their applications or websites. One major advantage of cloud search services is that they are designed to handle large-scale data sets and provide powerful search capabilities that can be difficult to achieve with traditional search engines. Cloud search services can also provide advanced features, such as machine learning-powered search, natural language processing, and personalized recommendations, which can help improve the user experience and make search more efficient. Some examples of popular cloud search services include Amazon CloudSearch, Elasticsearch, and Azure Search. These services are typically offered on a pay-as-you-go basis, allowing businesses to pay only for the resources they use, making them an affordable option for businesses of all sizes.

In general, the system 100 may allow users to generate, revise and electronically sign electronic documents. When implemented as a large-scale cloud computing service, the system 100 may allow entities and organization to amass a significant number of electronic documents, including both signed electronic documents and unsigned electronic documents. As such, the system 100 may need to manage a large collection of electronic documents for different entities, a task that is sometimes referred to as contract lifecycle management (CLM). An overview of the workflows and processes used to support CLM operations, including searching and summarizing search results, is described in more detail below.

As depicted in FIG. 1, the system 100 may comprise a server device 102 communicatively coupled to a set of client devices 112 via a network 114. The server device 102 may also be communicatively coupled to a set of client devices 116 via a network 118. The client devices 112 may be associated with a set of clients 134. The client devices 116 may be associated with a set of clients 136. In one network topology, the server device 102 may represent any server device, such as a server blade in a server rack as part of a cloud computing architecture, while the client devices 112 and the client devices 116 may represent any client device, such as a smart wearable (e.g., a smart watch), a smart phone, a tablet computer, a laptop computer, a desktop computer, a mobile device, and so forth. The server device 102 may be coupled to a local or remote data store 126 to store document records 138. It may be appreciated that the system 100 may have more or less devices than shown in FIG. 1 with a different network topology as needed for a given implementation. Embodiments are not limited in this context.

Figure 31:
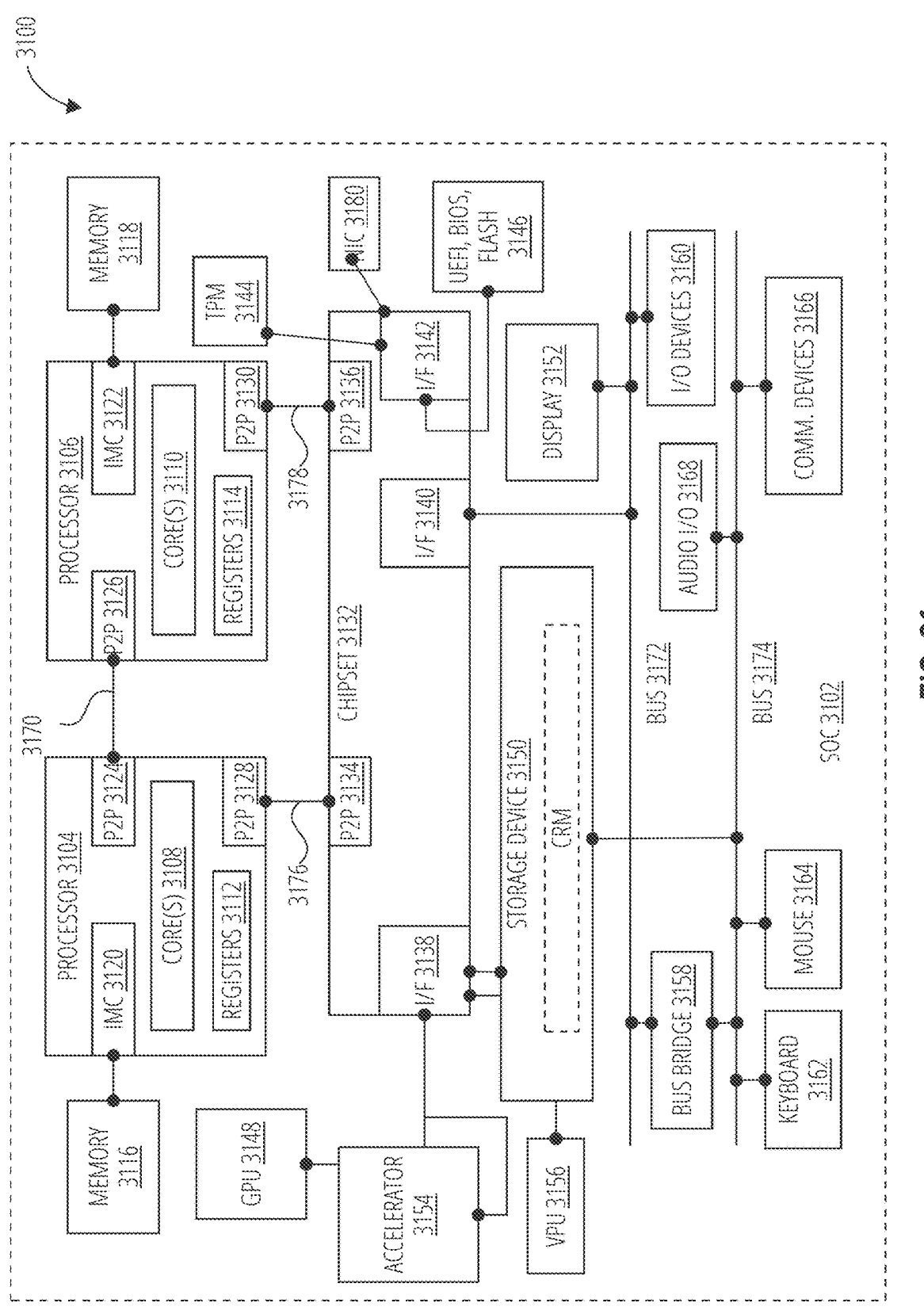
FIG. 31 illustrates a computing architecture 3100 in accordance with one embodiment.

In various embodiments, the server device 102 may comprise various hardware elements, such as a processing circuitry 104, a memory 106, a network interface 108, and a set of platform components 110. The client devices 112 and/or the client devices 116 may include similar hardware elements as those depicted for the server device 102. The server device 102, client devices 112, and client devices 116, and associated hardware elements, are described in more detail with reference to a computing architecture 3100 as depicted in FIG. 31.

Figure 32:
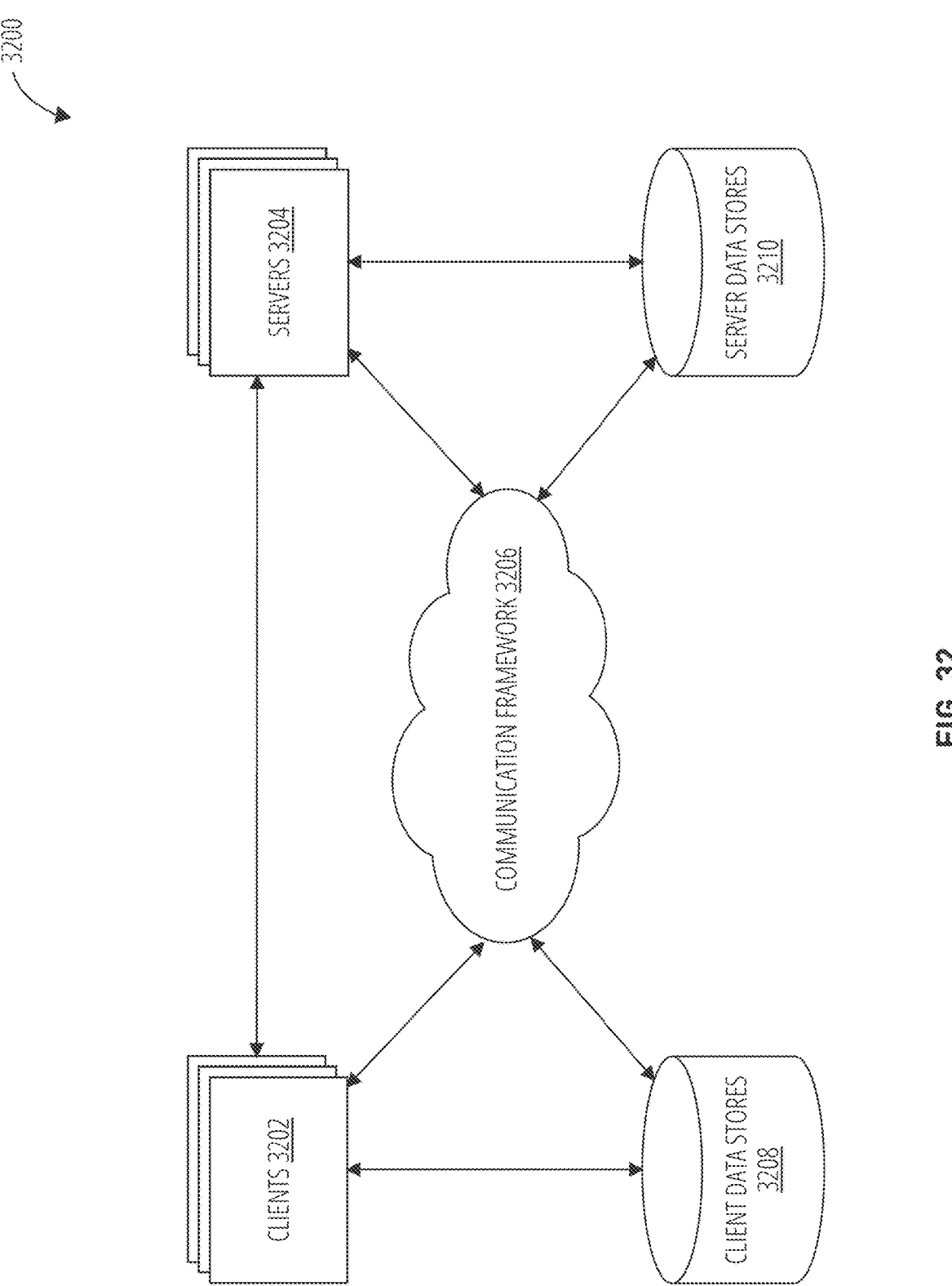
FIG. 32 illustrates a communications architecture 3200 in accordance with one embodiment.

In various embodiments, the server devices 102, 112 and/or 116 may communicate various types of electronic information, including control, data and/or content information, via one or both network 114, network 118. The network 114 and the network 118, and associated hardware elements, are described in more detail with reference to a communications architecture 3200 as depicted in FIG. 32.

The memory 106 may store a set of software components, such as computer executable instructions, that when executed by the processing circuitry 104, causes the processing circuitry 104 to implement various operations for an electronic document management platform. As depicted in FIG. 1, for example, the memory 106 may comprise a document manager 120, a signature manager 122, and a search manager 124, among other software elements.

The document manager 120 may generally manage a collection of electronic documents stored as document records 138 in the data store 126. The document manager 120 may receive as input a document container 128 for an electronic document. A document container 128 is a file format that allows multiple data types to be embedded into a single file, sometimes referred to as a "wrapper" or "metafile." The document container 128 can include, among other types of information, an electronic document 142 and metadata for the electronic document 142.

A document container 128 may include an electronic document 142. The electronic document 142 may comprise any electronic multimedia content intended to be used in an electronic form. The electronic document 142 may comprise an electronic file having any given file format. Examples of file formats may include, without limitation, Adobe portable document format (PDF), Microsoft Word, PowerPoint, Excel, text files (.txt, .rtf), and so forth. In one embodiment, for example, the electronic document 142 may comprise a PDF created from a Microsoft Word file with one or more work flows developed by Adobe Systems Incorporated, an American multi-national computer software company headquartered in San Jose, California. Embodiments are not limited to this example.

In addition to the electronic document 142, the document container 128 may also include metadata for the electronic document 142. In one embodiment, the metadata may comprise signature tag marker element (STME) information 132 for the electronic document 142. The STME information 130 may comprise one or more STME 132, which are graphical user interface (GUI) elements superimposed on the electronic document 142. The GUI elements may comprise textual elements, visual elements, auditory elements, tactile elements, and so forth. In one embodiment, for example, the STME information 130 and STME 132 may be implemented as text tags, such as DocuSign anchor text, Adobe® Acrobat Sign® text tags, and so forth. Text tags are specially formatted text that can be placed anywhere within the content of an electronic document specifying the location, size, type of fields such as signature and initial fields, checkboxes, radio buttons, and form fields; and advanced optional field processing rules. Text tags can also be used when creating PDFs with form fields. Text tags may be converted into signature form fields when the document is sent for signature or uploaded. Text tags can be placed in any document type such as PDF, Microsoft Word, PowerPoint, Excel, and text files (.txt, .rtf). Text tags offer a flexible mechanism for setting up document templates that allow positioning signature and initial fields, collecting data from multiple parties within an agreement, defining validation rules for the collected data, and adding qualifying conditions. Once a document is correctly set up with text tags it can be used as a template when sending documents for signatures ensuring that the data collected for agreements is consistent and valid throughout the organization.

In one embodiment, the STME 132 may be utilized for receiving signing information, such as GUI placeholders for approval, checkbox, date signed, signature, social security number, organizational title, and other custom tags in association with the GUI elements contained in the electronic document 142. A client 134 may have used the client device 112 and/or the server device 102 to position one or more signature tag markers over the electronic document 142 with tools applications, and work flows developed by DocuSign or Adobe. For instance, assume the electronic document 142 is a commercial lease associated with STME 132 designed for receiving signing information to memorialize an agreement between a landlord and tenant to lease a parcel of commercial property. In this example, the signing information may include a signature, title, date signed, and other GUI elements.

The document manager 120 may process a document container 128 to generate a document image 140. The document image 140 is a unified or standard file format for an electronic document used by a given EDMP implemented by the system 100. For instance, the system 100 may standardize use of a document image 140 having an Adobe portable document format (PDF), which is typically denoted by a ".pdf" file extension. If the electronic document 142 in the document container 128 is in a non-PDF format, such as a Microsoft Word ".doc" or ".docx" file format, the document manager 120 may convert or transform the file format for the electronic document into the PDF file format. Further, if the document container 128 includes an electronic document 142 stored in an electronic file having a PDF format suitable for rendering on a screen size typically associated with a larger form factor device, such as a monitor for a desktop computer, the document manager 120 may transform the electronic document 142 into a PDF format suitable for rendering on a screen size associated with a smaller form factor device, such as a touch screen for a smart phone. The document manager 120 may transform the electronic document 142 to ensure that it adheres to regulatory requirements for electronic signatures, such as a "what you see is what you sign" (WYSIWYS) property, for example.

The signature manager 122 may generally manage signing operations for an electronic document, such as the document image 140. The signature manager 122 may manage an electronic signature process to send the document image 140 to signers, obtaining electronic signatures, verifying electronic signatures, and recording and storing the electronically signed document image 140. For instance, the signature manager 122 may communicate a document image 140 over the network 118 to one or more client devices 116 for rendering the document image 140. A client 136 may electronically sign the document image 140, and send the signed document image 140 to the server device 102 for verification, recordation, and storage.

Figure 3:
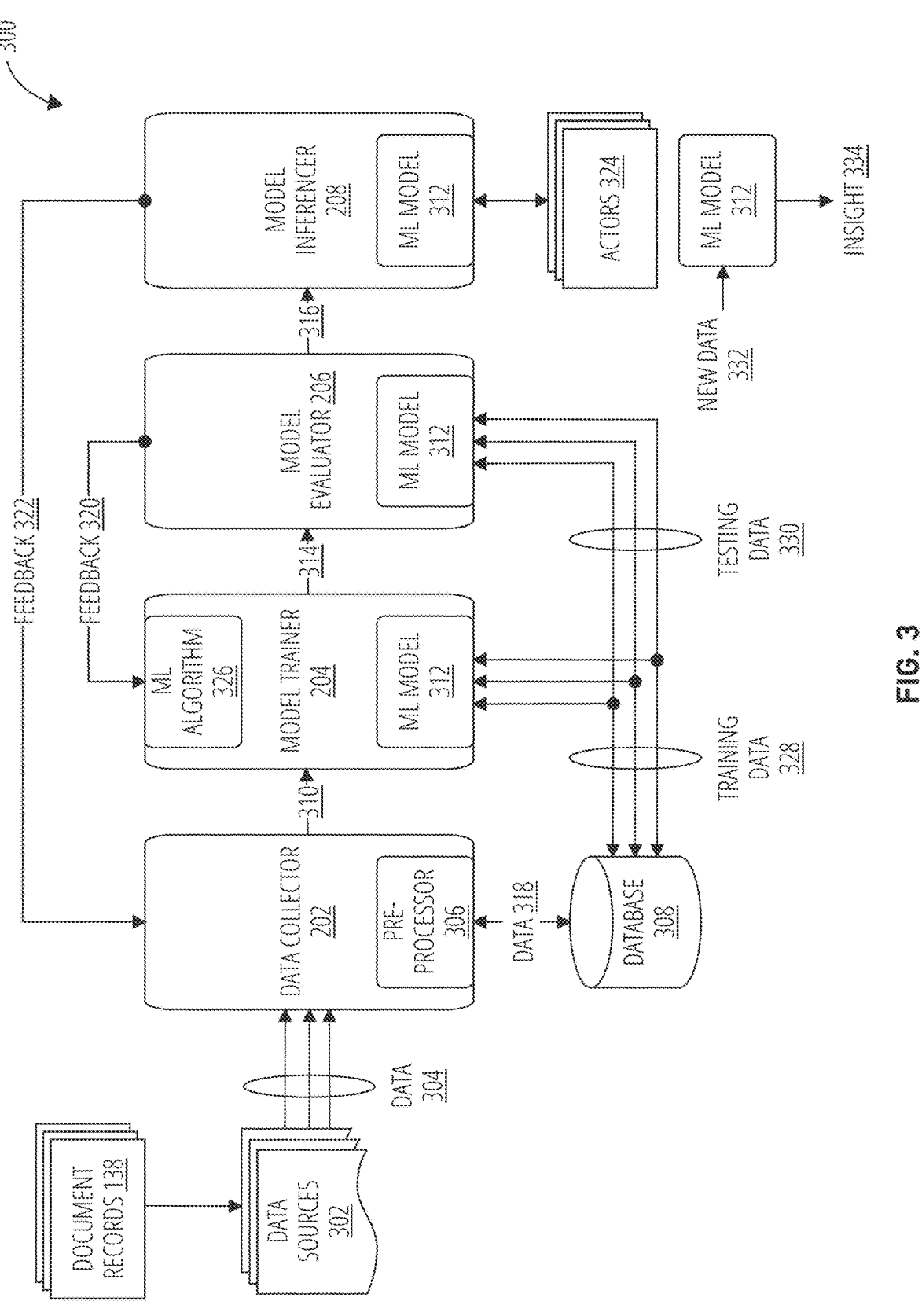
FIG. 3 illustrates an artificial intelligence architecture 300 in accordance with one embodiment.

The search manager 124 may generally manage artificial intelligence (AI) and machine learning (ML) agents to assist in various operational tasks for the EDMP of the system 100. The search manager 124, and associated software elements, are described in more detail with reference to an artificial intelligence architecture 300 as depicted in FIG. 3. The search manager 124, and associated hardware elements, are described in more detail with reference to a computing architecture 3100 as depicted in FIG. 31.

In general operation, assume the server device 102 receives a document container 128 from a client device 112 over the network 114. The server device 102 processes the document container 128 and makes any necessary modifications or transforms as previously described to generate the document image 140. The document image 140 may have a file format of an Adobe PDF denoted by a ".pdf" file extension. The server device 102 sends the document image 140 to a client device 116 over the network 118. The client device 116 renders the document image 140 with the STME 132 in preparation for electronic signing operations to sign the document image 140.

The document image 140 may further be associated with STME information 130 including one or more STME 132 that were positioned over the document image 140 by the client device 112 and/or the server device 102. The STME 132 may be utilized for receiving signing information (e.g., approval, checkbox, date signed, signature, social security number, organizational title, etc.) in association with the GUI elements contained in the document image 140. For instance, a client 134 may use the client device 112 and/or the server device 102 to position the STME 132 over the electronic documents 518 with tools, applications, and work flows developed by DocuSign. For example, the electronic documents 518 may be a commercial lease that is associated with one or more or more STME 132 for receiving signing information to memorialize an agreement between a landlord and tenant to lease a parcel of commercial property. For example, the signing information may include a signature, title, date signed, and other GUI elements.

Broadly, a technological process for signing electronic documents may operate as follows. A client 134 may use a client device 112 to upload the document container 128, over the network 114, to the server device 102. The document manager 120, at the server device 102, receives and processes the document container 128. The document manager 120 may confirm or transform the electronic document 142 as a document image 140 that is rendered at a client device 116 to display the original PDF image including multiple and varied visual elements. The document manager 120 may generate the visual elements based on separate and distinct input including the STME information 130 and the STME 132 contained in the document container 128. In one embodiment, the PDF input in the form of the electronic document 142 may be received from and generated by one or more work flows developed by Adobe Systems Incorporated. The STME 132 input may be received from and generated by work flows developed by DocuSign. Accordingly, the PDF and the STME 132 are separate and distinct input as they are generated by different workflows provided by different providers.

The document manager 120 may generate the document image 140 for rendering visual elements in the form of text images, table images, STME images and other types of visual elements. The original PDF image information may be generated from the document container 128 including original documents elements included in the electronic document 142 of the document container 128 and the STME information 130 including the STME 132. Other visual elements for rendering images may include an illustration image, a graphic image, a header image, a footer image, a photograph image, and so forth.

The signature manager 122 may communicate the document image 140 over the network 118 to one or more client devices 116 for rendering the document image 140. The client devices 116 may be associated with clients 136, some of which may be signatories or signers targeted for electronically signing the document image 140 from the client 134 of the client device 112. The client device 112 may have utilized various work flows to identify the signers and associated network addresses (e.g., email address, short message service, multimedia message service, chat message, social message, etc.). For example, the client 134 may utilize workflows to identify multiple parties to the lease including bankers, landlord, and tenant. Further, the client 134 may utilize workflows to identify network addresses (e.g., email address) for each of the signers. The signature manager 122 may further be configured by the client 134 whether to communicate the document image 140 in series or parallel. For example, the signature manager 122 may utilize a workflow to configure communication of the document image 140 in series to obtain the signature of the first party before communicating the document image 140, including the signature of the first party, to a second party to obtain the signature of the second party before communicating the document image 140, including the signature of the first and second party to a third party, and so forth. Further for example, the client 134 may utilize workflows to configure communication of the document image 140 in parallel to multiple parties including the first party, second party, third party, and so forth, to obtain the signatures of each of the parties irrespective of any temporal order of their signatures.

The signature manager 122 may communicate the document image 140 to the one or more parties associated with the client devices 116 in a page format. Communicating in page format, by the signature manager 122, ensures that entire pages of the document image 140 are rendered on the client devices 116 throughout the signing process. The page format is utilized by the signature manager 122 to address potential legal requirements for binding a signer. The signature manager 122 utilizes the page format because a signer is only bound to a legal document that the signer is intended to be bound. To satisfy the legal requirement of intent, the signature manager 122 generates PDF image information for rendering the document image 140 to the one or more parties with a "what you see is what you sign" (WYSIWYS) property. The WYSIWYS property ensures the semantic interpretation of a digitally signed message is not changed, either by accident or by intent. If the WYSIWYS property is ignored, a digital signature may not be enforceable at law. The WYSIWYS property recognizes that, unlike a paper document, a digital document is not bound by its medium of presentation (e.g., layout, font, font size, etc.) and a medium of presentation may change the semantic interpretation of its content. Accordingly, the signature manager 122 anticipates a possible requirement to show intent in a legal proceeding by generating original PDF image information for rendering the document image 140 in page format. The signature manager 122 presents the document image 140 on a screen of a display device in the same way the signature manager 122 prints the document image 140 on the paper of a printing device.

As previously described, the document manager 120 may process a document container 128 to generate a document image 140 in a standard file format used by the system 100, such as an Adobe PDF, for example. Additionally, or alternatively, the document manager 120 may also implement processes and workflows to prepare an electronic document 142 stored in the document container 128. For instance, assume a client 134 uses the client device 112 to prepare an electronic document 142 suitable for receiving an electronic signature, such as the lease agreement in the previous example. The client 134 may use the client device 112 to locally or remotely access document management tools, features, processes and workflows provided by the document manager 120 of the server device 102. The client 134 may prepare the electronic document 142 as a brand new originally-written document, a modification of a previous electronic document, or from a document template with predefined information content. Once prepared, the signature manager 122 may implement electronic signature (e-sign) tools, features, processes and workflows provided by the signature manager 122 of the server device 102 to facilitate electronic signing of the electronic document 142.

In addition, the system 100 may include a search manager 124. The search manager 124 may implement a set of improved search tools and algorithms to perform lexical searching, semantic searching, or a combination of both. In one embodiment, for example, the search manager 124 may implement semantic searches to improve search results for a user. In one embodiment, for example, the search manager 124 may also implement generative AI techniques to assist in summarizing some or all of the search results in a natural language such as a human language for better readability and understanding by a human reader.

In general operation, the search manager 124 may receive a search query 144 to search for information within an electronic document 142 by a cloud search service, such as an online electronic document management system. The search query 144 may comprise any free form text in a natural language representation of a human language. The search manager 124 may generate a contextualized embedding for the search query 144 to form a search vector. A contextualized embedding may comprise a vector representation of a sequence of words in the search query 144 that includes contextual information for the sequence of words. The search manager 124 may search a document index of contextualized embeddings for the electronic document 142 with the search vector. Each contextualized embedding may comprise a vector representation of a sequence of words in the electronic document that includes contextual information for the sequence of words. The search process may produce a set of search results 146. The search results 146 may include a set of candidate document vectors that are semantically similar to the search vector of the search query 144.

Once a set of search results 146 are obtained, the search manager 124 may summarize one or more of the candidate document vectors as an abstractive summary. The search manager 124 may implement or access a generative artificial intelligence (AI) platform that uses a large language module (LLM) to assist in summarizing the search results 146 to produce an Abstractive summary 148. The generative AI may provide an Abstractive summary 148 of the search results 146 relevant to a given search query 144.

In one embodiment, the search manager 124 may implement a generative AI locally on the server device 102. In one embodiment, the search manager 124 may access a generative AI remotely on another server device. In the latter scenario, the search manager 124 may send a natural language generation (NLG) request to a generative AI model implemented on another device over a network. The generative AI model may comprise a machine learning model that implements a large language model (LLM) to support natural language processing (NLP) operations, such as natural language understanding (NLU), natural language generation (NLG), and other NLP operations. The NLG request may request an Abstractive summary 148 of document content for search results 146. The search results 146 may comprise a subset of candidate document vectors from the set of candidate document vectors. The Abstractive summary 148 may comprise a summary of document contents for the subset of candidate document vectors in a natural language representation of a human language, such as English, French, Spanish, Korean, and so forth. The search manager 124 may receive a NLG response with the Abstractive summary 148 from the generative AI model implemented by the other server device. The search manager 124 may surface the Abstractive summary 148 and/or the candidate document vectors to a user via a graphical user interface (GUI) on a client device.

Figure 2:
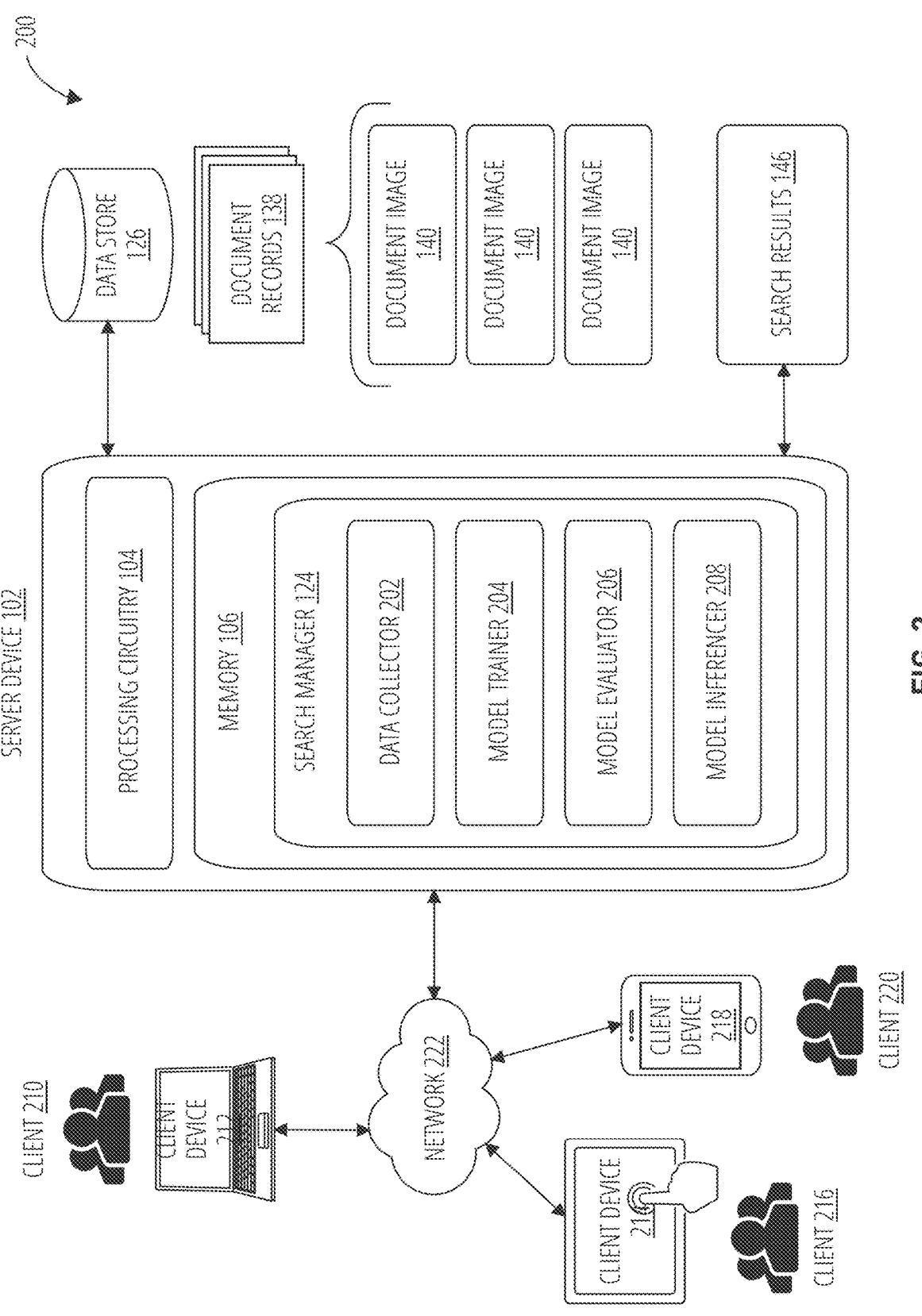
FIG. 2 illustrates a system 200 in accordance with one embodiment.

FIG. 2 illustrates a system 200. The system 200 is similar to the system 100, and further includes different clients such as client 210, client 216 and client 220 using different electronic devices such as client device 212, client device 214 and client device 218, respectively, to communicate with the server device 102 via a network 222. The network 222 may comprise a private network, such as a company intranet, or a public network, such as the Internet and World Wide Web (WWW). The network 222 may be implemented using various wired and wireless technologies and network topologies, such as those suitable for a cloud computing environment, for example.

The server device 102 may implement, among other components, a search manager 124. The search manager 124 may implement various AI/ML algorithms to implement AI/ML operations for the server device 102, such as in support of operations for the document manager 120, the signature manager 122 and/or the search manager 124 of the server device 102 as shown in FIG. 1. The search manager 124 may intelligently search and analyze an electronic document 142, such as electronic agreements, using the AI/ML algorithms and models to better understand informational content of the electronic document 142 and generate strategic search results 146. For instance, the search manager 124 may uncover information within signed electronic document or unsigned electronic documents.

In particular, the search manager 124 may train, evaluate, revise and deploy AI/ML algorithms to assist in receiving and understanding a search query 144 using NLU techniques, semantically searching for relevant information within electronic documents 142 to produce a set of search results 146, and summarizing the search results 146 in a natural language representation for better understanding and consumption by a human reader. System 200 illustrates an AI/ML infrastructure and environment suitable for deploying AI/ML algorithms to support operations for the search manager 124.

As depicted in FIG. 2, the search manager 124 may comprise various software components to support AI/ML techniques, such as a data collector 202, a model trainer 204, a model evaluator 206 and a model inferencer 208. In general, the data collector 202 collects data from one or more document records 138 each comprising one or more document images 140. The document images 140 may comprise signed electronic documents or unsigned electronic documents. In some cases, the document images 140 may need to be converted between data formats for the data collection phase, such as between a PDF image to a text file, for example. The model trainer 204 receives as input the collected data and processes a portion of the collected data by an AI/ML algorithm to train a ML model. The model evaluator 206 evaluates and improves the trained ML model. The model inferencer 208 implements the trained ML model to receive as input new data, such as a search query 144, and generate one or more search results 146 on the new data, and output a result such as content from an electronic document 142, an Abstractive summary 148 of the content, links to the content in an electronic document 142 for rapid retrieval and viewing, or other post-solution activity. The search manager 124 and underlying components are described in more detail with reference to FIG. 3.

FIG. 3 illustrates an artificial intelligence architecture 300 suitable for use by the search manager 124 of the server device 102. The artificial intelligence architecture 300 is an example of a system suitable for implementing various artificial intelligence (AI) techniques and/or machine learning (ML) techniques to perform various document management tasks on behalf of the various devices of the systems 100, 200. AI is a science and technology based on principles of cognitive science, computer science and other related disciplines, which deals with the creation of intelligent machines that work and react like humans. AI is used to develop systems that can perform tasks that require human intelligence such as recognizing speech, vision and making decisions. AI can be seen as the ability for a machine or computer to think and learn, rather than just following instructions. ML is a subset of AI that uses algorithms to enable machines to learn from existing data and generate insights or predictions from that data. ML algorithms are used to optimize machine performance in various tasks such as classifying, clustering and forecasting. ML algorithms are used to create ML models that can accurately predict outcomes.

In general, the artificial intelligence architecture 300 may include various machine or computer components (e.g., circuit, processor circuit, memory, network interfaces, compute platforms, input/output (I/O) devices, etc.) for an AI/ML system that are designed to work together to create a pipeline that can take in raw data, process it, train an ML model 312, evaluate performance of the trained ML model 312, and deploy the tested ML model 312 in a production environment, and continuously monitor and maintain it.

The ML model 312 is a mathematical construct used to predict outcomes based on a set of input data. The ML model 312 is trained using large volumes of training data 328, and it can recognize patterns and trends in the training data 328 to make accurate predictions. The ML model 312 may be derived from an ML algorithm 326 (e.g., a neural network, decision tree, support vector machine, etc.). A data set is fed into the ML algorithm 326 which trains an ML model 312 to "learn" a function that produces mappings between a set of inputs and a set of outputs with a reasonably high accuracy. Given a sufficiently large enough set of inputs and outputs, the ML algorithm 326 finds the function for you. And this function may even be able to produce the correct output for input that it has not seen during training. The programmer (who has now earned the snazzy title of "data scientist") prepares the mappings, selects and tunes the machine learning algorithm, and evaluates the resulting model's performance. Once the model is sufficiently accurate on test data, it can be deployed for production use.

The ML algorithm 326 may comprise any ML algorithm suitable for a given AI task. Examples of ML algorithms may include supervised algorithms, unsupervised algorithms, or semi-supervised algorithms.

A supervised algorithm is a type of machine learning algorithm that uses labeled data to train a machine learning model. In supervised learning, the machine learning algorithm is given a set of input data and corresponding output data, which are used to train the model to make predictions or classifications. The input data is also known as the features, and the output data is known as the target or label. The goal of a supervised algorithm is to learn the relationship between the input features and the target labels, so that it can make accurate predictions or classifications for new, unseen data. Examples of supervised learning algorithms include: (1) linear regression which is a regression algorithm used to predict continuous numeric values, such as stock prices or temperature; (2) logistic regression which is a classification algorithm used to predict binary outcomes, such as whether a customer will purchase or not purchase a product; (3) decision tree which is a classification algorithm used to predict categorical outcomes by creating a decision tree based on the input features; or (4) random forest which is an ensemble algorithm that combines multiple decision trees to make more accurate predictions.

An unsupervised algorithm is a type of machine learning algorithm that is used to find patterns and relationships in a dataset without the need for labeled data. Unlike supervised learning, where the algorithm is provided with labeled training data and learns to make predictions based on that data, unsupervised learning works with unlabeled data and seeks to identify underlying structures or patterns. Unsupervised learning algorithms use a variety of techniques to discover patterns in the data, such as clustering, anomaly detection, and dimensionality reduction. Clustering algorithms group similar data points together, while anomaly detection algorithms identify unusual or unexpected data points. Dimensionality reduction algorithms are used to reduce the number of features in a dataset, making it easier to analyze and visualize. Unsupervised learning has many applications, such as in data mining, pattern recognition, and recommendation systems. It is particularly useful for tasks where labeled data is scarce or difficult to obtain, and where the goal is to gain insights and understanding from the data itself rather than to make predictions based on it.

Semi-supervised learning is a type of machine learning algorithm that combines both labeled and unlabeled data to improve the accuracy of predictions or classifications. In this approach, the algorithm is trained on a small amount of labeled data and a much larger amount of unlabeled data. The main idea behind semi-supervised learning is that labeled data is often scarce and expensive to obtain, whereas unlabeled data is abundant and easy to collect. By leveraging both types of data, semi-supervised learning can achieve higher accuracy and better generalization than either supervised or unsupervised learning alone. In semi-supervised learning, the algorithm first uses the labeled data to learn the underlying structure of the problem. It then uses this knowledge to identify patterns and relationships in the unlabeled data, and to make predictions or classifications based on these patterns. Semi-supervised learning has many applications, such as in speech recognition, natural language processing, and computer vision. It is particularly useful for tasks where labeled data is expensive or time-consuming to obtain, and where the goal is to improve the accuracy of predictions or classifications by leveraging large amounts of unlabeled data.

The ML algorithm 326 of the artificial intelligence architecture 300 may be implemented using various types of ML algorithms including supervised algorithms, unsupervised algorithms, semi-supervised algorithms, or a combination thereof. A few examples of ML algorithms include support vector machine (SVM), random forests, naive Bayes, K-means clustering, neural networks, and so forth. A SVM is an algorithm that can be used for both classification and regression problems. It works by finding an optimal hyperplane that maximizes the margin between the two classes. Random forests is a type of decision tree algorithm that is used to make predictions based on a set of randomly selected features. Naive Bayes is a probabilistic classifier that makes predictions based on the probability of certain events occurring. K-Means Clustering is an unsupervised learning algorithm that groups data points into clusters. Neural networks is a type of machine learning algorithm that is designed to mimic the behavior of neurons in the human brain. Other examples of ML algorithms include a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, a distributed artificial intelligence algorithm, and so forth. Embodiments are not limited in this context.

As depicted in FIG. 3, the artificial intelligence architecture 300 includes a set of data sources 302 to source data 304 for the artificial intelligence architecture 300. Data sources 302 may comprise any device capable generating, processing, storing or managing data 304 suitable for a ML system. Examples of data sources 302 include without limitation databases, web scraping, sensors and Internet of Things (IoT) devices, image and video cameras, audio devices, text generators, publicly available databases, private databases, and many other data sources 302. The data sources 302 may be remote from the artificial intelligence architecture 300 and accessed via a network, local to the artificial intelligence architecture 300 an accessed via a network interface, or may be a combination of local and remote data sources 302.

The data sources 302 may source difference types of data 304. For instance, the data 304 may comprise structured data from relational databases, such as customer profiles, transaction histories, or product inventories. The data 304 may comprise unstructured data from websites such as customer reviews, news articles, social media posts, or product specifications. The data 304 may comprise data from temperature sensors, motion detectors, and smart home appliances. The data 304 may comprise image data from medical images, security footage, or satellite images. The data 304 may comprise audio data from speech recognition, music recognition, or call centers. The data 304 may comprise text data from emails, chat logs, customer feedback, news articles or social media posts. The data 304 may comprise publicly available datasets such as those from government agencies, academic institutions, or research organizations. These are just a few examples of the many sources of data that can be used for ML systems. It is important to note that the quality and quantity of the data is critical for the success of a machine learning project. In one embodiment, for example, the data sources 302 may include the document records 138 managed by the system 100.

The data 304 can be in different formats such as structured, unstructured or semi-structured data. Structured data refers to data that is organized in a specific format or schema, such as tables or spreadsheets. Structured data has a well-defined set of rules that dictate how the data should be organized and represented, including the data types and relationships between data elements. Unstructured data refers to any data that does not have a predefined or organized format or schema. Unlike structured data, which is organized in a specific way, unstructured data can take various forms, such as text, images, audio, or video. Unstructured data can come from a variety of sources, including social media, emails, sensor data, and website content. Semi-structured data is a type of data that does not fit neatly into the traditional categories of structured and unstructured data. It has some structure but does not conform to the rigid structure of a traditional relational database. Semi-structured data is characterized by the presence of tags or metadata that provide some structure and context for the data.

The data sources 302 may be communicatively coupled to a data collector 202. The data collector 202 gathers relevant data 304 from the data sources 302. Once collected, the data collector 202 may use a pre-processor 306 to make the data 304 suitable for analysis. This involves data cleaning, transformation, and feature engineering. For instance, an electronic document 142 may be converted to text information, and the text information may be converted to word vectors. Data preprocessing is a critical step in ML as it directly impacts the accuracy and effectiveness of the model. The pre-processor 306 may receive the data 304 as input, process the data 304, and output pre-processed data 318 for storage in a database 308. The database 308 may comprise a hard drive, solid state storage, and/or random access memory.

The data collector 202 may be communicatively coupled to a model trainer 204. The model trainer 204 performs AI/ML model training, validation, and testing which may generate model performance metrics as part of the model testing procedure. The model trainer 204 may receive the pre-processed data 318 as input 310 or via the database 308. The model trainer 204 may implement a suitable ML algorithm 326 to train an ML model 312 on a set of training data 328 from the pre-processed data 318. The training process involves feeding the pre-processed data 318 into the ML algorithm 326 to produce or optimize an ML model 312. The training process adjusts its parameters until it achieves an initial level of satisfactory performance.

The model trainer 204 may be communicatively coupled to a model evaluator 206. After an ML model 312 is trained, the ML model 312 needs to be evaluated to assess its performance. This is done using various metrics such as accuracy, precision, recall, and F1 score. The model trainer 204 may output the ML model 312, which is received as input 310 or from the database 308. The model evaluator 206 receives the ML model 312 as input 314, and it initiates an evaluation process to measure performance of the ML model 312. The evaluation process may include providing feedback 320 to the model trainer 204, so that it may re-train the ML model 312 to improve performance in an iterative manner.

The model evaluator 206 may be communicatively coupled to a model inferencer 208. The model inferencer 208 provides AI/ML model inference output (e.g., predictions or decisions). Once the ML model 312 is trained and evaluated, it can be deployed in a production environment where it can be used to make predictions on new data. The model inferencer 208 receives the evaluated ML model 312 as input 316. The model inferencer 208 may use the evaluated ML model 312 to produce insights or predictions on real data, which is deployed as a final production ML model 312. The inference output of the ML model 312 is use case specific. The model inferencer 208 may also perform model monitoring and maintenance, which involves continuously monitoring performance of the search model 704 in the production environment and making any necessary updates or modifications to maintain its accuracy and effectiveness. The model inferencer 208 may provide feedback 320 to the data collector 202 to train or re-train the ML model 312. The feedback 320 may include model performance feedback information, which may be used for monitoring and improving performance of the ML model 312.

The model inferencer 208 may be implemented by various actors 324 in the artificial intelligence architecture 300, including the search manager 124 of the server device 102, for example. The actors 324 may use the deployed ML model 312 on new data to make inferences or predictions for a given task, and output an insight 334. The actors 324 may actually implement the model inferencer 208 locally, or may remotely receive outputs from the model inferencer 208 in a distributed computing manner. The actors 324 may trigger actions directed to other entities or to itself. The actors 324 may provide feedback 322 to the data collector 202 via the model inferencer 208. The feedback 322 may comprise data needed to derive training data, inference data or to monitor the performance of the ML model 312 and its impact to the network through updating of key performance indicators (KPIs) and performance counters.

As previously described with reference to FIGS. 1, 2, the systems 100, 200 may implement some or all of the artificial intelligence architecture 300 to support various use cases and solutions for various AI/ML tasks suitable for supporting or automating document management operations. In various embodiments, the artificial intelligence architecture 300 may be implemented by the search manager 124 of the server device 102 for the systems 100, 200. In one embodiment, for example, the search manager 124 may implement the artificial intelligence architecture 300 to train and deploy an ML model 312 as a neural network, as described in more detail with reference to FIG. 4. It may be appreciated that other use cases and solutions for AI/ML are possible as well, and embodiments are not limited in this context.

Figure 4:
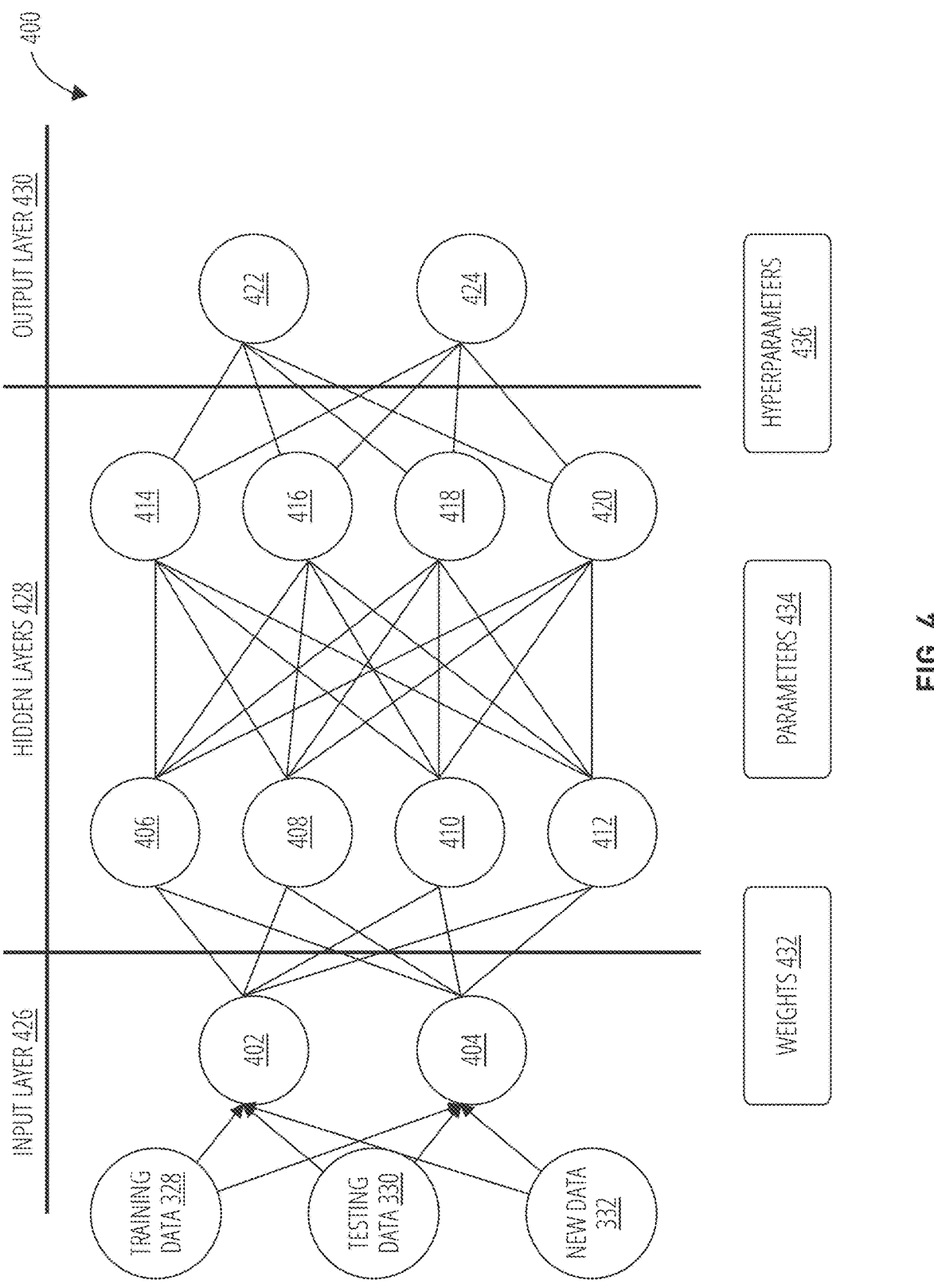
FIG. 4 illustrates an artificial neural network 400 in accordance with one embodiment.

FIG. 4 illustrates an embodiment of an artificial neural network 400. Neural networks, also known as artificial neural networks (ANNs) or simulated neural networks (SNNs), are a subset of machine learning and are at the core of deep learning algorithms. Their name and structure are inspired by the human brain, mimicking the way that biological neurons signal to one another.

Artificial neural network 400 comprises multiple node layers, containing an input layer 426, one or more hidden layers 428, and an output layer 430. Each layer may comprise one or more nodes, such as nodes 402 to 424. As depicted in FIG. 4, for example, the input layer 426 has nodes 402, 404. The artificial neural network 400 has two hidden layers 428, with a first hidden layer having nodes 406, 408, 410 and 412, and a second hidden layer having nodes 414, 416, 418 and 420. The artificial neural network 400 has an output layer 430 with nodes 422, 424. Each node 402 to 424 may comprise a processing element (PE), or artificial neuron, that connects to another and has an associated weight and threshold. If the output of any individual node is above the specified threshold value, that node is activated, sending data to the next layer of the network. Otherwise, no data is passed along to the next layer of the network.

In general, artificial neural network 400 relies on training data 328 to learn and improve accuracy over time. However, once the artificial neural network 400 is fine-tuned for accuracy, and tested on testing data 330, the artificial neural network 400 is ready to classify and cluster new data 332 at a high velocity. Tasks in speech recognition or image recognition can take minutes versus hours when compared to the manual identification by human experts.

Each individual node 402 to 424 is a linear regression model, composed of input data, weights, a bias (or threshold), and an output. The linear regression model may have a formula similar to Equation (1), as follows:

$$\Sigma wixi + \text{bias} = w1x1 + w2x2 + w3x3 + \text{bias} \qquad \text{EQUATION (1)}$$

$$\text{output} = f(x) = 1 \text{ if } \Sigma w1x1 + b >= 0; 0 \text{ if } \Sigma w1x1 + b < 0$$

Once an input layer 426 is determined, a set of weights 432 are assigned. The weights 432 help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming in the input of the next node. The process of passing data from one layer to the next layer defines the artificial neural network 400 as a feedforward network.

In one embodiment, the artificial neural network 400 leverages sigmoid neurons, which are distinguished by having values between 0 and 1. Since the artificial neural network 400 behaves similarly to a decision tree, cascading data from one node to another, having x values between 0 and 1 will reduce the impact of any given change of a single variable on the output of any given node, and subsequently, the output of the artificial neural network 400.

The artificial neural network 400 may have many practical use cases, like image recognition, speech recognition, text recognition or classification. The artificial neural network 400 may leverage supervised learning, or labeled datasets, to train the algorithm. As the model is trained, its accuracy may be measured using a cost (or loss) function. This is also commonly referred to as the mean squared error (MSE). An example of a cost function is shown in Equation (2), as follows:

$$\text{Cost Function} = MSE = \frac{1}{2m}\sum_{i=1}^{m}(\hat{y}_i - y_i)^2 \to \text{MIN} \qquad \text{EQUATION (2)}$$

Where i represents the index of the sample, y-hat is the predicted outcome, y is the actual value, and m is the number of samples.

Ultimately, the goal is to minimize the cost function to ensure correctness of fit for any given observation. As the model adjusts its weights and bias, it uses the cost function and reinforcement learning to reach the point of convergence, or the local minimum. The process in which the algorithm adjusts its weights is through gradient descent, allowing the model to determine the direction to take to reduce errors (or minimize the cost function). With each training example, the parameters 434 of the model adjust to gradually converge at the minimum.

In one embodiment, the artificial neural network 400 is feedforward, meaning it flows in one direction only, from input to output. However, the artificial neural network 400 may also be trained through backpropagation; that is, move in the opposite direction from output to input. Backpropagation allows calculation and attribution of errors associated with each neuron 402 to 424, thereby allowing adjustment to fit the parameters 434 of the model(s) appropriately.

The artificial neural network 400 may be implemented as different neural networks depending on a given task. Neural networks can be classified into different types, which are used for different purposes. The artificial neural network 400 may be implemented as a feedforward neural network, or multi-layer perceptrons (MLPs), comprised of an input layer 426, hidden layers 428, and an output layer 430. While these neural networks are also commonly referred to as MLPs, they are actually comprised of sigmoid neurons, not perceptrons, as most real-world problems are nonlinear. Trained data 304 usually is fed into these models to train them, and they are the foundation for computer vision, natural language processing, and other neural networks. The artificial neural network 400 may also be implemented as a convolutional neural network (CNN). A CNN is similar to feedforward networks, but usually utilized for image recognition, pattern recognition, and/or computer vision. These networks harness principles from linear algebra, particularly matrix multiplication, to identify patterns within an image. The artificial neural network 400 may further be implemented as a recurrent neural network (RNN). A RNN is identified by feedback loops. The RNN learning algorithms are primarily leveraged when using time-series data to make predictions about future outcomes, such as stock market predictions or sales forecasting. The artificial neural network 400 may be implemented as any type of neural network suitable for a given EDMP of system 100, and the MLP, CNN, and RNN are merely a few examples. Embodiments are not limited in this context.

The artificial neural network 400 may have a set of associated parameters 434. There are a number of different parameters that must be decided upon when designing a neural network. Among these parameters are the number of layers, the number of neurons per layer, the number of training iterations, and so forth. Some of the more important parameters in terms of training and network capacity are a number of hidden neurons parameter, a learning rate parameter, a momentum parameter, a training type parameter, an Epoch parameter, a minimum error parameter, and so forth. The artificial neural network 400 may have other parameters 434 as well. Embodiments are not limited in this context.

In some cases, the artificial neural network 400 may also be implemented as a deep learning neural network. The term deep learning neural network refers to a depth of layers in a given neural network. A neural network that has more than three layers—which would be inclusive of the inputs and the output—can be considered a deep learning algorithm. A neural network that only has two or three layers, however, may be referred to as a basic neural network. A deep learning neural network may tune and optimize one or more hyperparameters 436. A hyperparameter is a parameter whose values are set before starting the model training process. Deep learning models, including convolutional neural network (CNN) and recurrent neural network (RNN) models can have anywhere from a few hyperparameters to a few hundred hyperparameters. The values specified for these hyperparameters can impact the model learning rate and other regulations during the training process as well as final model performance. A deep learning neural network may use hyperparameter optimization algorithms to automatically optimize models. The algorithms used include Random Search, Tree-structured Parzen Estimator (TPE) and Bayesian optimization based on the Gaussian process. These algorithms are combined with a distributed training engine for quick parallel searching of the optimal hyperparameter values.

Figure 5:
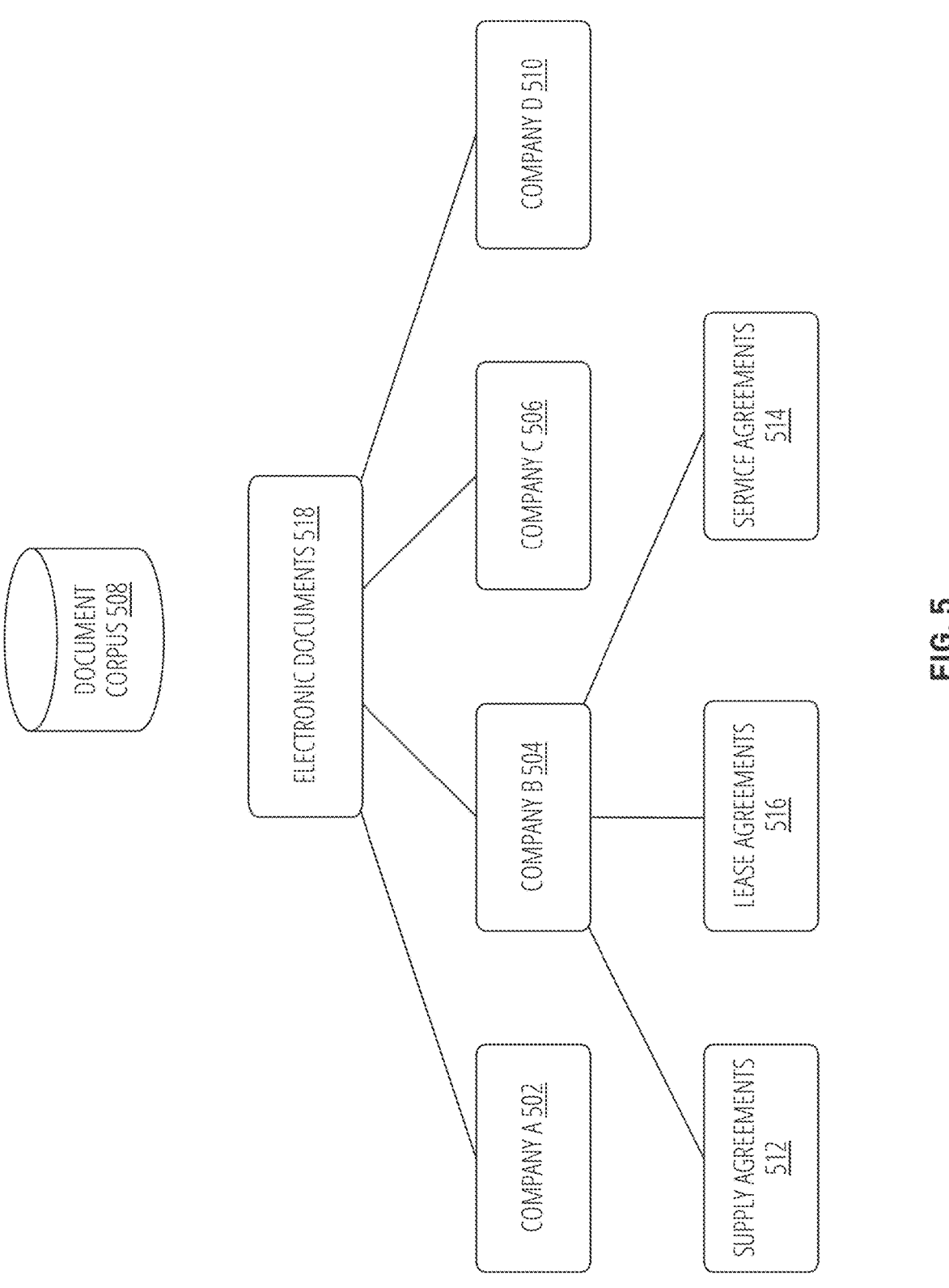
FIG. 5 illustrates a document corpus 508 in accordance with one embodiment.

FIG. 5 illustrates an example of a document corpus 508 suitable for use by the search manager 124 of the server device 102. In general, a document corpus is a large and structured collection of electronic documents, such as text documents, that are typically used for natural language processing (NLP) tasks such as text classification, sentiment analysis, topic modeling, and information retrieval. A corpus can include a variety of document types such as web pages, books, news articles, social media posts, scientific papers, and more. The corpus may be created for a specific domain or purpose, and it may be annotated with metadata or labels to facilitate analysis. Document corpora are commonly used in research and industry to train machine learning models and to develop NLP applications.

As depicted in FIG. 5, the document corpus 508 may include information from electronic documents 518 derived from the document records 138 stored in the data store 126. The electronic documents 518 may include any electronic document having metadata such as STME 132 suitable for receiving an electronic signature, including both signed electronic documents or unsigned electronic documents. Different sets of the electronic documents 518 of the document corpus 508 may be associated with different entities. For example, a first set of electronic documents 518 is associated with a company A 502. A second set of electronic documents 518 is associated with a company B 504. A third set of electronic documents 518 is associated with a company C 506. A fourth set of electronic documents 518 is associated with a company D 510. Although some embodiments discuss the document corpus 508 having electronic documents 518, it may be appreciated that the document corpus 508 may have unsigned electronic document as well, which may be mined using the AI/ML techniques described herein. Embodiments are not limited in this context.

Each set of electronic documents 518 associated with a defined entity may include one or more subsets of the electronic documents 518 categorized by document type. For instance, the second set of electronic documents 518 associated with company B 504 may have a first subset of electronic documents 518 with a document type for supply agreements 512, a second subset of electronic documents 518 with a document type for lease agreements 516, and a third subset of electronic documents 518 with a document type for service agreements 514. In one embodiment, the sets and subsets of electronic documents 518 may be identified using labels manually assigned by a human operator, such as metadata added to a document record for a signed electronic document created in a document management system, or feedback from a user of the system 100 or the system 200 during a document generation process. In one embodiment, the sets and subsets of electronic documents 518 may be unlabeled. In such cases, the search manager 124 may use the search model 704 to identify a defined entity or a document type for a defined entity.

FIG. 6 illustrates an example of an electronic document 518. An electronic document 518 may include different information types that collectively form a set of document components 602 for the electronic document 518. The document components 602 may comprise, for example, one or more audio components 604, text components 606, image components 608, or table components 610. Each document component 602 may comprise different content types. For example, the text components 606 may comprise structured text 612, unstructured text 614, or semi-structured text 616.

Structured text 612 refers to text information that is organized in a specific format or schema, such as words, sentences, paragraphs, sections, clauses, and so forth. Structured text 612 has a well-defined set of rules that dictate how the data should be organized and represented, including the data types and relationships between data elements.

Unstructured text 614 refers to text information that does not have a predefined or organized format or schema. Unlike structured text 612, which is organized in a specific way, unstructured text 614 can take various forms, such as text information stored in a table, spreadsheet, figures, equations, header, footer, filename, metadata, and so forth.

Semi-structured text 616 is text information that does not fit neatly into the traditional categories of structured and unstructured data. It has some structure but does not conform to the rigid structure of a specific format or schema. Semi-structured data is characterized by the presence of context tags or metadata that provide some structure and context for the text information, such as a caption or description of a figure, name of a table, labels for equations, and so forth.

In various embodiments, the AI/ML algorithms and models used herein may operate text information to search the various document components 602 of electronic documents 518 in response to a search query 144 to generate a set of search results 146 with document content from the document components 602. A portion of the search results 146 may include an Abstractive summary 148 which is a summary of some of the document content stored in document components 602. Although various embodiments are described as searching for text components 606 in response to a text based search query 144, it may be appreciated that the AI/ML algorithms may also use other modalities, such as images, video or audio information to generate search results 146, including an Abstractive summary 148. Embodiments are not limited in this context.

Figure 7:
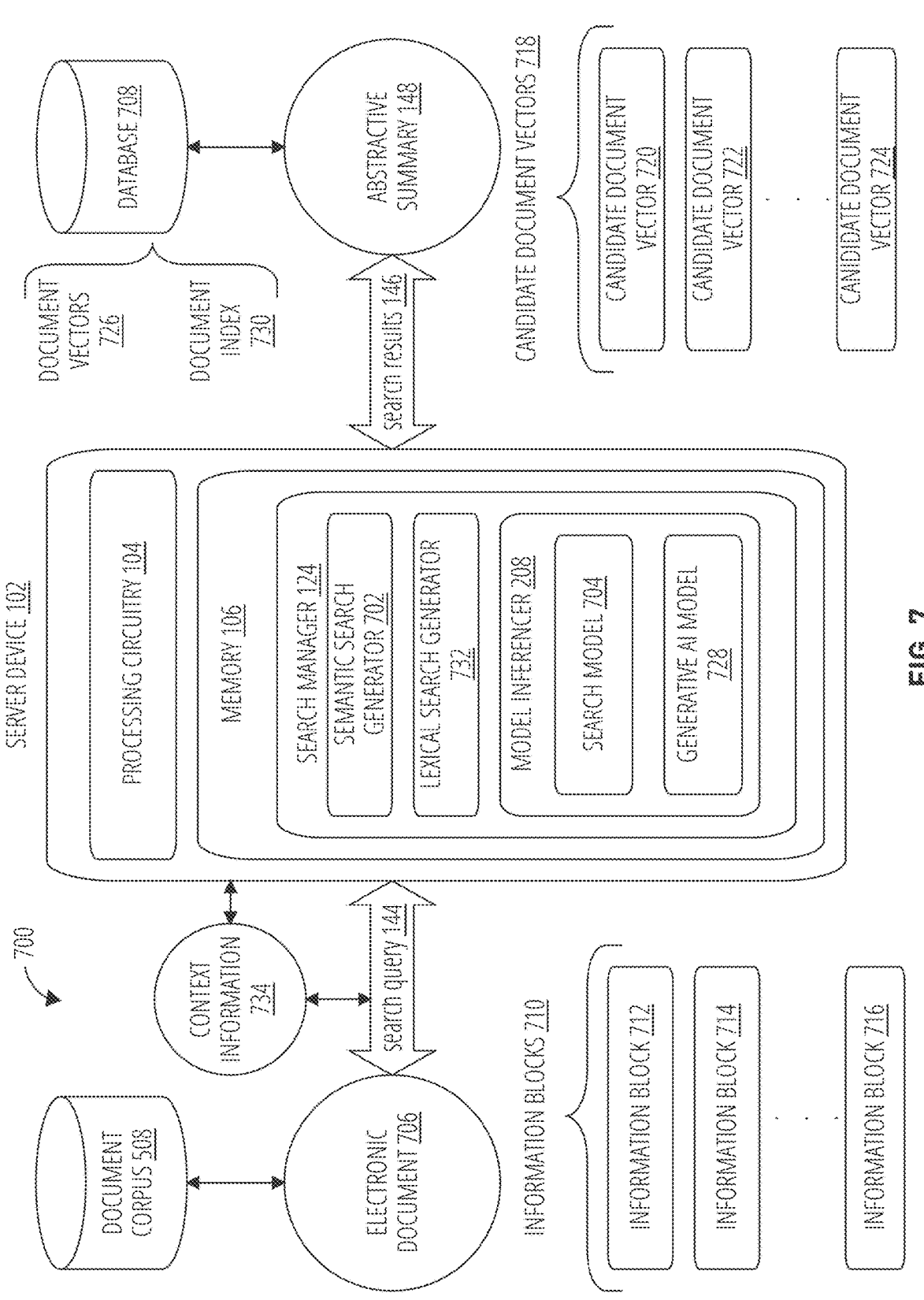
FIG. 7 illustrates an apparatus 700 in accordance with one embodiment.

FIG. 7 illustrates an apparatus 700. The apparatus 700 may comprise an example implementation for the server device 102. The server device 102 may have access to a collection of electronic documents from a document corpus 508, including a representative electronic document 706. The server device 102 may also have access to a set of document vectors 726 stored in a database 708. The document vectors 726 may be contextualized embeddings of document content from the collection of electronic documents of the document corpus 508, such as the electronic document 706, for example. The document vectors 726 may be indexed and stored as a document index 730 to facilitate search and retrieval operations.

In some cases, the document vectors 726 may include or make reference to text components 606 for an electronic document 706. Alternatively, the text components 606 may be encoded into a different format other than a vector, such as text strings, for example. This may allow formation of a search index suitable for lexical searching, such as by lexical search generator 732.

The document corpus 508 may store one or more electronic documents, such as an electronic document 706. Examples for the electronic document 706 may include document images 140, signed electronic documents 142 or unsigned electronic documents stored in the form of document records 138. In some embodiments, the document corpus 508 may be proprietary and confidential in nature and associated with a particular defined entity, such as an individual, a business, a business unit, a company, an organization, an enterprise, or other defined legal or business structure.

The server device 102 may implement a search manager 124. The search manager 124 may implement a set of improved search tools and algorithms to perform lexical searching, semantic searching, or a combination of both. In one embodiment, for example, the search manager 124 may implement a semantic search generator 702 to perform semantic searches for a user. In one embodiment, for example, the search manager 124 may optionally implement a lexical search generator 732 to perform lexical searches for a user. The search manager 124 may use the lexical search generator 732 to perform lexical searching in response to a search query 144. The search manager 124 may use the semantic search generator 702 to perform semantic searching in response to a search query 144. In one embodiment, the search manager 124 may use the lexical search generator 732 to generate a first set of lexical search results 146, and the semantic search generator 702 to iterate over the first set of lexical search results 146 to generate a second set of semantic search results 146. Embodiments are not limited in this context.

As depicted in FIG. 7, the search manager 124 may implement a model inferencer 208, as described with reference to FIG. 3, locally as part of the server device 102. Additionally or alternatively, the model inferencer 208 may be implemented on a device separate from the server device 102. In the latter case, the search manager 124 may access inferencing services provided by the model inferencer 208 remotely via a network or a set of application program interfaces (APIs).

The model inferencer 208 may implement various machine learning models trained and managed in accordance with the artificial intelligence architecture 300, such as ML model 312, for example. In one embodiment, the ML model 312 may comprise a search model 704 trained to transform document content contained within an electronic document 706 into semantically searchable document content. For example, the search model 704 may implement an artificial neural network 400, such as a recurrent neural network (RNN) for an Embeddings from Language Models (ELMo), Bidirectional Encoder Representations from Transformers (BERT), a BERT variant, and so forth. In one embodiment, the ML model 312 may comprise a generative AI model 728 to implement generative AI techniques to assist in summarizing some or all of the search results in a natural language such as a human language for better readability and understanding by a human reader. For example, the generative AI model 728 may implement a language model such as a generative pre-trained transformer (GPT) language model, among others. It may be appreciated that the model inferencer 208 may implement other types of ML models 312 to support search operations as desired for a given set of design constraints, such as search speed, size of data sets, number of electronic documents, compute resources, memory resources, network resources, device resources, and so forth. Embodiments are not limited in this context.

The search manager 124 may use the ML models of the model inferencer 208 to perform AI/ML inferencing operations in an offline phase and an online phase. In an offline phase, the search manager 124 may encode or transform a set of electronic documents 706 to create a set of contextualized embeddings (e.g., sentence embeddings) representative of information or document content contained within each electronic document 706. In an online phase, the search manager 124 may perform search retrieval and relevant result summarization operations on the contextualized embeddings for each electronic document 706. For instance, the search manager 124 may receive a search query 144, encode it to a contextualized embedding in real-time, and leverage vector search to retrieve search results 146 with semantically similar document content within an electronic document 706. The search manager 124 may prepare a prompt with both the search query 144 and some or all of the search results 146 (e.g., the top k sections) from the electronic document 706, and send it to the generative AI model 728 to create an Abstractive summary 148. The server device 102 may surface the abstractive summary 148 and/or the search results 146 in a graphical user interface (GUI) of a client device, such as client devices 112 or client devices 116.

In an offline phase, the search manager 124 may encode a set of electronic documents 706 to create a set of contextualized embeddings (e.g., sentence embeddings) for document content contained within each electronic document 706. A contextualized embedding refers to a type of word representation in natural language processing that takes into account the context in which a word appears. Unlike traditional static word embeddings, which represent each word with a fixed vector, contextualized embeddings vary depending on the specific context in which the word is used. Contextualized embeddings are typically generated by training deep neural networks, such as recurrent neural networks (RNNs) or transformers, on large amounts of text data. These models learn to produce a unique embedding for each occurrence of a word in a sentence, taking into account the surrounding words and the overall meaning of the sentence. Contextualized embeddings have proven to be highly effective in a wide range of natural language processing tasks, including text classification, question answering, and machine translation, among others. Popular examples of contextualized embeddings include Embeddings from Language Models (ELMo), Bidirectional Encoder Representations from Transformers (BERT), a generative pre-trained transformer (GPT) language model, transformer-XL, among others.

A general example illustrates the concept of contextualized embeddings. Consider the word "bank", which can have multiple meanings depending on the context. In the sentence "I deposited my paycheck at the bank", the word "bank" refers to a financial institution. But in the sentence "I went for a walk along the bank of the river", the word "bank" refers to the edge of a body of water. A contextualized embedding would take into account the different meanings of "bank" in these two sentences and produce different embeddings for each occurrence of the word. This would allow downstream natural language processing models to better understand the meaning of the word in context and make more accurate predictions.

A format of a contextualized embedding depends on the specific model used to generate it. In general, contextualized embeddings are represented as high-dimensional vectors of real numbers, where each dimension corresponds to a particular feature or aspect of the word's context. For example, the Embeddings from Language Models (ELMo) model generates contextualized embeddings as a concatenation of the output from multiple layers of a bidirectional Long Short-Term Memory (LSTM) network. Each LSTM layer captures information about the word's context at a different level of granularity, and the final contextualized embedding is a weighted combination of the embeddings from all the layers. On the other hand, Bidirectional Encoder Representations from Transformers (BERT) generates contextualized embeddings using a multi-layer transformer network. In this case, the contextualized embedding for a word is a fixed-length vector that represents the entire sequence of words in the input sentence, with the specific position of the word encoded as a positional embedding. The exact format of a contextualized embedding can also vary depending on the specific downstream task for which it is being used. For example, a classification model may take the entire contextualized embedding as input, while a sequence labeling model may use only a subset of the dimensions corresponding to the specific position of the word in the input sequence.

In one embodiment, for example, the search model 704 may implement a BERT based encoder. BERT is a transformer-based neural network architecture that is widely used for generating contextualized embeddings in natural language processing tasks. The main components of the BERT model are the encoders, which are responsible for generating the contextualized embeddings for each token in the input sequence. BERT uses a multi-layer bidirectional transformer encoder, which is a variant of the self-attention mechanism. The transformer encoder consists of multiple layers, where each layer contains multiple self-attention sub-layers and feedforward neural network sub-layers. The self-attention sub-layers compute the attention scores between all pairs of input tokens, while the feedforward sub-layers apply a non-linear transformation to the outputs of the self-attention sub-layers. A key innovation in a BERT architecture is that it uses a pre-training strategy to learn high-quality contextualized embeddings. Specifically, BERT is pre-trained on a large corpus of unlabeled text data using two objectives: (1) masked language modeling; and (2) next sentence prediction. During the masked language modeling objective, a certain percentage of the input tokens are randomly masked, and the model is trained to predict the original values of the masked tokens based on their surrounding context. This encourages the model to learn meaningful representations for each token that take into account the context in which it appears. During the next sentence prediction objective, the model is trained to predict whether two input sentences are consecutive or not. This encourages the model to learn relationships between sentences and better capture the global coherence of natural language. After pre-training, the BERT model can be fine-tuned on downstream natural language processing tasks, such as text classification, named entity recognition, and question answering, among others. During fine-tuning, the pre-trained BERT encoders are used as a feature extractor, and the output of the last encoder layer corresponding to each token is used as the contextualized embedding for that token in the downstream task.

In one embodiment, the BERT model is fine-tuned to support search tasks performed by the search manager 124, such as encoding a set of electronic documents 508. The BERT model may be trained on the electronic documents 508 stored in the document corpus 508, which may be specifically associated with a defined entity, such as a customer or client of the system 100 or system 200. Consequently, the search model 704 and the generative AI model 728 are trained on confidential and proprietary information associated with a defined entity in order to perform custom and highly specialized inferencing operations and tasks for the defined entity.

The search model 704 may implement a BERT encoder to encode a sequence of sentences within a document or an entire document. However, BERT encodes each token (e.g., a word or subword) in the input sequence independently and produces a separate contextualized embedding for each token. Therefore, to encode an entire document or a sequence of sentences within a document, the search model 704 needs to aggregate the embeddings of individual tokens in a meaningful way. One way to aggregate the embeddings is to take the mean or the maximum of the embeddings across all tokens in the sequence. This can be useful for tasks such as document content classification or sentiment analysis, where the search model 704 assigns a label or score to a portion of a document or the entire document based on its content. Another way to aggregate the embeddings is to use an attention mechanism to weight the importance of each token based on its relevance to the task at hand. This can be useful for tasks such as question answering or summarization, where the search model 704 is tuned to focus on the most informative parts of the input sequence. There are also more sophisticated ways to aggregate the embeddings, such as hierarchical pooling or recurrent neural networks, that take into account the structure of the document or sequence. The specific aggregation method depends on the task and the characteristics of the input data, and may require some experimentation to find the most effective approach. Embodiments are not limited in this context.

In the offline phase, the search manager 124 may encode a set of electronic documents 706 to create a set of contextualized embeddings (e.g., sentence embeddings) for information or document content contained within each electronic document 706. As depicted in FIG. 7, an electronic document 706 may comprise a set of N information blocks 710, where N is any positive integer. FIG. 7 depicts an example set of N information blocks 710 that includes an information block 712, an information block 714 and an information block 716 (i.e., N=3). Each of the information blocks 710 may comprise a defined amount of textual information of any feature size suitable for a given token, such as an n-gram, a word, a sentence, a phrase, a paragraph, a section, and so forth. It may be appreciated that N=3 is by way of example and not limitation. The search manager 124 may use the search model 704 to encode the information blocks 710 into corresponding contextualized embeddings depicted as a set of M document vectors 726, where M represents any positive integer.

The search manager 124 may store the document vectors 726 in a database 708, and index the document vectors 726 into a searchable document index 730. The document index 730 allows for rapid retrieval of relevant document vectors 726 by the search manager 124 during the online search phase. The document index 730 may comprise any data structure that stores these embeddings in a way that allows for efficient retrieval. For example, the document index 730 may be implemented as a hash table or a tree structure to index the embeddings by the words or phrases they represent.

In one embodiment, for example, the document index 730 may be implemented as an inverted index. An inverted index is a data structure used to efficiently search through and retrieve information from a large corpus of text. It is commonly used in search engines and other text processing applications. In an inverted index, each term in the corpus is associated with a list of documents or text passages where that term appears. This is the opposite of a forward index, which associates each document with a list of terms that appear in it. For example, given a corpus of news articles, assume an inverted index is created for the term "climate change". An indexer would go through each article in the corpus and create an entry in the index for "climate change", listing the article or articles where that term appears. The entry might look something like this: "climate change":

article1, article2, article5. When a user performs a search for "climate change", the search engine can use the inverted index to quickly retrieve a list of all the articles that contain that term, without having to search through the entire corpus. This makes the search process much faster and more efficient. Inverted indexes can also be used to support more advanced search features, such as Boolean queries (e.g., "climate change AND renewable energy"), phrase queries (e.g., "climate change mitigation"), and ranking algorithms that take into account factors like term frequency and document relevance. Overall, an inverted index is a powerful tool for managing large amounts of text data and enabling efficient search and retrieval of information.

In the online phase, the search manager 124 may perform two general tasks: (1) search retrieval; and (2) relevant result summarization. The search manager 124 may receive a search query 144, encode it to a contextualized embedding in real-time, and leverage vector search to retrieve search results 146 with semantically similar document content within an electronic document 706.

For search retrieval, the search manager 124 may receive a search query 144 to search for information within an electronic document 142 by a cloud search service, such as an online electronic document management system of system 100 or system 200. The search query 144 may comprise any free form text in a natural language representation of a human language. The search manager 124 may use the search model 704 to generate a contextualized embedding for the search query 144 to form a search vector. As previously discussed, a contextualized embedding may comprise a vector representation of a sequence of words in the search query 144 that includes contextual information for the sequence of words.

By way of example, assume the search model 704 is a BERT based encoder tasked with generating a contextualized embedding for the word "bank." A user may enter a search query 144 such as an input sentence: "I deposited my paycheck at the bank." Note the position of the word "bank" in the input sentence is 6. The search model 704 may receive the search query 144 as input, and output a contextualized embedding for "bank" as $[-0.731, 0.296, 0.573, \ldots, 0.154, -0.756, 0.362]$. The example embedding is a 768-dimensional vector that represents the contextualized meaning of the word "bank" in the input sentence. The values in the vector are real numbers that capture various aspects of a context for the word, such as the presence of other words in the sentence and their relationship to each other. The specific value for the 6th dimension of the vector corresponds to the position of the word "bank" in the input sentence.

Additionally, or alternatively, the search query 144 may be modified or expanded using context information 734. The context information 734 may be any information that provides some context for the search query 144. For example, the context information 734 may comprise a previous search query 144 by the same user, a search query 144 submitted by other users, or prior search results 146 from a previous search query 144. The context information 734 may allow the user to build search queries in an iterative manner, drilling down on more specific search questions in follow-up to reviewing previous search results 146. The context information 734 may also comprise metadata for the electronic document 706 (e.g., signatures, STME, marker elements, document length, document type, etc.), the user generating the search query 144 (e.g., demographics, location, interests, business entity, etc.), a device used to generate the search query 144 (e.g., capabilities, compute resources, memory resources, I/O devices, screen size, interfaces, etc.), sensors (e.g., temperature, accelerometers, altitude, proximity, etc.), and any other context information 734 that may be suitable for further refining the search query 144 (e.g., using search term expansion techniques).

The search manager 124 may search a document index 730 of contextualized embeddings for the electronic document 706 with the search vector, which is itself a contextualized embedding of the same type as those stored in the document index 730. Each contextualized embedding may comprise a vector representation of a sequence of words in the electronic document that includes contextual information for the sequence of words. The search process may produce a set of search results 146. The search results 146 may include a set of P candidate document vectors 718, where P is any positive integer. The search results 146 may include candidate document vectors 718 that are semantically similar to the search vector of the search query 144. FIG. 7 depicts an example set of P candidate document vectors 718 that includes a candidate document vector 720, a candidate document vector 722 and a candidate document vector 724 (i.e., P=3). It may be appreciated that P=3 is by way of example and not limitation.

In some embodiments, as with the document vectors 726, the candidate document vectors 718 may include or make reference to text components 606 for an electronic document 706. Alternatively, the text components 606 may be encoded into a different format other than a vector, such as text strings, for example.

More particularly, to search for content within an electronic document 706 using contextualized embeddings, the search manager 124 uses the search model 704 to encode the electronic document 706 during the offline phase. The search model 704 implements BERT to generate a sequence of contextualized embeddings, one for each token in the electronic document 706. In one embodiment, for example, the search model 704 may generate sentence-level contextualized embeddings. Similarly, the search manager 124 may use the search model 704 to encode a search query 144 using BERT to generate a contextualized embedding for the search query 144 in a manner similar to generating the document vectors of the electronic document 706. The search model 704 can then aggregate the embeddings of the document tokens using an attention mechanism to weight the importance of each token based on its relevance to the query. Specifically, the search model 704 can compute the attention scores between the query embedding and each document token embedding using the dot product or the cosine similarity.

The search model 704 may normalize the scores using a softmax function. Softmax is a mathematical function that is commonly used in machine learning and neural networks. It is used to convert a vector of real numbers into a probability distribution, where each element in the vector represents the probability of a particular outcome. More specifically, the softmax function takes as input a vector of scores or logits, which represent the unnormalized probabilities of each possible outcome. The function then applies an exponential operation to each score, and normalizes the resulting values so that they add up to 1. This produces a probability distribution over the possible outcomes.

Once the attention scores are normalized using a softmax function, the resulting attention weights can be used to compute a weighted sum of the document token embeddings, where the weights represent the importance of each token for the query. The search model 704 can then compute the similarity scores between the query embedding and the aggregated document embedding using the dot product or the cosine similarity. The resulting scores can be ranked in descending order or ascending order to retrieve the most relevant content within the document.

Alternatively, the search model 704 can use a pre-built search engine or information retrieval system that leverages contextualized embeddings to perform content-based search within a document. These systems typically use more advanced techniques for encoding, aggregating, and ranking embeddings to optimize search performance and accuracy.

One example of a pre-built search engine that uses contextualized embeddings for content-based search is Elasticsearch. Elasticsearch is an open-source search engine that provides a distributed, scalable, and efficient search and analytics platform. It uses the concept of inverted indices to enable fast full-text search and supports a wide range of search queries and aggregations. Elasticsearch also provides a plugin called Elasticsearch Vector Scoring, which enables the use of dense vector embeddings for similarity search. This plugin can be used to index and search documents based on their dense vector embeddings, which can be generated using BERT or other contextualized embedding models. To use Elasticsearch for content-based search with dense vectors, the search model 704 indexes the documents and their embeddings using the Elasticsearch Vector Scoring plugin. The search manager 124 can then search for similar documents by specifying a query embedding and using the cosine similarity as the similarity metric. Elasticsearch will return the top matching documents based on their similarity scores. Elasticsearch also provides various options for customizing the indexing, searching, and scoring of the embeddings, as well as integrating with other natural language processing tools and frameworks.

Another example of a pre-built engine that uses contextualized embeddings for content-based search is Azure Cognitive Search made by Microsoft® Corporation. Azure Cognitive Search utilizes semantic search, which is a collection of query-related capabilities that bring semantic relevance and language understanding to search results. Semantic search is a collection of features that improve the quality of search results. When enabled by the search manager 124, such as a cloud search service, semantic search extends the query execution pipeline in two ways. First, it adds secondary ranking over an initial result set, promoting the most semantically relevant results to the top of the list. For instance, the search manager 124 may use the lexical search generator 732 to perform a lexical full-text search to produce and rank a first set of search results 146. The search manager 124 may then use the semantic search generator 702 to perform a semantic search that does a semantic re-ranking, which uses the context or semantic meaning of a search query 144 to compute a new relevance score over the first set of search results 146. Second, it extracts and returns captions and answers in the response, which the search manager 124 can render on a search page to improve user search experience. The semantic search generator 702 extracts sentences and phrases from an electronic document 706 that best summarize the content, with highlights over key passages for easy scanning. Captions that summarize a result are useful when individual content fields are too dense for the results page. Highlighted text can be used to elevate the most relevant terms and phrases so that users can quickly determine why a match was considered relevant. The semantic search generator 702 may also provide semantic answers, which is an optional and additional substructure returned from a semantic query. It provides a direct answer to a query that looks like a question.

In one embodiment, the semantic search generator 702 may implement Azure Cognitive Search to perform semantic searching and perform semantic ranking. Semantic ranking looks for context and relatedness among terms, elevating matches that make more sense given the search query 144. Language understanding finds summarizations or captions and answers within document content and includes them in the response, which can then be rendered on a search results page for a more productive search experience. Pre-trained models are used for summarization and ranking. To maintain the fast performance that users expect from search, semantic summarization and ranking are applied to a set number of results, such as the top 50 results, as scored by the default scoring algorithm. Using those results as the document corpus, semantic ranking re-scores those results based on the semantic strength of the match.

The semantic search generator 702 may use a particular order of operations. Components of the semantic search generator 702 extend the existing query execution pipeline in both directions. If the search model 704 enables spelling correction, the speller corrects typos at query onset, before terms reach the search engine. Query execution proceeds as usual, with term parsing, analysis, and scans over the inverted indexes. The search model 704 retrieves documents using token matching, and scores the results using a default scoring algorithm. Scores are calculated based on the degree of linguistic similarity between query terms and matching terms in the index. If defined, scoring profiles are also applied at this stage. Results are then passed to the semantic search subsystem.

In the preparation step, the document corpus returned from the initial result set is analyzed at the sentence and paragraph level to find passages that summarize each document. In contrast with keyword search, this step uses machine reading and comprehension to evaluate the content. Through this stage of content processing, a semantic query returns captions and answers. To formulate them, semantic search uses language representation to extract and highlight key passages that best summarize a result. If the search query is a question—and answers are requested—the response will also include a text passage that best answers the question, as expressed by the search query. For both captions and answers, existing text is used in the formulation. The semantic models typically do not compose new sentences or phrases from the available content, nor does it apply logic to arrive at new conclusions. In one embodiment, the system does not return content that doesn't already exist. Results are then re-scored based on the conceptual similarity of query terms. To use semantic capabilities in queries, the search model 704 may optionally need to make small modifications to the search query 144, such as adding an information field with a parameter indicating a type of search, such as "lexical" or "semantic". However, no extra configuration or reindexing is typically required.

Once a final set of search results 146 is obtained, the search manager 124 may summarize one or more of the matching candidate document vectors 718 as an Abstractive summary 148. The search manager 124 may prepare a natural language generation (NLG) request. The NLG request is a prompt, generated via prompt engineering, that includes both the search query 144 and the top k sections of the electronic document 706, where k represents any positive integer. The search manager 124 may send the NLG request to the generative AI model 728 to create an Abstractive summary 148. The search manager 124 may implement or access a generative AI model 728 for the model inferencer 208. The generative AI model 728 uses a large language module (LLM) to assist in summarizing the search results 146 to produce an Abstractive summary 148. The generative AI may provide an Abstractive summary 148 of the search results 146 relevant to a given search query 144.

As previously described, an Abstractive summary 148 is a type of summary that is created by generating new text that captures the main points and ideas of the original content in a more concise and readable format. Unlike extractive summaries, which simply select and condense existing text, abstractive summaries use natural language processing (NLP) and machine learning algorithms to create new text that conveys the essence of the original content in a more coherent and natural way. Abstractive summaries are particularly useful for summarizing long and complex documents, such as research papers, news articles, and legal documents, where extracting a summary directly from the text may be difficult or result in a summary that is too long or difficult to read. By generating a new summary that captures the most important information and ideas from the original content in a more readable format, abstractive summaries can help readers quickly understand and digest the key takeaways without having to read the entire document. As a result, the abstractive summary 148 may ensure information returned in a search result is not missed and actionable, which is particularly useful for large documents with multiple sections complex terminology, typically found in the legal, technical and business industry.

Figure 8:
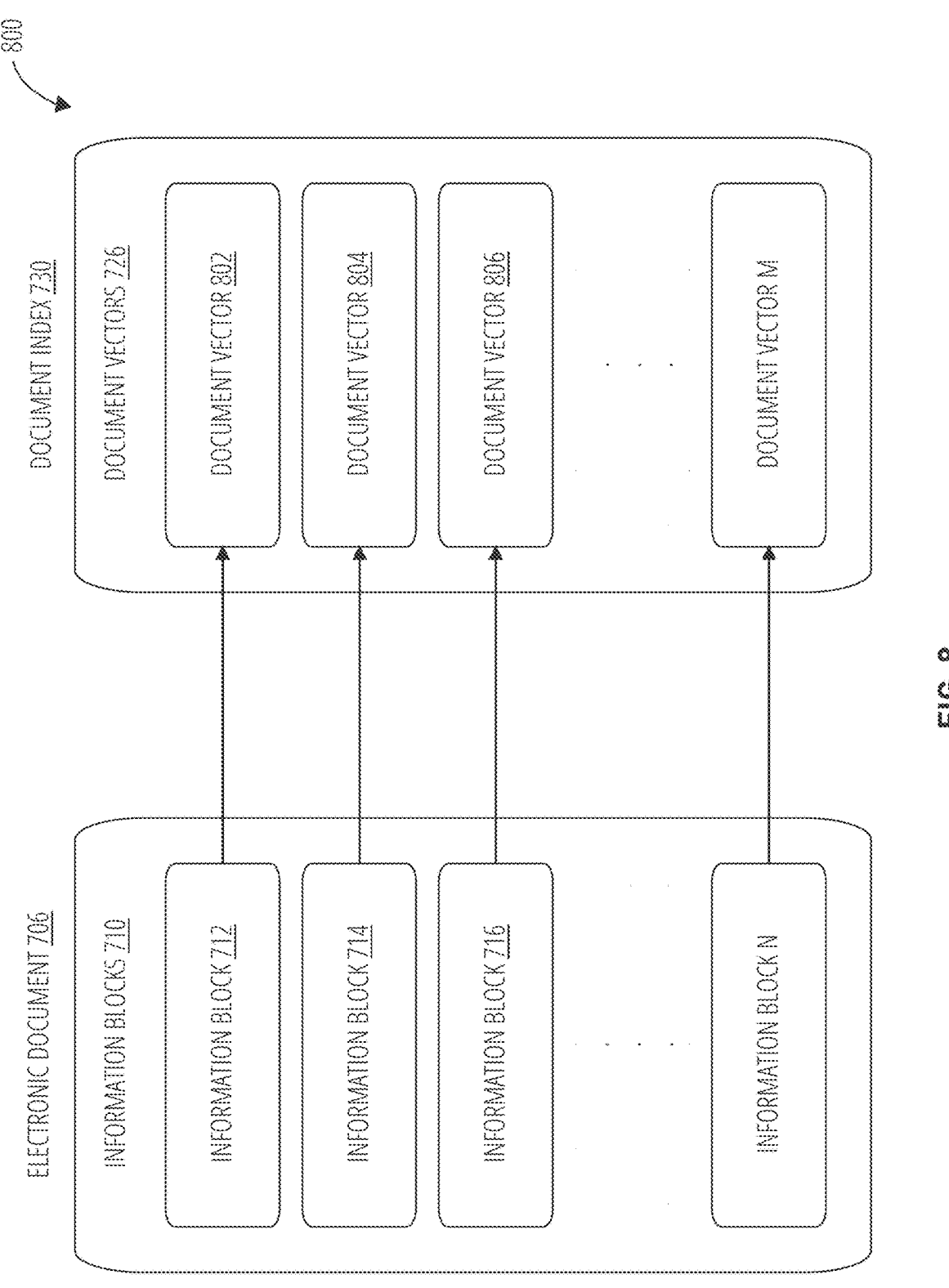
FIG. 8 illustrates an operating environment 800 in accordance with one embodiment.

FIG. 8 illustrates an operating environment 800. The operating environment 800 illustrates an example of encoding an electronic document 706 into a set of document vectors 726.

As previously discussed, in the offline phase, the search manager 124 may encode a set of electronic documents 706 to create a set of contextualized embeddings (e.g., sentence embeddings) for information or document content contained within each electronic document 706. As depicted in FIG. 8, an electronic document 706 may comprise a set of N information blocks 710, where N is any positive integer. FIG. 7 depicts an example set of N information blocks 710 that includes an information block 712, an information block 714 and an information block 716 (i.e., N=3). Each of the information blocks 710 may comprise a defined amount of textual information of any feature size suitable for a given token, such as an n-gram, a word, a sentence, a phrase, a paragraph, a section, and so forth. It may be appreciated that N=3 is by way of example and not limitation.

The search manager 124 may use the search model 704 to encode the information blocks 710 into corresponding contextualized embeddings depicted as a set of M document vectors 726, where M represents any positive integer. As depicted in FIG. 8, the search manager 124 may use the search model 704 to encode the information block 712 into a document vector 802, the information block 714 into a document vector 804, the information block 716 into the document vector 806, and the information block N into the document vector M.

One or more of the information blocks 710 and/or the document vectors 726 may optionally include block labels assigned using a machine learning model, such as a classifier. A block label may represent a type or content type for information or data contained within each of the information blocks 710, such as a semantic meaning, a standard clause, a provision, customer data, buyer information, seller information, product information, service information, licensing information, financial information, cost information, revenue information, profit information, sales information, purchase information, accounting information, milestone information, representations and warranties information, term limits, choice of controlling law, legal clauses, or any other information that is contained within an electronic document and useful for a given entity. Embodiments are not limited in this context.

Figure 9:
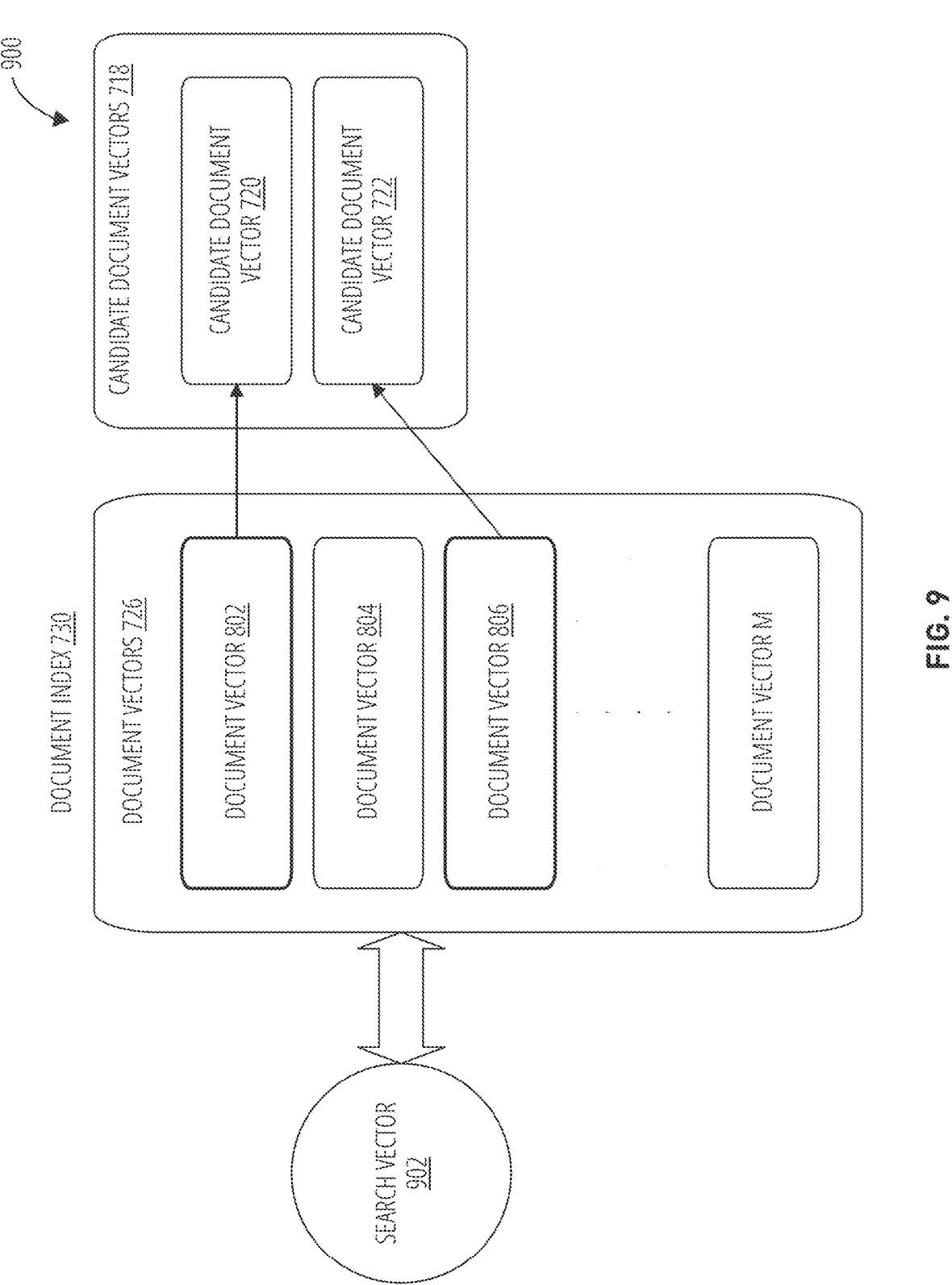
FIG. 9 illustrates an operating environment 900 in accordance with one embodiment.

FIG. 9 illustrates an operating environment 900. The operating environment 900 illustrates an example of the search manager 124 performing a semantic search of the document vectors 726 to find a set of candidate document vectors 718 relevant to the search query 144.

As previously discussed, in the online phase, the search manager 124 may perform two general tasks: (1) search retrieval; and (2) relevant result summarization. The search manager 124 may receive a search query 144, encode it to a contextualized embedding in real-time, and leverage vector search to retrieve search results 146 with semantically similar document content within an electronic document 706.

For search retrieval, the search manager 124 may receive a search query 144 to search for information within an electronic document 142 by a cloud search service, such as an online electronic document management system of system 100 or system 200. The search query 144 may comprise any free form text in a natural language representation of a human language. The search manager 124 may use the search model 704 to generate a contextualized embedding for the search query 144 to form a search vector 902.

A user can formulate a search query 144 using a natural language. Examples of search queries 144 in a natural language may include a list of queries to generate an agreement summary, such as:

1. "Parties involved": The names and contact information of the parties entering into the agreement.
2. "Purpose": A brief statement outlining the purpose or objective of the agreement.
3. "Terms and conditions": The specific terms and conditions of the agreement, including any obligations or responsibilities of each party.
4. "Payment terms and conditions": If applicable, details regarding payment, including the amount, due dates, and any penalties for late payment.
5. "Duration, upcoming actionable dates": The length of time the agreement is valid and any upcoming dates
6. Termination: "The conditions under which the agreement may be terminated, and any notice requirements".
7. "Confidentiality": If applicable, any confidentiality or non-disclosure provisions.
8. Dispute resolution: The procedures for resolving any disputes that may arise between the parties.
9. "Governing law": The state or jurisdiction whose laws will govern the agreement.
10. "Signatures": The signatures of the parties, indicating their agreement to the terms of the agreement.

It may be appreciated that these are merely a few examples of natural language representation in a search query 144. Embodiments are not limited to these examples.

As depicted in FIG. 9, the search manager 124 may search a document index 730 of contextualized embeddings for the electronic document 706 with the search vector 902, which is itself a contextualized embedding of the same type as those stored in the document index 730. The search process may produce a set of search results 146. The search results 146 may include a set of candidate document vectors 718 from the set of document vectors 726. The search results 146 may include candidate document vectors 718 from the set of document vectors 726 that are semantically similar to the search vector 902 of the search query 144.

FIG. 9 depicts an example set of two candidate document vectors 718 (P=2) that includes a candidate document vector 720 and a candidate document vector 722 corresponding to the document vector 802 and the document vector 806, respectively, of the document index 730.

FIG. 10 illustrates an abstractive summary 148 for the candidate document vectors 718. Once the search manager 124 generates a candidate document vectors 718 from the set of document vectors 726 from the electronic document 706, the search manager 124 may use the generative AI model 728 to generate an abstractive summary 148 for the candidate document vectors 718. The abstractive summary 148 may describe the candidate document vectors 718 in a natural language representation, such as written text in a natural language such as English, for example. The generative AI model 728 may implement a text summarization algorithm to generate the abstractive summary 148 so that it appears that a human being generated the abstractive summary 148.

In one embodiment, a generative AI model such as the generative AI model 728 can be used to summarize changes between two versions of a document. This can be achieved through a technique called text summarization, which involves identifying the most important information in a document and condensing it into a shorter summary. One approach to text summarization is called extractive summarization, which involves identifying the most important sentences or phrases in a document and extracting them to create a summary. Another approach is abstractive summarization, which involves generating new sentences that capture the meaning of the original text. The generative AI model 728 may use an unsupervised approach to summarization, such as offered by ML algorithms such as LexRank and TextRank, for example. Embodiments are not limited to these examples.

By way of example, assume an electronic document 706 is a lease agreement that gives rental terms and conditions for renting furnished and unfurnished apartments. Further assume a client 210 enters a search query 144 such as "What are terms and conditions for renting apartments?" The search manager 124 may generate a search vector 902 for the search query 144 to search for document vectors 726 that are semantically similar to the search vector 902. The search manager 124 generates search results 146 with two candidate document vectors 718, including the candidate document vector 722 and the candidate document vector 722.

Assume the candidate document vector 720 includes document content from the lease agreement as follows:

"This leasing agreement outlines the terms and conditions of renting an apartment unit in a residential complex. The agreement includes details such as the rental price, security deposit, move-in date, lease term, and renewal options. The tenant is responsible for paying rent on time and complying with the rules and regulations of the complex. The landlord is responsible for maintaining the property and responding to maintenance requests promptly."

Assume the candidate document vector 722 includes document content from the lease agreement as follows:

"This leasing agreement outlines the terms and conditions of renting a furnished apartment in a luxury building. The agreement includes details such as the rental price, security deposit, move-in date, lease term, and renewal options. The tenant is responsible for paying rent on time and complying with the rules and regulations of the building. The landlord is responsible for providing and maintaining the furniture and appliances, as well as responding to maintenance requests promptly."

The search manager 124 may use the generative AI model 728 to generate an abstractive summary 148 for the candidate document vector 720 and the candidate document vector 722 as follows:

"The leasing agreement includes two clauses that outline the terms and conditions of renting apartment units in different residential complexes. Both clauses include details such as the rental price, security deposit, move-in date, lease term, and renewal options. Tenants are responsible for paying rent on time and complying with the rules and regulations of the complex or building, while landlords are responsible for maintaining the property and responding to maintenance requests promptly. One clause pertains to an unfurnished apartment in a residential complex, while the other clause pertains to a furnished apartment in a luxury building."

The abstractive summary 148 may describe the candidate document vector 720 and the candidate document vector 722 using a natural language representation. The generative AI model 728 may generate an abstractive summary 148 as a warning with a written description of the relevant clauses in the lease agreement in a natural language such as the English language for presentation on an electronic display. The generative AI model 728 generates a written description of the summary as if it were generated by a human that was describing the two agreement clauses. Furthermore, the written description is generated with original informational content after each set of candidate document vectors 718 are identified, and is not simply a pre-defined written description stored in a file. The generative AI model 728 includes a generator that is trained to create new, original data that resembles the training data 328 in some way, while also introducing variations and creativity. Consequently, the generative AI model 728 generates new, original descriptions for the agreement clauses that resemble previous descriptions in some way, while also introducing variations and creativity in each description of every formal deviation. This is analogous to when a human being is repeatedly asked to describe an object or event. Each description would be original and would vary in detail, word selection, facts, observations and insights. Similarly, the generative AI model 728 is trained to generate an original description of each set of candidate document vectors 718 in a new and unique manner, with variations in detail, word selection, facts, observations and insights. In this manner, the generative AI model 728 uses artificial intelligence that mimics human intelligence when generating an original, new and creative summaries for search results 146 found in an electronic document 706.

Figure 11:
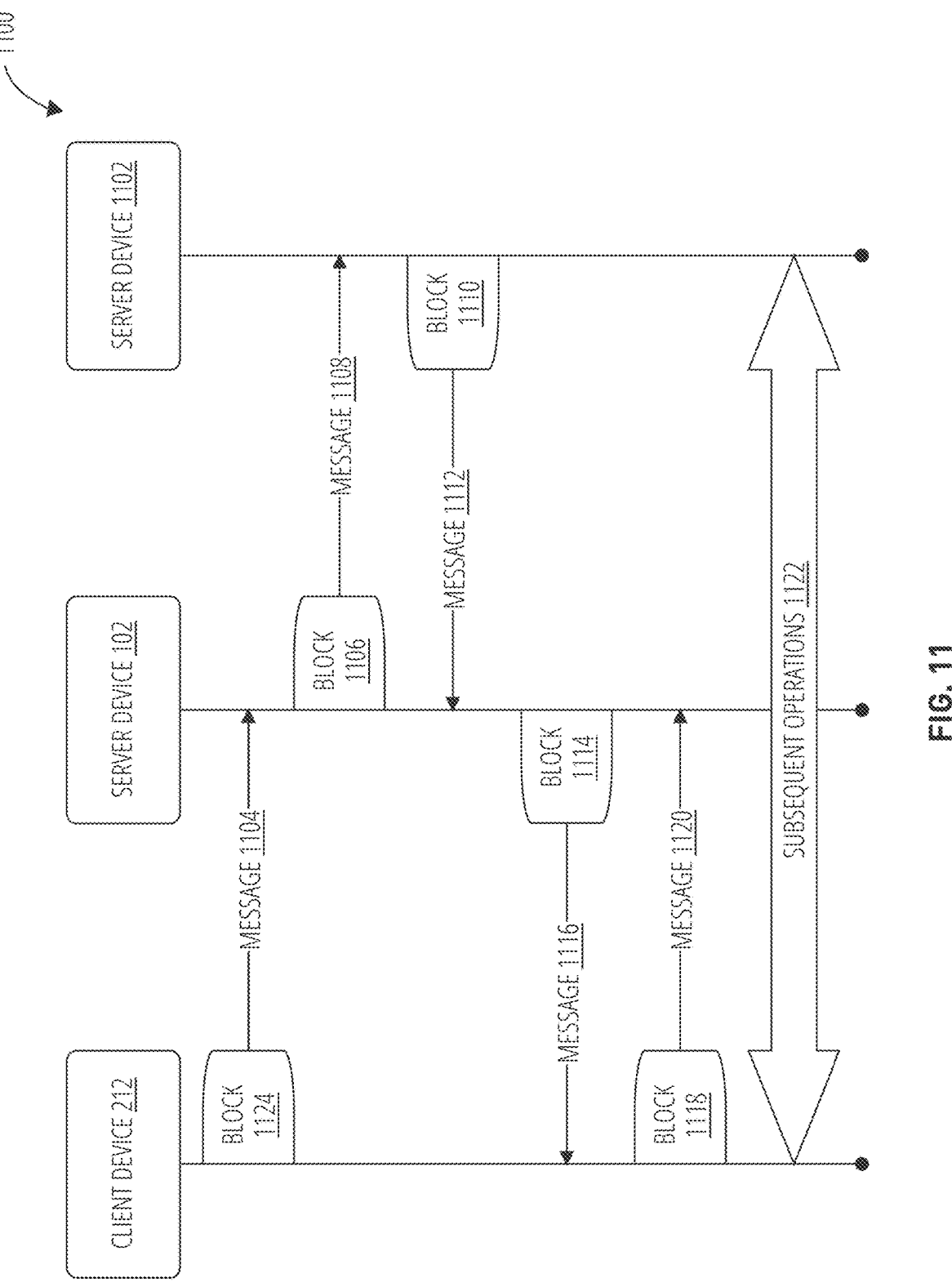
FIG. 11 illustrates a message flow 1100 in accordance with one embodiment.

FIG. 11 illustrates a message flow 1100 suitable for the system 100, the system 200, or the server device 102 to generate an Abstractive summary 148 for search results 146 generated in response to a search query 144. In one embodiment, the search manager 124 may implement a generative AI model 728 locally on the server device 102. In one embodiment, the search manager 124 may access a generative AI model 728 remotely on another server device. The message flow 1100 is an example of the generative AI model 728 implemented by a server device 1102.

As depicted in the message flow 1100, at block 1124, a client 210 may use a client device 212 to formulate and submit a search query 144 to the server device 102 via network 222. The client 210 may enter the search query 144 as a natural language question into a GUI for a web page or web portal served by the server device 102 and rendered on the client device 212. The client device 212 may send a message 1104 with the search query 144.

The server device 102 may receive the message 1104. At block 1106, the search manager 124 may use the search model 704 to convert the search query 144 into a search vector, and use the search vector to search the database 708 to produce search results 146. The search manager 124 may generate a NLG request with the search query 144 and some or all of the candidate document vectors 718 from the search results 146. The search manager 124 may send a message 1108 with the NLG request to the server device 1102.

The server device 1102 may receive the message 1108. At block 1110, the server device 1102 may retrieve the search query 144 and the candidate document vectors 718 from the NLG request. The server device 1102 may implement a generative AI model 728 that comprises a machine learning model that implements a large language model (LLM) to support natural language processing (NLP) operations, such as natural language understanding (NLU), natural language generation (NLG), and other NLP operations. The NLG request may request an Abstractive summary 148 of document content for search results 146. The search results 146 may comprise a subset of candidate document vectors from the set of candidate document vectors 718. The Abstractive summary 148 may comprise a natural language representation of the human language. The generative AI model 728 may generate the Abstractive summary 148 in response to the NLG request from the server device 102. The server device 1102 may generate a NLG response with the Abstractive summary 148, and send a message 1112 with the NLG response to the server device 102.

The search manager 124 may receive the message 1112 with the NLG response having the Abstractive summary 148 from the generative AI model 728 implemented by the server device 1102 from the server device 1102. At block 1114, the search manager 124 may generate a GUI view with various GUI elements representative of the Abstractive summary 148 and/or the candidate document vectors 718. The search manager 124 of the server device 102 may send a message 1116 with the GUI view or code for the GUI view (e.g., HTML code) to the client device 212.

The client device 212 may receive the message 1116 with the GUI view or code the GUI view. At block 1118, the client device 212 may render the GUI view for presentation on an output device of the client device 212, such as text information or graphic information on an electronic display of the client device 212 or as spoken text over a speaker of the client device 212 using a text to speech (TTS) translator. The client 210 may interact with the GUI view to perform subsequent operations 1122, such as requesting more information about the candidate document vectors 718 in the search results 146, presenting portions (e.g., a section or snippet) of the electronic document 706 containing the candidate document vectors 718, a subsequent search query 144, and so forth.

As previously discussed, the generative AI model 728 may comprise an NLG model that is trained, at least in part, using a GPT model. A GPT model is a language model from a family of language models generally trained on a large corpus of text data to generate human-like text. One example of a GPT model is the family of language models made by OpenAI, an American AI research laboratory consisting of a non-profit corporation OpenAI Incorporated and a for-profit subsidiary corporation OpenAI Limited Partnership. A GPT model has a transformer architecture comprising multiple layers or blocks, such as an input embedding layer, a positional encoding layer, a dropout layer, one or more transformer layers, a normalization layer, a linear layer, a SoftMax layer, and an output layer. The transformer layers can be fine-tuned for various natural language processing (NLP) tasks such as text generation, language translation, and text classification. The use of the term "pre-training" in the GPT model may refer to the initial training process on a large text corpus where the model learns to predict the next word in a passage, which provides a solid foundation for the model to perform well on downstream tasks with limited amounts of task-specific data.

The generative AI model 728 may use a GPT model in a semi-supervised learning approach involving two stages: (1) an unsupervised generative "pre-training" stage in which a language modeling objective is used to set initial parameters, and (2) a supervised discriminative "fine-tuning" stage in which these parameters are adapted to a target task. The GPT model may be particularly useful for those cases where it may be prohibitively expensive and time-consuming to train extremely large models. For example, many languages such as Swahili or Haitian Creole are difficult to translate and interpret using such models due to a lack of available text for corpus-building.

The generative AI model 728 may be implemented as one or more neural networks, which are mathematical models that can learn to recognize patterns in data and generate new data based on those patterns. Specifically, generative AI models use a type of neural network called a generative adversarial network (GAN), which comprises a generator and a discriminator.

The generator is a neural network that takes a random noise vector as input and generates new data, such as images or text, that are intended to resemble the training data. A random noise vector is a vector of random values. The values in the vector are typically drawn from a probability distribution, such as a normal distribution or a uniform distribution. The random noise vector serves as a source of randomness and variation, allowing the generator to produce novel and diverse outputs. While the generator is trained on a specific dataset, the use of a random noise vector means that it can generate new and original data that is not present in the training set. The generator essentially learns to map the random noise vector to a particular output, and by training on a large dataset, it can learn to generate a wide variety of outputs that resemble the training data.

The discriminator, on the other hand, is another neural network that takes the generated data and the real training data as input and tries to distinguish between them. The discriminator takes as input either real data from the training set or generated data from the generator. The objective of the discriminator is to distinguish between the real data and the generated data, effectively learning to identify the "realness" of the input. The discriminator is trained using a binary classification loss function, meaning that it is trained to output a value of 1 if the input is real and 0 if the input is generated.

The generator and discriminator are trained together in a process called adversarial training, where the generator is trying to produce data that the discriminator cannot distinguish from the real training data, while the discriminator is trying to correctly classify the generated data as fake. As the generator improves at producing realistic data, the discriminator must also become more discerning, and the two networks effectively engage in a game of cat-and-mouse. Through this iterative process, the generator gradually improves its ability to create new data that is similar to the training data, and the discriminator becomes better at recognizing the difference between real and fake data. Once the generator has been trained, it can be used to create new, original data that resembles the training data in some way, while also introducing variations and creativity.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

FIG. 12 illustrates an embodiment of a logic flow 1200. The logic flow 1200 may be representative of some or all of the operations executed by one or more embodiments described herein. For example, the logic flow 1200 may include some or all of the operations performed by devices or entities within the system 100 or the system 200. More particularly, the logic flow 1200 illustrates an example where the server device 102 prepares an electronic document 706 to support search operations in an offline phase.

In block 1202, logic flow 1200 receives an electronic document having document content. For example, the search manager 124 of the server device 102 may receive or retrieve an electronic document 706 having document content from the document corpus 508. The electronic document 706 may be a signed electronic document or an unsigned electronic document. The document corpus 508 may be associated with a defined entity, and as such, contain confidential and proprietary information.

In block 1204, logic flow 1200 processes the document content to prepare for ingest by a machine learning model. For example, the search manager 124 may process the document content to prepare for ingest by a machine learning model, such as the search model 704 of the model inferencer 208.

In block 1206, logic flow 1200 splits the document content into multiple information blocks. For example, the search model 704 may split the document content into multiple information blocks 710. Each information blocks 710 may comprise a partial word, a word, a sentence, a phrase, a paragraph, a section, or other discrete unit of document content.

In block 1208, logic flow 1200 generates a contextualized embedding for each information block to form a corresponding document vector, each contextualized embedding to comprise a vector representation of a sequence of words in the electronic document that includes contextual information for the sequence of words. For example, the search model 704 may receive as input the information blocks 710 of the electronic document 706 and output contextualized embeddings corresponding to each of the information blocks 710 to form a set of document vectors 726. Each contextualized embedding may comprise a vector representation of a sequence of words in the electronic document 706 that includes contextual information for the sequence of words. In one embodiment, for example, the search manager 124 may execute a search model 704 implemented as a Distil-RoBERTa model on a set of documents to create contextual embeddings and keep them in the database 708 in a Microsoft Azure environment. The search manager 124 may leverage database (DB) search to retrieve the top k results for a search query 144, and then pass both query and top k results to an OpenAI API for summarization.

In block 1210, logic flow 1200 indexes the document vectors in a document index. For example, the search model 704 may implement an indexer to index the document vectors 726 in a document index 730. In one embodiment, for example, the document index 730 may be an inverted index to accelerate search operations.

In block 1212, logic flow 1200 stores the document index with the document vectors in a database. For example, the search manager 124 may store the document index 730 with the document vectors 726 in a database 708.

FIG. 13 illustrates an embodiment of a logic flow 1300. The logic flow 1300 may be representative of some or all of the operations executed by one or more embodiments described herein. For example, the logic flow 1300 may include some or all of the operations performed by devices or entities within the system 100 or the system 200. More particularly, the logic flow 1300 illustrates an example where the server device 102 receives a search query 144 to perform a semantic search for document content contained within an electronic document 706, and generate a set of search results 146 relevant to the search query 144, and summarize at least a portion of the search results 146 in an Abstractive summary 148.

In block 1302, logic flow 1300 receives a search query for information within an electronic document in a natural language representation. For example, the search manager 124 of the server device 102 may receive a search query 144 for information within an electronic document 706 in a natural language representation. The server device 102 may receive the search query 144 in a natural language from a client 210 via a GUI presented by a web interface or a web page rendered on a client device 212.

In block 1304, logic flow 1300 generates a contextualized embedding for the search query to form a search vector. For example, the search manager 124 may use the search model 704 to generate a contextualized embedding for the search query 144 to form a search vector. In one embodiment, for example, the search model 704 may be implemented as BERT based encoder.

In block 1306, logic flow 1300 retrieves a set of candidate document vectors that are semantically similar to the search vector from a document index of contextualized embeddings for the electronic document. For example, the search manager 124 may perform a semantic search on the document index 730 of document vectors 726 stored in the database 708, and retrieve a set of candidate document vectors 718 that are semantically similar to the search vector.

In block 1308, logic flow 1300 sends a request to a generative artificial intelligence (AI) model for an abstractive summary of document content for a subset of candidate document vectors, the abstractive summary to comprise a natural language representation. For example, the search manager 124 may send a request to a generative AI model 728 for an Abstractive summary 148 of document content for a subset of candidate document vectors 718 from the set of candidate document vectors 718, where the Abstractive summary 148 comprises a natural language representation in a human language. The generative AI model 728 may be implemented locally by the server device 102 or remotely by the server device 1102.

The request for the Abstractive summary 148 may be formulated using prompt engineering. Prompt engineering is the process of designing and refining prompts or templates for natural language processing (NLP) models, with the goal of improving their performance on specific tasks. In the context of NLP, a prompt or template is a pre-defined text input that is used to guide the model's output. The prompt typically includes placeholders or variables that can be filled in with specific inputs or context. The process of prompt engineering involves several operations. The first operation is defining the task and data requirements. This involves identifying the specific NLP task and data sources that the model will be trained and evaluated on. The second operation is designing the prompt or template. This involves creating a template that guides the model's output and incorporates the relevant input and context. The prompt should be designed to elicit the desired output and minimize errors or biases. The third operation is iteratively refining the prompt. This involves testing the prompt on the task and data, and refining it based on the model's performance and user feedback. The fourth operation is evaluating the prompt. This involves evaluating the model's performance on the task using the prompt, and comparing it to other models or baselines.

In block 1310, logic flow 1300 receives a response with the abstractive summary from the generative AI model. For example, the search manager 124 may receive a response with the Abstractive summary 148 from the generative AI model 728. The search manager 124 may send the Abstractive summary 148 and/or the subset of candidate document vectors 718 to the client 210 for rendering on a GUI of the client device 212.

The logic flow 1300 may also include receiving the search query from a search box of a graphical user interface (GUI) on a web page or a click event on a GUI element on the web page. The GUI element may comprise a button or other GUI element selectable (clickable) by a user to perform an action associated with the GUI element.

The logic flow 1300 may also include where the electronic document is an unsigned electronic agreement with metadata includes signature tag marker element (STME) information suitable to receive an electronic signature. For instance, a client 210 may use the document manager 120 to generate an electronic document 706 with STME 132 representing a signature block. The signature manager 122 may be used to circulate the electronic document 706 for electronic signature by multiple signatories.

The logic flow 1300 may also include where the contextualized embedding includes a vector representation of a sequence of words that includes contextual information for the sequence of words. In language processing, contextual information refers to the words or phrases that surround a particular word or sentence, and which can provide important clues to its meaning. In the same way, when analyzing a particular piece of data or information, understanding its contextual information can help provide a more accurate interpretation and prevent misunderstandings.

The logic flow 1300 may also include training a bidirectional encoder representations from transformers (BERT) language model composed of multiple transformer encoder layers using training data from electronic documents associated with a defined entity and having an electronic signature. As previously discussed, a BERT model may be trained on the electronic documents 706 stored in the document corpus 508, which may be specifically associated with a defined entity, such as a customer or client of the system 100 or system 200. Consequently, the search model 704 and the generative AI model 728 are trained on confidential and proprietary information associated with a defined entity in order to perform custom and highly specialized inferencing operations and tasks for the defined entity. Accordingly, each trained BERT model will be different based on a different document corpus 508 associated with a different defined entity.

The logic flow 1300 may also include generating the contextualized embeddings using a transformer architecture, the transformer architecture to comprise a bidirectional encoder representations from transformers (BERT) language model composed of multiple transformer encoder layers. As previously discussed, there are different types of BERT (Bidirectional Encoder Representations from Transformers) models suitable for use as a search model 704. BERT is a pre-trained language model developed by Google® that has been trained on a large amount of text data, and can be fine-tuned for various natural language processing (NLP) tasks such as text classification, named entity recognition, question answering, and more. Some of the different types of BERT models suitable for the search model 704 include: (1) BERT Base: This is the original version of BERT, which has 12 layers and 110 million parameters; (2) BERT Large: This is a larger version of BERT with 24 layers and 340 million parameters, which can achieve better performance on some NLP tasks; (3) Multilingual BERT (mBERT): This is a BERT model that has been trained on text from multiple languages, and can be used for NLP tasks in different languages; (4) DistilBERT: This is a smaller, faster, and more memory-efficient version of BERT, which has been distilled from the larger BERT models; (5) RoBERTa: This is a BERT-based model that was trained using a larger amount of text data and longer training time, which has achieved state-of-the-art performance on several NLP benchmarks; and (6) ALBERT: This is a "Lite" version of BERT, which reduces the number of parameters by using parameter sharing techniques, while maintaining comparable performance to the larger BERT models. These are just a few examples of the different types of BERT models that are available, and there are many other variations and modifications of BERT that have been developed for specific NLP tasks or use cases suitable for use as the search model 704. Embodiments are not limited in this context.

The logic flow 1300 may also include generating the contextualized embeddings using a bidirectional encoder representations from transformers (BERT) language model, indexing the contextualized embeddings for the electronic document to form the document index, and storing the document index in a database. There are different ways of indexing information for an electronic document 706. There are different types of indices that can be used to organize and retrieve information from a database. An index is a data structure that allows fast and efficient retrieval of data based on specific criteria, such as a particular field or attribute. For instance, the document index 730 may be implemented as an inverted index. The document index 730 may be created using other types of indices, including: (1) B-tree index: This is a commonly used index structure that organizes data in a tree-like structure, with each node containing multiple keys and pointers to child nodes; (2) Hash index: This index structure uses a hash function to map keys to index entries, allowing fast retrieval of data based on exact matches; (3) Bitmap index: This index structure uses a bitmap to represent the presence or absence of a value in a column or attribute; (4) Text search index: This index structure is designed for full-text search of large text fields; and (5) Spatial index: This index structure is used to organize and retrieve data based on their spatial relationship. These are just a few examples of the different types of indices that can be used to organize and retrieve information from a database, such as the database 708. The choice of index structure will depend on the specific application requirements, such as the type and size of data being indexed, the desired query performance, and the available system resources.

The logic flow 1300 may also include where the contextualized embeddings are a word level vector, a sentence level vector, or a paragraph level vector. In one embodiment, for example, the search model 704 may use sentence level vectors. A sentence vector is a mathematical representation of a sentence in a high-dimensional space, where each dimension represents a feature of the sentence. Sentence vectors are often used in natural language processing (NLP) tasks such as text classification, sentiment analysis, and machine translation. Sentence vectors can be created using various techniques. For example, the search model 704 may create a sentence vector by taking the average of the word vectors of all the words in the sentence. This method is simple and effective but does not capture the context or syntax of the sentence. The search model 704 may use a RNN to process a sequence of words and generate a sentence vector. RNNs can capture the context and syntax of the sentence but are computationally expensive and can suffer from vanishing gradients. The search model 704 may use a CNN to process the sentence as a sequence of n-grams and generate a sentence vector. CNNs can capture the local context of the sentence but may not be effective for longer sentences. The resulting sentence vectors can be used to perform various NLP tasks by measuring the similarity between sentences or computing the distance between sentences in the vector space. For example, sentences that are semantically similar or related tend to have similar vectors and are located close to each other in the vector space.

The logic flow 1300 may also include retrieving the set of candidate document vectors that are semantically similar to the search vector using a semantic ranking algorithm. A semantic ranking algorithm is a type of algorithm that ranks search results or recommendations based on their semantic relevance to the search query 144. Semantic ranking algorithms may use various NLP techniques, such as entity recognition, sentiment analysis, and topic modeling, to extract meaningful features and representations from the query and documents. These features are then used to compute a semantic similarity score between the query and each document, which is used to rank the results. One popular example of a semantic ranking algorithm is the Latent Semantic Analysis (LSA) algorithm, which uses singular value decomposition (SVD) to identify latent semantic relationships between words and documents. Another example is the Latent Dirichlet Allocation (LDA) algorithm, which is a probabilistic model that identifies topics within a corpus and assigns probabilities to documents based on their relevance to these topics.

The logic flow 1300 may also include generating a semantic similarity score for each candidate document vector in the set of candidate document vectors based on their semantic similarity to the search vector using a machine learning model, ranking the candidate document vectors in an ascending or descending order of similarity based on the semantic similarity scores, and selecting the subset of candidate document vectors from the ranked candidate document vectors.

The logic flow 1300 may also include receiving the request by the generative AI model, generating the abstractive summary of document content for the subset of candidate document vectors in a natural language representation, and sending a response with the abstractive summary from the generative AI model.

The logic flow 1300 may also include where the generative AI model is a natural language generation (NLG) model. A NLG model is a type of AI model that generates human-like text in natural language based on a given input. NLG models use algorithms and statistical models to generate text that appears to be written by a human, and can be trained on large datasets of text to learn how to generate text that is coherent and grammatically correct.

The logic flow 1300 may also include where the generative AI model is a natural language generation (NLG) model, the NLG model to comprise a large language model (LLM) to generate the natural language representation for the abstractive summary, the LLM to comprise a deep neural network trained using supervised learning, unsupervised learning, or a combination of supervised and unsupervised learning.

The logic flow 1300 may also include where the generative AI model is a natural language generation (NLG) model, the NLG model to comprise a large language model (LLM) to generate the natural language representation to for the abstractive summary, the LLM to comprise a deep neural network trained using a generative pre-trained transformer (GPT) language model. The GPT language model is a large-scale transformer-based language model that can generate human-like text across a wide range of tasks. Another example of a NLG model is a Text-to-Text Transfer Transformer (5T) made by Google, which is a transformer-based model that can perform a variety of natural language tasks, including question answering, summarization, and translation.

The logic flow 1300 may also include where the generative AI model is a natural language generation (NLG) model, includes training the NLG model in a first stage with a generative pre-trained transformer (GPT) language model and unsupervised training data to reach a first language modeling objective to set initial parameters, and training the NLG model in a second stage with a discriminative language model with supervised training data to reach a second language modeling objective that adapts the set of initial parameters to a specific task.

The logic flow 1300 may also include selecting the subset of candidate document vectors from the set of candidate document vectors using a classifier. For example, the logic flow 1300 may receive the search vector as a first input to a classifier, receive a candidate document vector as a second input to the classifier, generate a label to indicate whether a combination of the search vector and the candidate document vector is suitable for inclusion in the subset of candidate document vectors as an output from the classifier, and add a candidate document vector to the subset of candidate document vectors based on the label.

The logic flow 1300 may also include presenting the abstractive summary on various output devices of a client device 212, such as an electronic display, a touchscreen display, an audio speaker, a vibrational device, and so forth. For instance, the Abstractive summary 148 may be rendered on a graphical user interface (GUI) of an electronic display of an electronic device. The logic flow 1300 may optionally include presenting document content of a candidate document vector on the GUI of the electronic display of the electronic device. The logic flow 1300 may optionally include presenting a portion of the unsigned electronic document with document content of a candidate document vector on the GUI of the electronic display of the electronic device. The logic flow 1300 may optionally include receiving the search query as a natural language representation of a human language in spoken form, and converting the spoken form to text form using a speech-to-text (STT) translator. The logic flow 1300 may optionally include reproducing the abstractive summary as synthesized speech over an electronic speaker.

Figure 14:
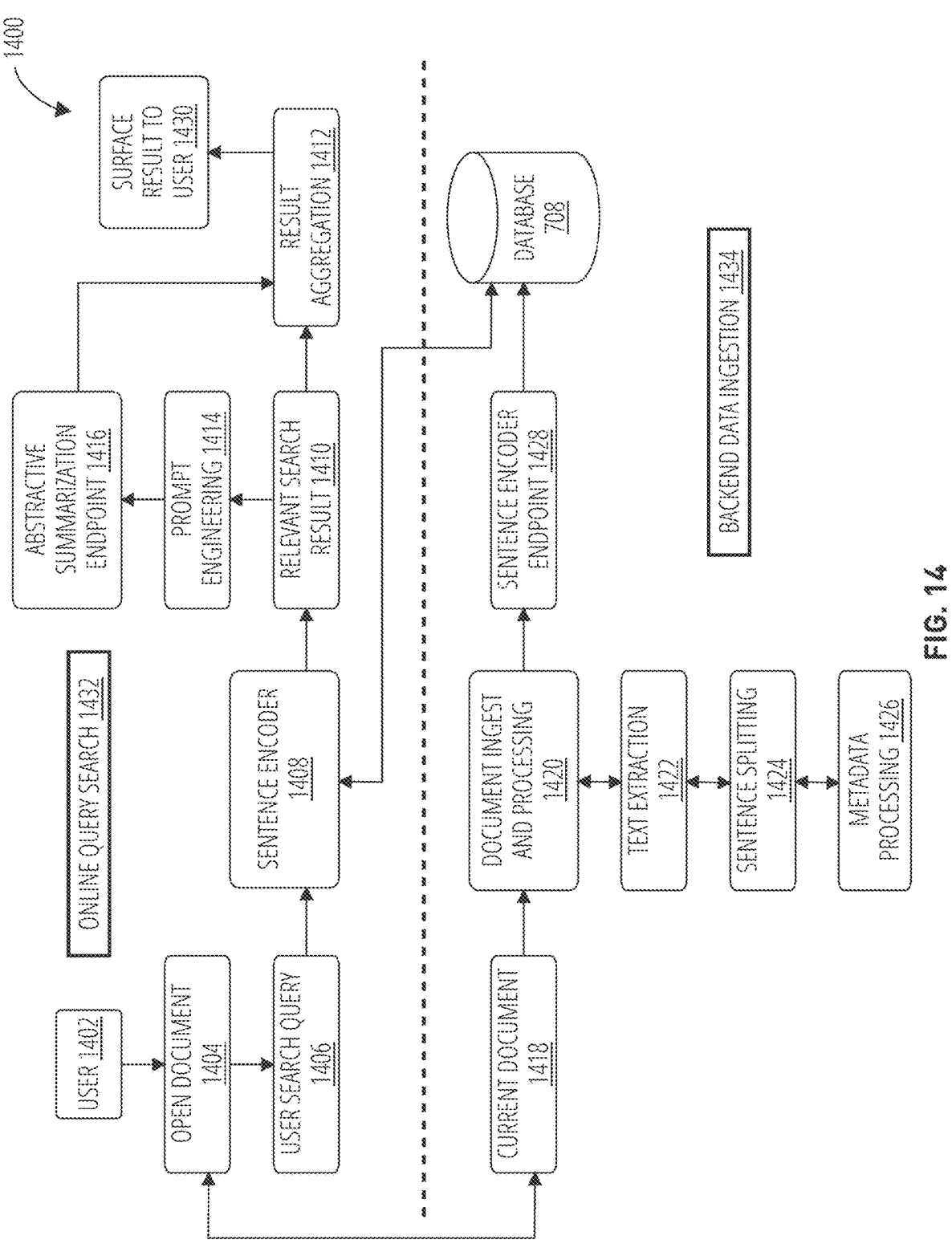
FIG. 14 illustrates a logic flow 1400 in accordance with one embodiment.

FIG. 14 illustrates an embodiment of a logic flow 1400. The logic flow 1400 may be representative of some or all of the operations executed by one or more embodiments described herein. For example, the logic flow 1400 may include some or all of the operations performed by devices or entities within the system 100 or the system 200. More particularly, the logic flow 1400 illustrates an example of an online query search 1432 and a backend data ingestion 1434 performed by the search manager 124 of the server device 102 and/or the server device 1102.

As depicted in FIG. 14, a backend data ingestion 1434 procedure may be used to transform a current document 1418 into a document vector suitable for storage in the database 708. The logic flow 1400 may perform document ingest and processing 1420 of the current document 1418. The document ingest and processing 1420 may include text extraction 1422, sentence splitting 1424, and metadata processing 1426. The processed current document 1418 is sent to a sentence encoder endpoint 1428 where it is encoded into contextual embeddings, indexed as document vectors 726 in a document index 730, and stored in the database 708.

The online query search 1432 procedure may be used to search document vectors 726 for the current document 1418 stored in the document index 730 of the database 708. A user 1402 may open the current document 1418 at open document 1404, and construct a user search query 1406. A sentence encoder 1408 may encode the user search query 1406 into a contextual embedding or search vector. The search manager 124 may perform a search of the document index 730 of the database 708, and produce a relevant search result 1410. The relevant search result 1410 may include one or more candidate document vectors 718 of the document vectors 726. Prompt engineering 1414 generates a NLG request with the search vector and one or more candidate document vectors 718. The NLG request is sent to an abstractive summarization endpoint 1416 to generate an Abstractive summary 148. The search manager 124 may combine the Abstractive summary 148 and one or more of the candidate document vectors 718 to form a result aggregation 1412. The result aggregation 1412 may be surfaced to the user as a surface result to user 1430.

Figure 15:
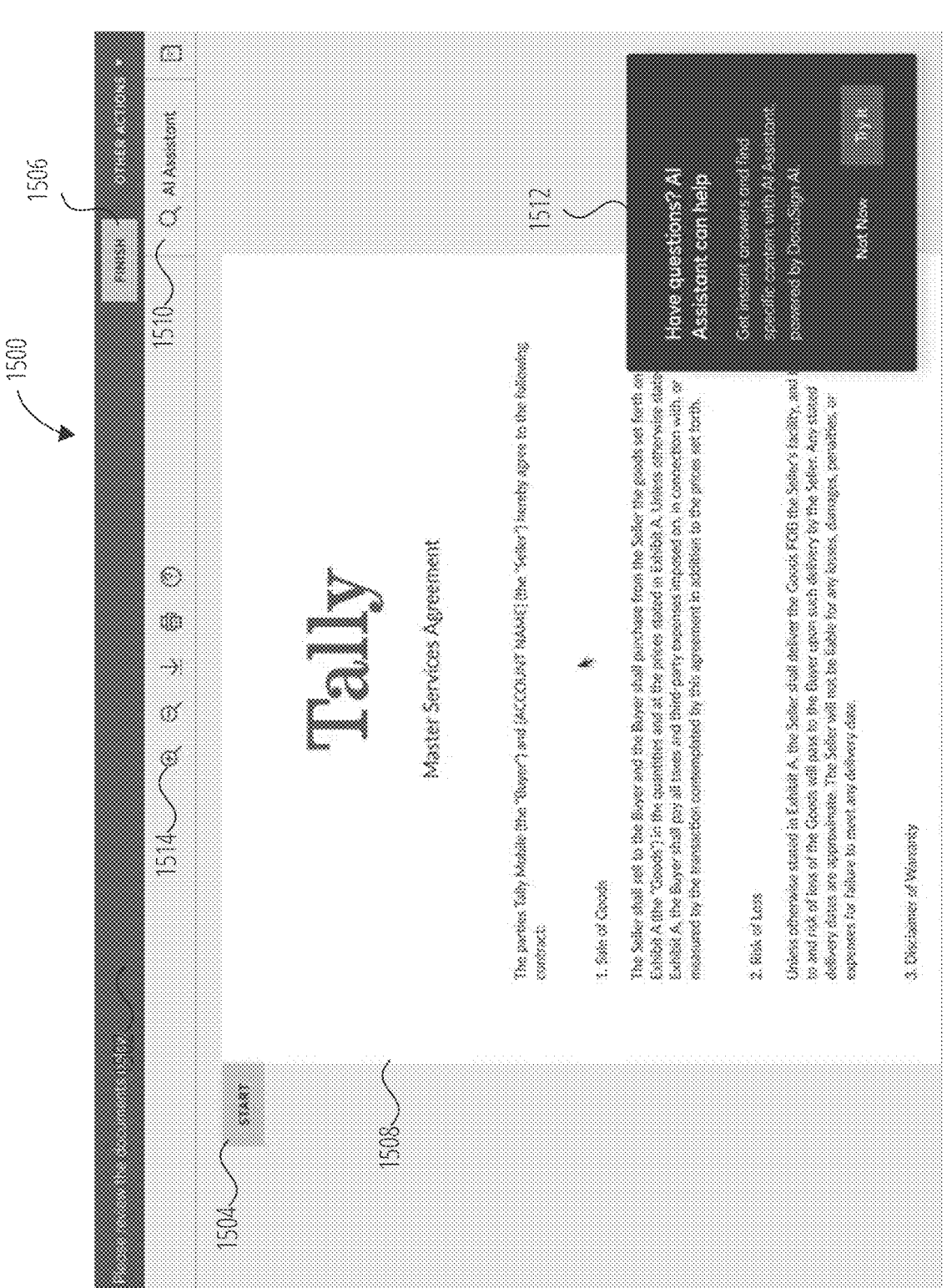
FIG. 15 illustrates a GUI view 1500 in accordance with one embodiment.

FIG. 15 illustrates a graphical user interface GUI view 1500. The GUI view 1500 may comprise various GUI elements suitable for initiating and supporting semantic search and summarization operations of the various embodiments described herein. For instance, the GUI view 1500 may include a GUI element 1504 indicating a start of an electronic signing operation and a GUI element 1506 indicating a finish of the electronic signing operation. The GUI view 1500 may include a set of GUI elements 1514 presented as icons to activate document management operations, such as zoom in, zoom out, download, print and help. The GUI view 1500 may include a GUI element 1508 which is a text box presenting a view of a portion of an electronic document 706. The GUI view 1500 may include a GUI element 1512 which is a text box presenting a request to use an AI assistant, with buttons to allow activation of the AI assistant or dismissing the text box from the GUI view 1500. The GUI view may include a GUI element 1510 presented as an icon to perform an intra-document search on the electronic document 706 shown in the GUI view 1508 using the search manager 124 of the server device 102.

Figure 16:
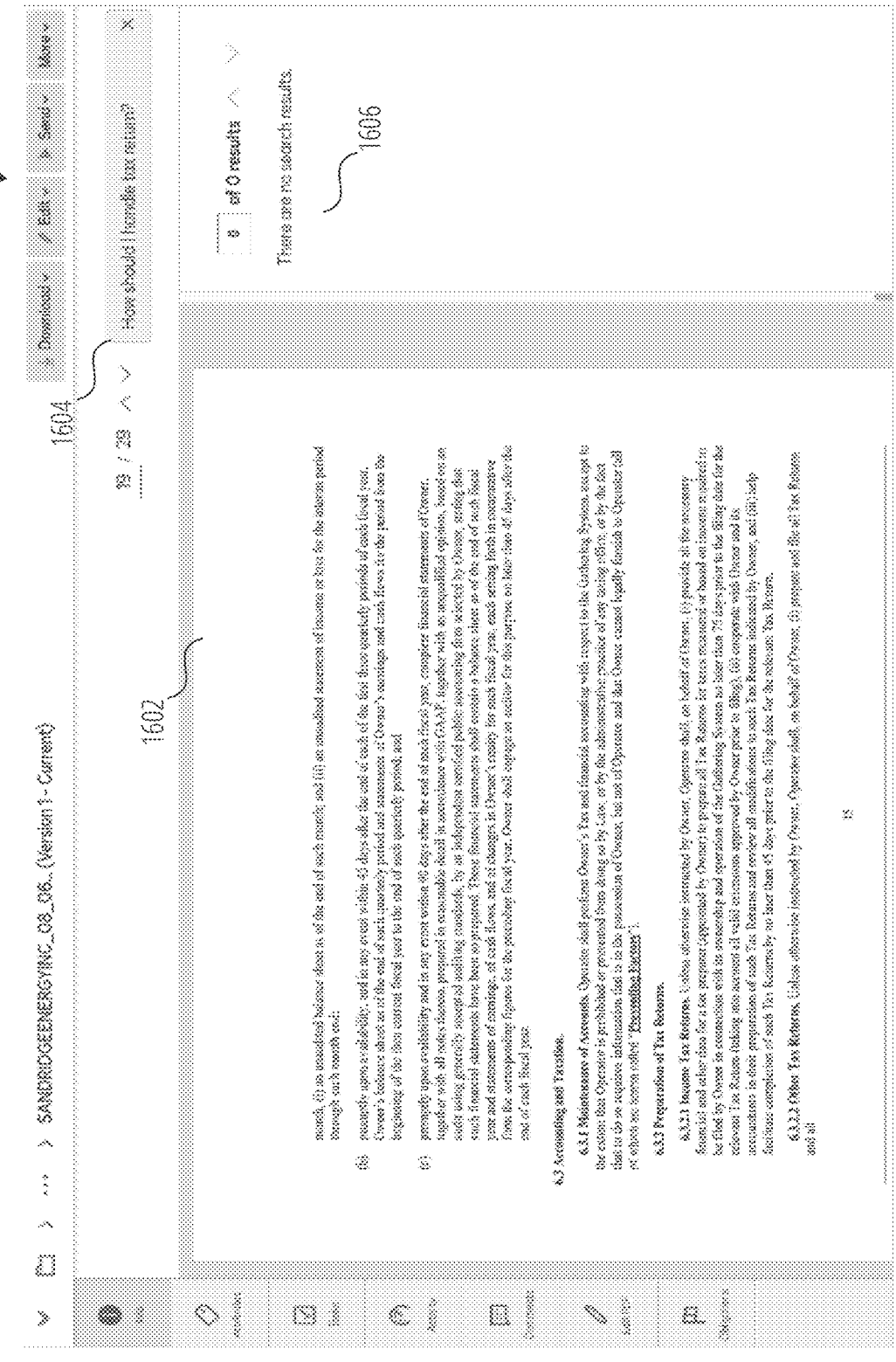
FIG. 16 illustrates a GUI view 1600 in accordance with one embodiment.

FIG. 16 illustrates a GUI view 1600. The GUI view 1600 may comprise various GUI elements suitable for initiating the lexical search generator 732 of the search manager 124 to perform lexical searching of an electronic document. For instance, the GUI view 1600 may include a GUI element 1602 comprising a text box to present a view of a portion of an electronic document 706. The GUI view 1600 may include a GUI element 1604 comprising a search box having a search query 144 entered in a natural language representation of an English language. The search query 144 is a natural language question of "How should I handle tax return?". The GUI view 1600 may include a GUI element 1606 which is a text box presenting search results 146 for the search query 144. In this case, the lexical search generator 732 failed to find any snippets of document content for the electronic document 706 relevant to the search query 144.

Figure 17:
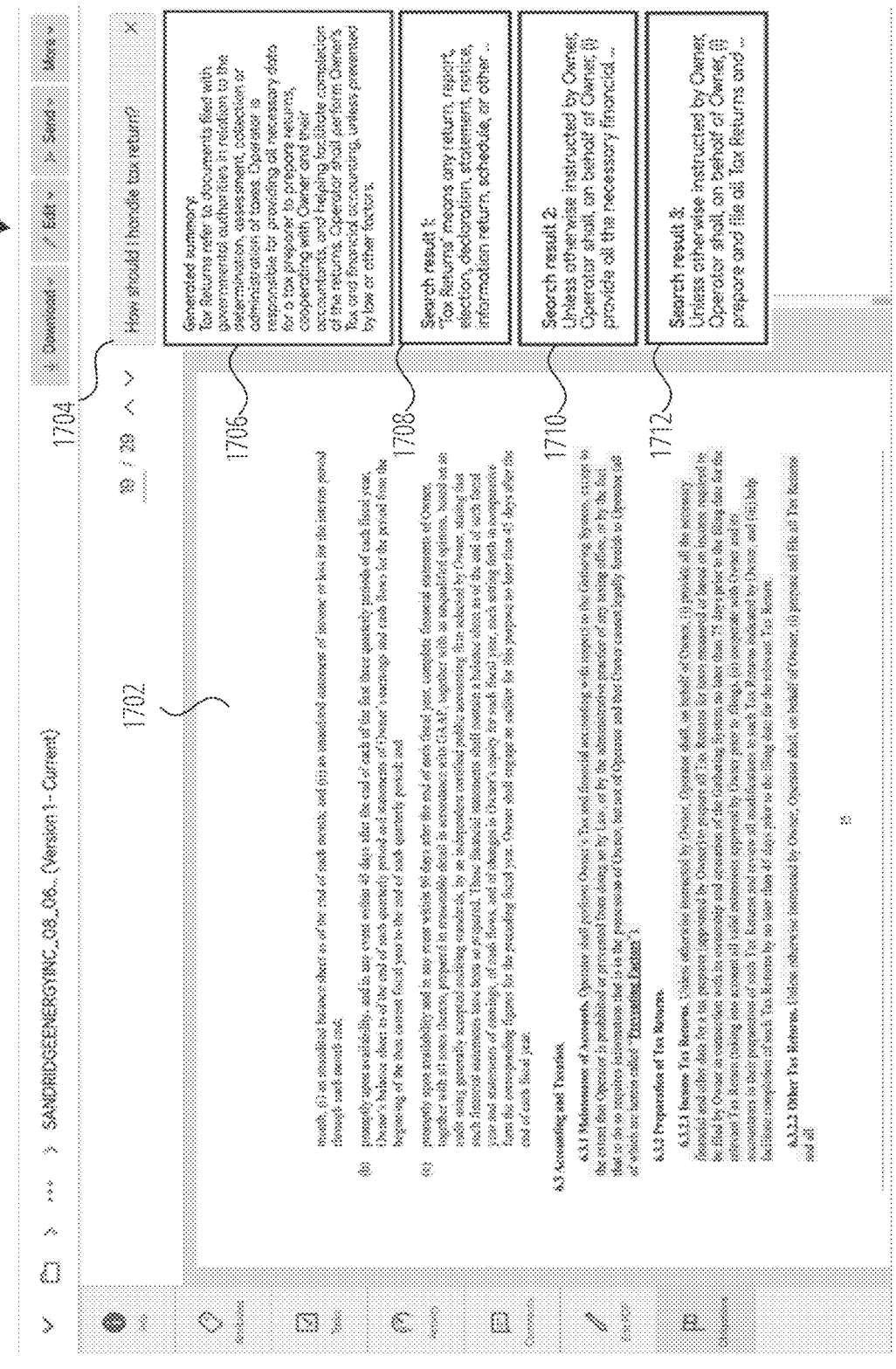
FIG. 17 illustrates a GUI view 1700 in accordance with one embodiment.

FIG. 17 illustrates a GUI view 1700. The GUI view 1700 may comprise various GUI elements suitable for initiating the semantic search generator 702 of the search manager 124 to perform semantic searching of an electronic document. For instance, the GUI view 1700 may include a GUI element 1702 comprising a text box to present a view of a portion of an electronic document 706. The GUI view 1700 may include a GUI element 1704 comprising a search box having a search query 144 entered in a natural language representation of an English language. The search query 144 is a natural language question of "How should I handle tax return?". The GUI view 1700 may include a GUI element 1706 which is a text box presenting search results 146 for the search query 144. In this case, the semantic search generator 702 successful found multiple candidate document vectors 718 of document content for the electronic document 706 relevant to the search query 144. The GUI element 1706 includes an Abstractive summary 148 for some or all of found candidate document vectors 718. Additionally, the GUI view 1700 includes GUI element 1708, GUI element 1710 and GUI element 1712. The GUI elements 1708, 1710 and 1712 present document content from search result 1, search result 2 and search result 3, respectively, which include document content for corresponding candidate document vectors 718. In some case, the GUI elements 1708, 1710 or 1712 may be buttons that a user can select to navigate to corresponding portions of the electronic document 706 for presentation in the GUI element 1702.

In some embodiments, the current subject matter may be a computing system that is capable of not only generating abstractive summaries (e.g., abstractive summary 148) of electronic documents, but also being able to respond to queries related to contents of electronic documents based on such summaries. Such exemplary systems may implement generative artificial intelligence architectures (such as, for example, architecture 300 shown in FIG. 3) to generate abstractive summaries (e.g., abstractive summary 148) of electronic documents (e.g., electronic document 142, 706, etc.). In some example, non-limiting embodiments, the current subject matter system may be configured to generate a graphical user interface (GUI) view, such as, for instance, GUI 2600 shown in FIG. 26, that may be displayed on the user's computing device. The GUI view may include one or more selectable elements (e.g., buttons, sliders, links, prompts, etc.) that may, upon being selected (e.g., clicked on, slid, etc.), trigger one or more processors, servers, etc. to retrieve context information associated with the electronic document. The context information (e.g., context information 734) may include any information that may be related to the electronic document. It may, for example, represent a meaning or an interpretation of the electronic document (e.g., the document is a lease agreement, executed between parties A and B for the duration of 12 months, etc.).

In some embodiments, the context information may relate to various aspects of the electronic document. For example, the context information may include metadata associated with the document and/or any related data, parameters, information, etc. The context information may be configured to provide for understanding and/or further understanding of the electronic document and/or its contents, and/or any uses of the document, as well as any other documents that may be related and/or unrelated to the document. For example, assuming the electronic document is a master purchase agreement covering purchasing of various materials, products, etc. from different locations where such materials, products, etc. may be manufactured, stored, shipped from, etc. Analysis of context information associated with this master purchase agreement may reveal not only the information about its parties, signatories, date of execution, terms and conditions, etc., but may also trigger linking and/or analysis of documents that may be governing purchasing specifics, shipping provisions, indemnity clauses, etc. that may be enumerated in other documents that may need to be reviewed. As such, the context information associated with the electronic document may encompass not only information associated with the document itself but also information associated with one or more other electronic documents that may be related to the original electronic document. This context information may be used to analyze and/or generate a search query that may look for information contained not only in the electronic document but also in other documents.

By way of non-limiting examples, the context information may include one or more of the following categories, groups, types, etc. of information:

Author: the person or organization who created the document;

Creation date: the date when the document was created;

Last modification date: the last date the document was edited or modified;

File size: the size of the file in bytes, kilobytes, megabytes, etc.;

File format: the type of file format, such as .doc, .pdf, .xls, .ppt, etc.;

Source: where the document originated from or where it is stored;

Location: the physical or virtual location of the document;

Related Documents: other documents that are related or linked to this document;

Keywords: main topics or themes represented in the document;

Version number: if the document has had multiple versions, the version number can be helpful to know;

Access rights: who can access and make changes to the document;

References/Citations: other documents or sources that are referred to within the document;

Summary or Abstract: a brief summary of the content of the document;

Language: the language the document is written in.

As can be understood, the current subject matter is not limited to the above examples of categories, groups, types, etc. of information and other categories, groups, types, etc. of information and/or other context information may exist and/or may be retrieved for analysis of the electronic document. In some example embodiments, the categories, groups, types, etc. of information and/or the context information itself may be different for each specific electronic document (e.g., a master purchase agreement and a lease agreement may contain different categories of context information). Each of the above pieces of information may be expressed in any desired form and/or format.

The system may then generate a search query based on the retrieved context information. In some example embodiments, the search query may be expressed in a natural language representation and request a search for information within the electronic document. Once the query is generated, a search vector (e.g., a search vector 902, as shown in FIG. 9) may be formed based on one or more contextualized embeddings generated for the search query. A set of candidate document vectors (e.g., candidate document vectors 718 as shown in FIGS. 7 and 9) may be retrieved. The candidate document vectors may be semantically similar to the search vector from a document index (e.g., document index 730 shown in FIG. 7) of contextualized embeddings for the electronic document.

The context information (as, by way of a non-limiting example, shown above) may be used to generate simple or complex search queries. Simple search queries may, for instance, include simple word searches (e.g., "law of this agreement"), while complex search queries may not only encompass a specific question(s) about contents of the electronic document that the user wishes to determine an answer for, but also include information about the electronic document. For instance, a complex search query about a lease agreement may be as follows:

1. "Given a document from leasing company ABC signed in North Carolina by signatories party A and party B for an apartment complex in the center of downtown Raleigh, NC that was signed at 12:00 noon on Sunday in an office building near RBC Center while a comic book convention had William Shatner as keynote speaker, what is/are the most important provisions of the agreement that a 21 year old lessee needs to focus on to make sure they stay in compliance with all terms of the agreement?"

As illustrated above, the search query not only includes a question part (i.e., "what is/are the most important provisions of the agreement that a 21 year old lessee needs to focus on to make sure they stay in compliance with all terms of the agreement?"), but also contextual information about the agreement, i.e., parties of the agreement—"leasing company ABC" and "a 21 year old lessee", location of execution of the agreement—"signed in North Carolina", signatories of the agreement—"signatories party A and party B", subject of the agreement—"for an apartment complex in the center of downtown Raleigh, NC", timing of the execution of the agreement—"that was signed at 12:00 noon on Sunday". Such contextual information may have been retrieved as part of the analysis of the agreement and incorporated into the search query as part of the query generation process. In some embodiments, a question about provisions of the agreement and compliance therewith by a certain type of party, may have triggered the current subject matter system, in generating the search query, to incorporate the above contextual information. Further, the question about that specific agreement and/or inclusion of the above contextual information, may also have triggered the current subject matter to incorporate additional contextual information, i.e., "while a comic book convention had William Shatner as keynote speaker", into the search query. In this case, for example, the inclusion of the words "RBC Center" may have triggered inclusion of this additional contextual information. Such collection of contextual information in the search query may be used to generate a request to the generative artificial intelligence model, which the model may rely on to provide a particular abstractive summary and/or specific response to the query. Any response that may be generated would be more precise as specific contextual information has been generated and provided to the generative AI model.

At this point, the current subject matter system may be configured to send a request to the generative artificial intelligence (AI) model (e.g., generative AI model 728 as shown in FIG. 7) for an abstractive summary (e.g., abstractive summary 148) of document content for the set of candidate document vectors. The generative AI model may generate the abstractive summary and transmit it for the display on the GUI. The abstractive summary may be expressed in a natural language representation, as for example is shown in FIG. 10.

In some alternate or additional embodiments, a GUI view may be generated on a GUI of user's computing device. The GUI may include one or more selectable graphical elements (e.g., buttons, sliders, etc.). The GUI may also be generated in connection with one or more electronic documents (e.g., contracts, lease agreements, and/or any other type of documents). The document may be analyzed to determine its context information. For example, the context information may include one or more of the following: a metadata for the electronic document, a location information for the electronic document, an access history for the electronic document, usage statistics for the electronic document, one or more hyperlinks to one or more other electronic documents, a content summary, one or more labels or tags for the electronic document, a semantic context for the electronic document, one or more document types associated with the electronic document, one or more identification data associated with the electronic document, one or more user(s) information associated with the electronic document, and any combinations thereof.

Upon receiving an actuation from one or more graphical elements on the GUI (e.g., pressing a button, moving a slider, clicking a link, etc.), the current subject matter may be configured to execute a query for information that may be included in the electronic document. The query may be generated based on the context information associated with the electronic document. In some example, non-limiting embodiments, the query may be executed automatically, manually (e.g., the user may type in a query), and/or in any other desired fashion. The query may include one or more standard queries (e.g., queries that may be pre-formed for a particular type of document), one or more previously executed queries for a particular type of electronic document (e.g., a query to determine an applicable law related to a contract agreement), one or more queries executed by one or more users for the electronic document and/or any other similar electronic documents, and/or any other queries. In some embodiments, as discussed above, the query may seek an abstractive summary (e.g., abstractive summary 148) of the electronic document.

In some embodiments, a content summary of the electronic document may be generated as a result of the query being executed. The summary may be provided to one or more generative AI models to generate an abstractive summary of content in the electronic document. The abstractive summary may then be used by the generative AI model to generate a response to the specific query. Once the response to the query is generated, it may be transmitted or sent for presentation on the GUI view of the user's computing device.

Figure 18:
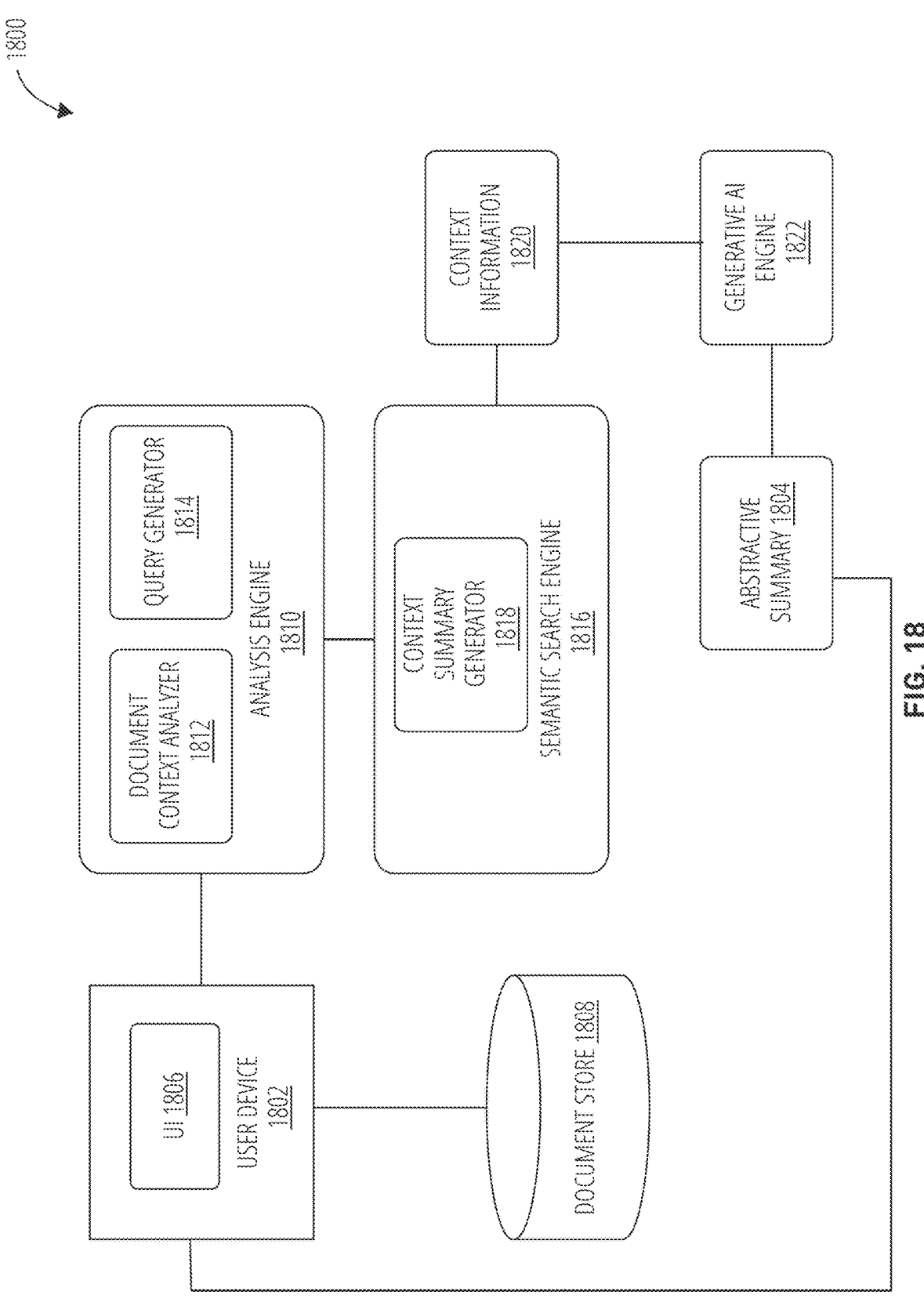
FIG. 18 illustrates an aspect of the subject matter in accordance with one embodiment.

FIG. 18 illustrates an exemplary system 1800 for performing analysis of an electronic document and generating an abstractive summary of the document and/or a response to query seeking information contained in the electronic document. The system 1800 may include one or more components and/or perform one or more operations discussed above with regard to FIGS. 1-17. As shown in FIG. 18, the system 1800 may include a user device 1802 having a user interface 1806, a document store 1808, an analysis engine 1810, and a semantic search engine 1816. The system 1800 may also be communicatively coupled to a generative AI engine 1822, which may include one or more generative AI models that may be used for generation of abstractive summaries, query responses, document analysis, etc.

One or more components of the system 1800 may include any combination of hardware and/or software and/or may be disposed on one or more computing devices, such as, server(s), database(s), personal computer(s), laptop(s), cellular telephone(s), smartphone(s), tablet computer(s), virtual reality devices, and/or any other computing devices and/or any combination thereof. Further, one or more components of the system 1800 may be disposed on a single computing device and/or may be part of a single communications network. Alternatively, or in addition to, such services may be separately located from one another. A service may be a computing processor, a memory, a software functionality, a routine, a procedure, a call, and/or any combination thereof that may be configured to execute a particular function associated with the current subject matter lifecycle orchestration service(s). Alternatively, or in addition, one or more components of system 1800 may include network-enabled computers (e.g., a computer device, or communications device including, such as, for instance, a server, a network appliance, a personal computer, a workstation, a phone, a smartphone, a handheld PC, a personal digital assistant, a thin client, a fat client, an Internet browser, or other device. The user interface 1806 and/or any other graphics-enabled component of the system 1800 may include one or more displays and/or one or more input devices. The displays may be any type of devices for presenting visual information such as a computer monitor, a flat panel display, and a mobile device screen, including liquid crystal displays, light-emitting diode displays, plasma panels, and cathode ray tube displays. Any input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

In some example embodiments, one or more components of the system 1800 may execute one or more applications, such as software applications, that enable, for example, network communications with one or more components of system 1800 and transmit and/or receive data. Further, the system 1800 may include and/or be in communication with one or more servers via one or more networks and may operate as a respective front-end to back-end pair with one or more servers. One or more components of the system 1800 may transmit, for example, from a mobile device application (e.g., executing on one or more user devices, components, etc.), one or more requests to one or more servers. The requests may be associated with retrieving data from servers. The servers may receive the requests from the components of the system 1800. Based on the requests, servers may be configured to retrieve the requested data from one or more databases. Based on receipt of the requested data from the databases (e.g., document store 1808), the servers may be configured to transmit the received data to one or more components of the system 1800 (e.g., user device 1802), where the received data may be responsive to one or more requests. One or more components of the system 1800 may also be communicatively coupled using one or more wireless networks, wired networks and/or any combination of wireless network and wired network and may be configured to connect the components of the system 1800 and/or the components of the system 1800 to one or more servers.

As shown in FIG. 18, the user device 1802 may be communicatively coupled to the Document store 1808. The Document store 1808 may be configured to store one or more electronic documents that the user of the user device 1802 may wish to perform analysis of. For example, the user may wish the system 1800 to generate an abstractive summary of a master purchase agreement and present it on the UI 1806. Moreover, the user (e.g., before, while, and/or after reviewing the generated summary) may wish to issue one or more queries to retrieve various information that may be helpful to the user to understand contents of the electronic document. For example, with respect to the master purchase agreement, the user may wish to issue a query related to payment terms schedule of the agreement and determine whether which clauses of the agreement may trigger non-compliance with such terms and what remedial actions may be taken pursuant to the agreement. The queries may be simple or complex.

Figure 26:
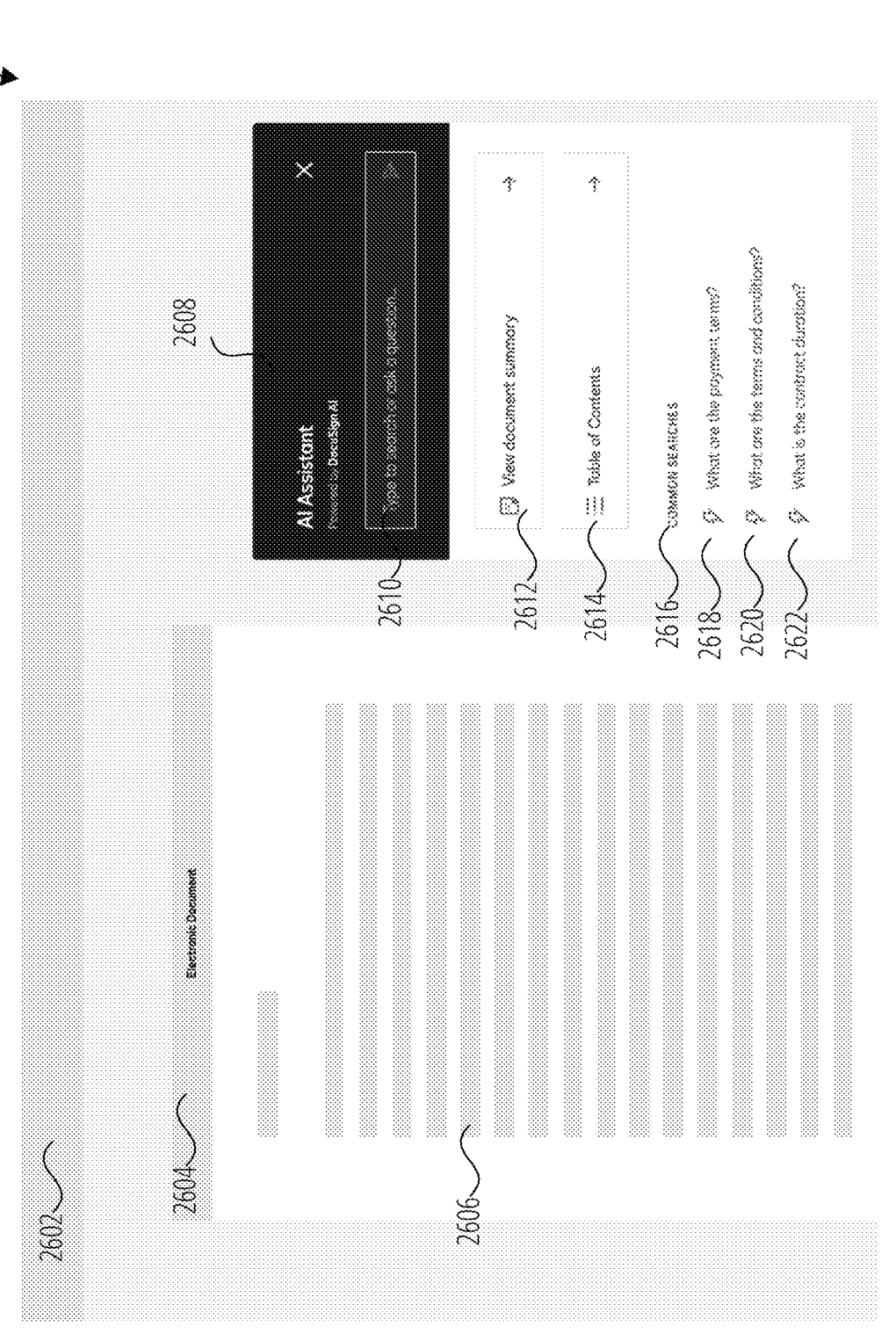
FIG. 26 illustrates a GUI view 2600 in accordance with one embodiment.
Figure 27:
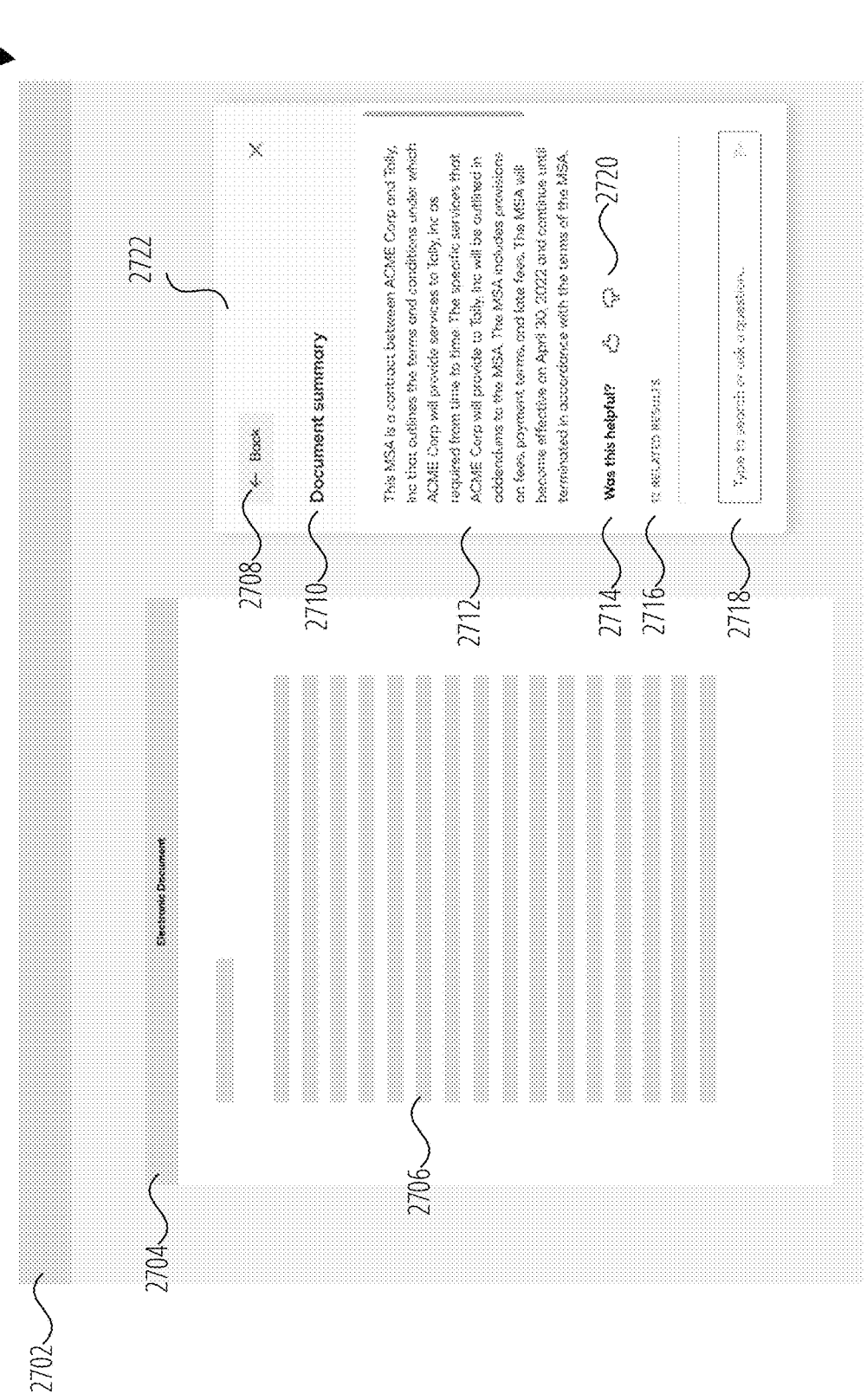
FIG. 27 illustrates a GUI view 2700 in accordance with one embodiment.
Figure 28:
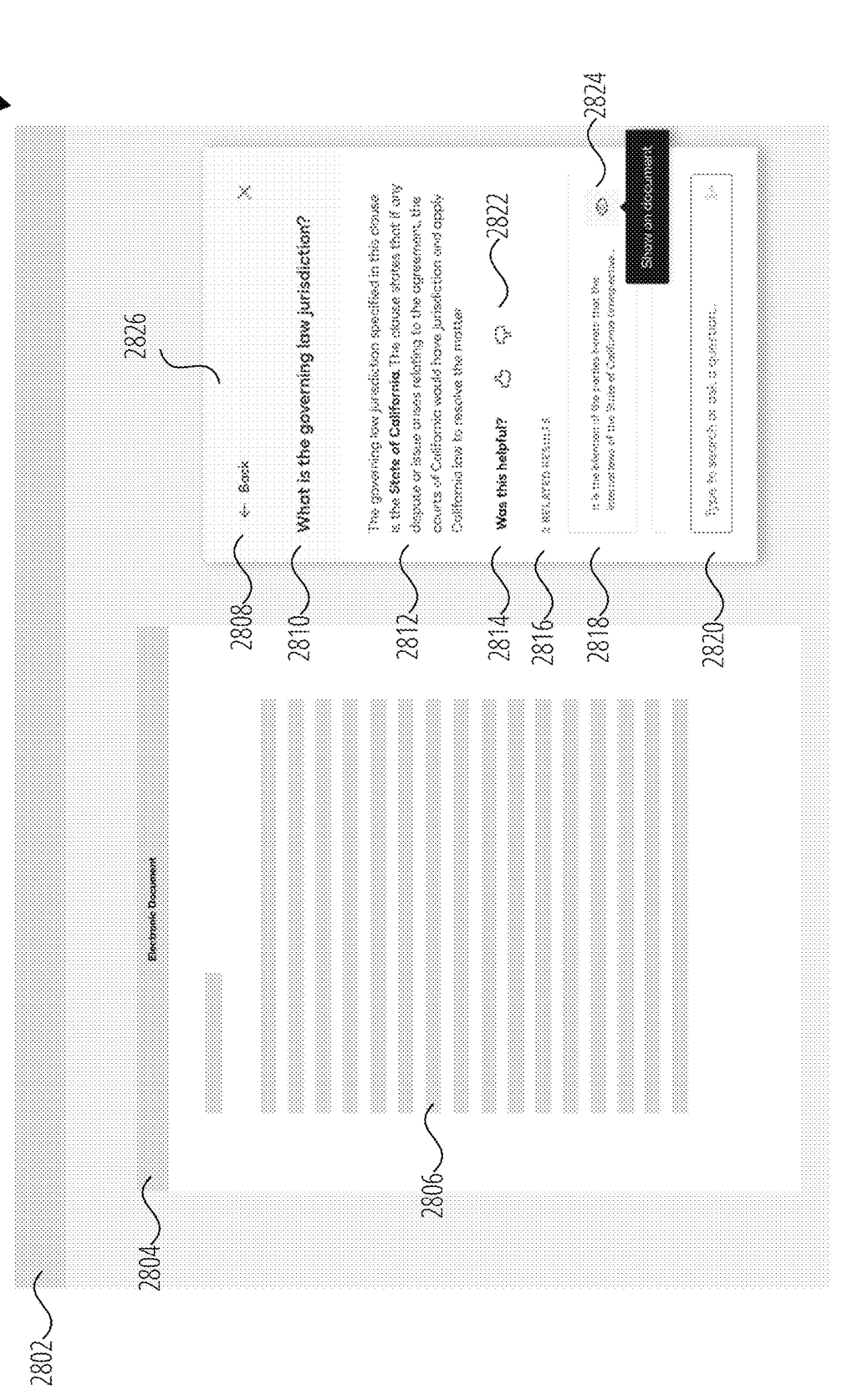
FIG. 28 illustrates a GUI view 2800 in accordance with one embodiment.

In some embodiments, the UI 1806 may be configured to display not only the summary of the electronic document, but also, as shown in FIGS. 26-28, a table of contents of the document, a search window, one or more common or typical queries that may be requested in relation to this type of electronic document. The table of contents (e.g., a table of contents, 2614 as shown in FIG. 26) may be generated based on an analysis of content of the electronic document and may be in any desired shape and/or form. In some embodiments, a specific format of the table of contents may be specified (e.g., by the user, by the system 1800, etc.), and subsequently, generated in accordance with such format.

A search window (e.g., search window 2610 as shown in FIG. 26) may also be presented on the GUI view of the UI device 1806 and may allow the user to enter various terms that may be used to generate a search query that may be submitted to one or more generative AI engines (e.g., engine 1822) to analyze content and/or any abstractive summaries that may have been generated to determine an answer to such query. The terms may be entered in a natural language and/or in any other desired format (e.g., code, etc.). The search terms may be entered as complete sentences (e.g., "What is the governing law of this agreement?") and/or as keywords (e.g., "governing law"). The system 1800 may be configured to perform a recognition analysis of the entered terms and form an appropriate query.

Alternatively, or in addition, multiple queries may be formed based on the entered terms. Such multiple queries may be formed based on different interpretations of the entered terms (e.g., an entered term "law" may prompt generation of a query "what is the governing law of this agreement?" and/or a query "what is an applicable law related to employment provisions covering employees located in state A?", etc.). Moreover, the system 1800, upon analyzing entered terms, may be configured to request the user to clarify the terms, such as, for example, by entering additional terms, before forming a particular query. This may reduce an amount of processing that may need to be performed by the components of the system 1800 in determining the specific information that may have been sought by the user.

In some embodiments, one or more common queries or searches (e.g., searches 2618-2622 as shown in FIG. 26) may be generated by the system 1800. Such common queries may be formed based on various aspects of the electronic document. For example, a common query related to a master purchase agreement may include queries related to identification of payment terms (e.g., "What are the payment terms?" 2618), terms and conditions of the agreement (e.g., "What are the terms and conditions?" 2620), duration and termination of the agreement (e.g., "What is the contract duration?" 2622), and many others. The common queries may also be specific to a particular type of document (e.g., purchase agreements, lease agreements, etc.), particular users (e.g., procurement officers of corporation, management of a company, etc.), and/or any other factors.

In some embodiments, the UI 1806 may be configured to generate a GUI view that may include at least one of the following: one or more views of the one or more electronic documents, one or more views of text information associated with the one or more electronic documents, one or more views of graphical elements associated with one or more AI assistants, one or more views of one or more tables of contents associated with the one or more electronic documents, one or more views of common searches, one or more views of one or more defined search queries, one or more views of one or more document summaries associated with entireties of the one or more electronic documents, one or more views associated with one or more portions of the one or more electronic documents, one or more views of one or more feedback icons, one or more views of one or more search queries, one or more views of one or more text snippets associated with the one or more electronic documents and related to the abstractive summary, and any combinations thereof. As can be understood, any other views may be generated by the user device 1802 on the UI 1806.

Referring back to FIG. 18, the user of the user device 1802, via the UI 1806, may be configured to retrieve one or more electronic documents from the Document store 1808. The retrieved electronic document may be in any desired format and/or may be converted to a predetermined format. Once the electronic document is retrieved, the user may use one or more electronically selectable elements (e.g., buttons, sliders, links, etc.) to request the system 1800 to generate an abstractive summary of the electronic document. The abstractive summary of the electronic document may be generated in accordance with one or more principles discussed above with regard to FIGS. 1-17. In some embodiments, the analysis engine 1810 and/or the semantic search engine 1816 may be configured to perform a document context analysis (e.g., using document context analyzer component 1812 of the analysis engine 1810) and generate a context summary (e.g., Context summary generator 1818) of the electronic document. In some example, non-limiting embodiments, the engines 1810 and 1816 may be configured to generate context summary (e.g., as Context information 1820) based on at least one of the following: a metadata for the electronic document, a location information for the electronic document, an access history for the electronic document, usage statistics for the electronic document, one or more hyperlinks to one or more other electronic documents, a content summary, one or more labels or tags for the electronic document, a semantic context for the electronic document, one or more document types associated with the electronic document, one or more identification data associated with the electronic document, one or more user(s) information associated with the electronic document, and any combinations thereof.

In some embodiments, as discussed above in connection with FIGS. 1-17, the engines 1810 and 1816, upon receiving a query to generate a summary of the document (and/or any other type of query, such as, for example, a query seeking specific information about the document contents) may be configured to generate one or more contextualized embeddings for the query. The contextualized embeddings may be configured to form a search vector (e.g., as shown in FIGS. 7-8). Subsequently, a set of candidate document vectors that may be semantically similar to the search vector may be retrieved. The retrieved candidate document vectors may be used to form a document index of contextualized embeddings for the electronic document, as for example is shown in FIG. 9.

The set of candidate vectors may then be transmitted and/or sent to the Generative AI engine 1822 (as shown in FIG. 18) for generation of an Abstractive summary 1804 of the electronic document. The Abstractive summary 1804 may then be provided to the user device 1802 and/or displayed on the UI 1806. Alternatively, or in addition, the Abstractive summary 1804 may also be stored in a storage location, such as, for example, the Document store 1808. The Document store 1808 may be configured to link and/or, otherwise, associated the generated Abstractive summary 1804 with the electronic document for which it was generated. Moreover, the Abstractive summary 1804 may also be linked to and/or associated with any other electronic documents in the Document store 1808. This way, any future requests related to the electronic document may quickly be processed based on the stored Abstractive summary 1804.

In some embodiments, a query generator component 1814 of the analysis engine 1810 may be used to generate one or more queries related to the electronic document retrieved from the Document store 1808. The queries may be based on the generated Abstractive summary 1804 and/or the document. The queries may be generated as a result of the activation of one or more selectable graphical elements (e.g., buttons, sliders, links, etc.) on the UI 1806. The queries, as discussed above, may be queries entered by the user, one or more common queries, and/or any other types of queries.

The query may be transmitted and/or sent to the Generative AI engine 1822 (along with the Abstractive summary 1804 and/or any other information) for processing. The Generative AI engine 1822 may be configured to execute an analysis of the received query, Abstractive summary 1804 and/or any other information to determine an appropriate response. Any response generated by the engine 1822 may then be transmitted or sent to the user device 1802.

Figure 19:
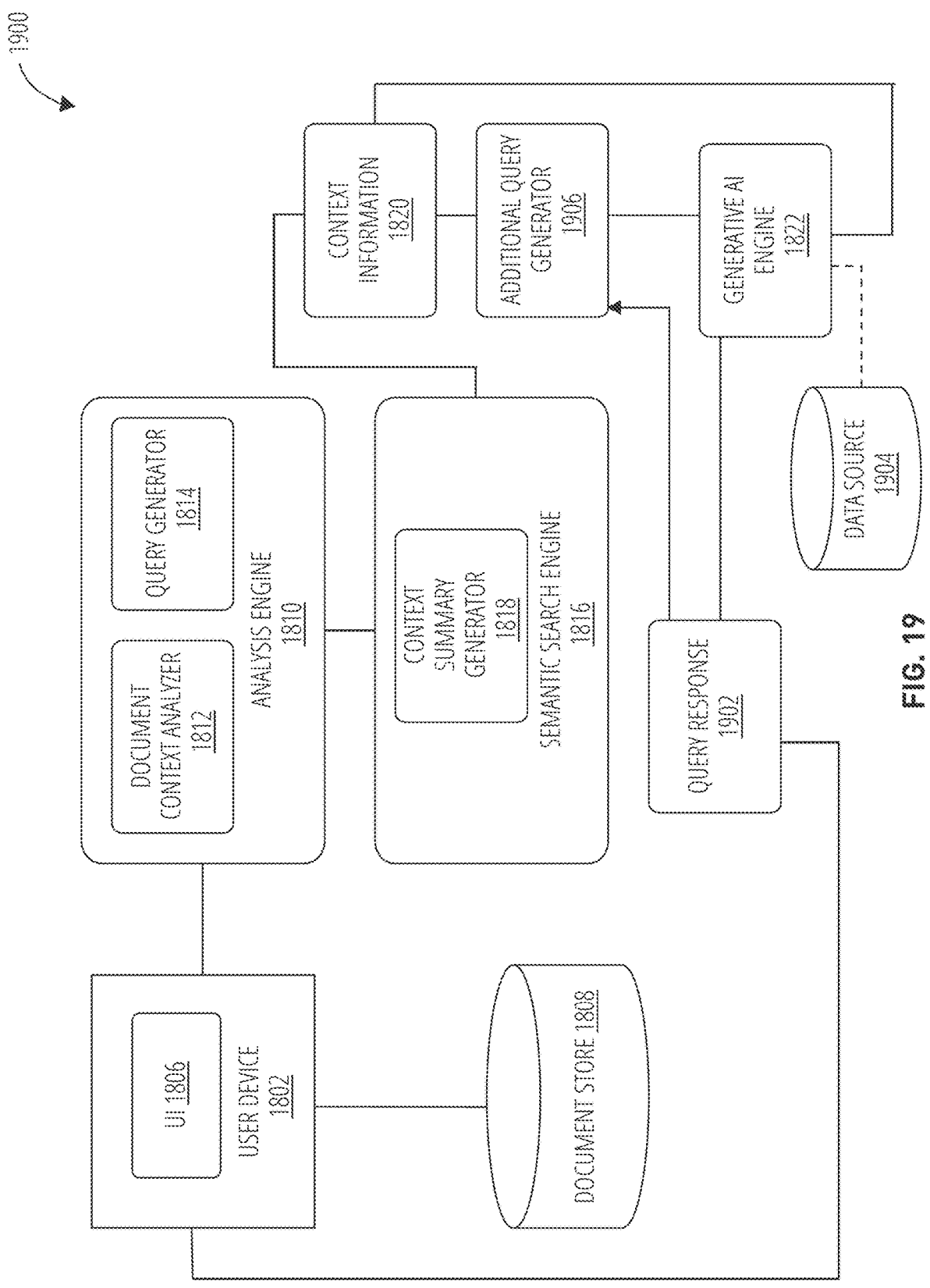
FIG. 19 illustrates an aspect of the subject matter in accordance with one embodiment.

FIG. 19 illustrates an alternate exemplary system 1800 for performing analysis of an electronic document and generating an abstractive summary of the document and/or a response to query seeking information contained in the electronic document. The system 1900 may be similar to system 1800 and may include one or more of the similar components of the system 1800, such as, for example, the user device 1802 with the UI 1806, the Document store 1808, the analysis engine 1810, the semantic search engine 1816, and optionally, the Generative AI engine 1822. In additional to these components, system 1900 may be configured to include an additional query generator component 1906 and/or a Data source 1904. Similar to FIG. 18, the components of the system 1900 may be similarly embodied (e.g., any combination of hardware and/or software, etc.) and/or communicatively coupled as, for example, components of the system 1800.

In some embodiments, the system 1900 may be configured to execute one or more queries and/or additional queries related to any electronic documents that may be retrieved from the Document store 1808. The queries may be formed in a natural language format and/or any other desired format. The queries may also be formed automatically and/or manually entered by the user via the UI 1806.

The formed queries may be transmitted and/or sent via the Additional query generator 1906 to the Generative AI engine 1822 for processing. The Additional query generator 1906 may be configured to form a query based on one or more abstractive summaries (e.g., Abstractive summaries 1804 as shown in FIG. 18) and/or any other information and/or data contained in the electronic document. Any Query responses 1902 (which may or may not include abstractive summaries of the electronic document, any prior query responses, and/or any other data, information associated with the electronic document, etc.) may be received by the additional query generator component 1906 and transmitted/sent to the engine 1822 for processing. Using the information provided (e.g., abstractive summary, prior query responses, and/or the electronic document, etc.), the engine 1802 may be configured to generate a query response and transmit/send it to the user device 1802 for display on UI 1806.

Alternatively, or in addition, in responding to the queries relating to the electronic document, the Generative AI engine 1822 may also be configured to optionally query one or more external data sources 1904. The external data sources 1904 may be any databases, storage locations, electronic repositories, etc. that may include information, data, etc. that may be relevant to the analysis of the electronic document. The external data sources 1904 may be private, public (e.g., government databases, etc.) and/or any combination thereof.

In generating a response to a particular query received from the Additional query generator 1906, the Generative AI engine 1822 may be configured to determine that additional information may be needed to interpret a particular language in the electronic document. For example, the engine 1822, in response to a query "what is the governing law of this agreement?" may determine that a general response to the query may be the "law of state A, country X" and that certain provisions of the agreement may be covered by the "law of state B, country Y". Such determination may, for example, be made based on one or more triggers in the received query, abstractive summary, and/or the electronic document. The trigger may be generated by engines 1810 and/or 1816 after analysis of the context of the electronic document and may specifically indicate that access to an external data source may be needed to answer a particular aspect of the query. Upon detecting such trigger, the engine 1822 may determine the source 1904 that needs to be accessed and generate an appropriate request to that external data source for information. Once answer from the external source 1904 is received, the engine 1822 may generate a response to the query and transmit/send it to the user device 1802.

In some embodiments, after responding to the query, the engine 1822 may be configured to also transmit/send response to the engines 1810 and 1816 for the purposes of updating Context information 1820. The updated information (e.g., general law of the agreement and specific law as applicable to specific agreement provisions) with and/or without the previously generated Query responses 1902 may be used in formulating further queries by the Additional query generator 1906, and/or generation of responses to such queries by the engine 1822. As can be understood, such further queries may be generated automatically and/or upon receiving a prompt (e.g., a request for information) from the user via the UI 1806.

The repetitive and learning nature of the above process as performed by the system 1900 (and/or system 1800) may allow the current subject matter to generate and/or refine formulation of the queries. It may also allow for provision of more accurate and/or complete answers to user's queries. This way, the user might not be forced to submit multiple queries seeking more precise information in connection with one or more aspects of the electronic document.

Figure 20:
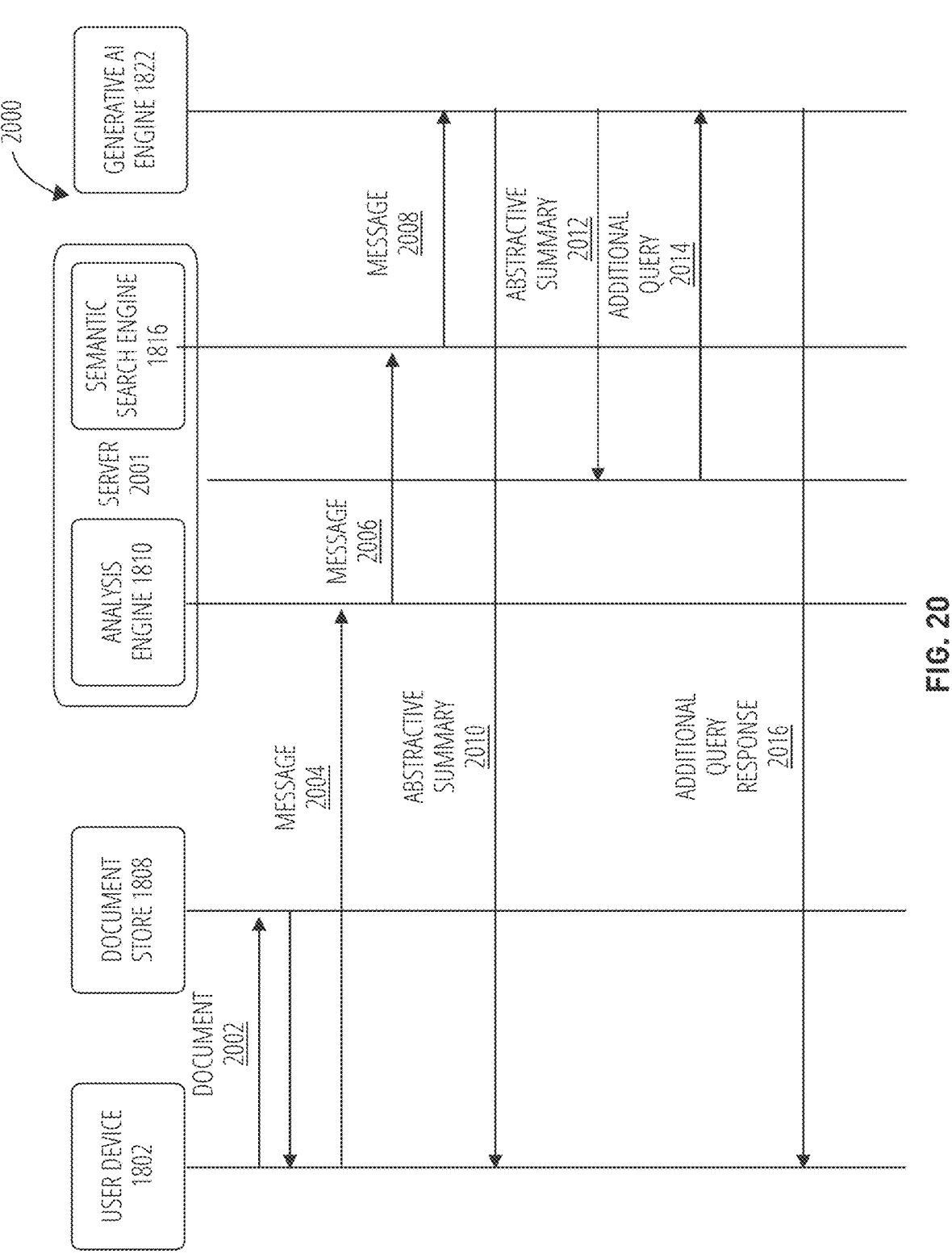
FIG. 20 illustrates an aspect of the subject matter in accordance with one embodiment.

FIG. 20 illustrates an exemplary message flow process 2000. The message flow process 2000 may be executed by one or more components of the systems 1800 and 1900, as shown in FIGS. 18 and 19. By way of a non-limiting example, the process 200 may be executed between user device 1802, Document store 1808, analysis engine 1810 and/or semantic search engine 1816 (one or both of which may be embodied in a server 2001), and optionally Generative AI engine 1822. The Generative AI engine 1822 may be a separate component and/or may be embodied in the server 2001.

At 2002, the user device 1802 may be configured to issue a request to the Document store 1808 to retrieve an electronic document that may be stored thereat. The request to retrieve the electronic document may be a result of a user activating one or more selectable graphical elements (e.g., clicking a button, sliding a slider, clicking a link, etc.) on the UI 1806 (not shown in FIG. 20). Alternatively, or in addition, the request may be in form of a query—"please find a master purchase agreement between companies A and B executed on Jan. 1, 2023."

The request for the document may be transmitted/sent to the Document store 1808. The Document store 1808 may perform a search to retrieve the document. The search may be performed using one or more identifiers related to the document and/or other information identifying the document. Once the document is retrieved, it may be transmitted to the user device 1802 and/or to the server 2001. The user device 1802 (and/or alternatively, the Document store 1808) may be configured to communicate, at 2004, with the server 2001 to transmit the electronic document (unless it is directly transmitted from the Document store 1808 to the server 2001) and request the server 2001 to execute a contextual analysis of the electronic document.

The server 2001 may activate the analysis engine 1810 and/or the semantic search engine 1816 to perform analysis of context of the electronic document and generate a context summary of the electronic document, where the engine 1810 may, at 2006, provide context information associated with the electronic document to the engine 1816 for generation of an context summary. As stated above, the summary may be generated based on a metadata for the electronic document, a location information for the electronic document, an access history for the electronic document, usage statistics for the electronic document, one or more hyperlinks to one or more other electronic documents, a content summary, one or more labels or tags for the electronic document, a semantic context for the electronic document, one or more document types associated with the electronic document, one or more identification data associated with the electronic document, one or more user(s) information associated with the electronic document, and/or any combinations thereof.

At 2008, the context information (e.g., Context information 1820) may be provided to the Generative AI engine

1822. As discussed above, the engine 1822 may be configured to generate an abstractive summary of the electronic document based on the provided context information. The engine 1822 may then provide the abstractive summary to the user device 1820, at 2010. The abstractive summary may be displayed on the user device's UI 1806.

Further, the engine 1822 may be configured to provide the abstractive summary to the server 2001, at 2012. The provided summary may be used in aiding the engine 1822 with generation of responses (at 2016) to any further queries that may be submitted, at 2014. The queries may be presented by the user via the UI 1806 of the user device 1802. Alternatively, or in addition, the queries may be automatically generated by on the server 2001 and/or any other components of the systems 1800 and/or 1900.

FIG. 21 illustrates an exemplary process 2100 for processing one or more electronic documents, according to some embodiments of the current subject matter. The process 2100 may be executed using one or more aspects of the current subject matter, as discussed above in connection with FIGS. 1-20, and, some non-limiting implementations, systems 1800 and/or 1900 shown in FIGS. 18 and 19, respectively. The process 2100 may be executed using one or more processors, memories, and/or any other computing components.

At 2102, a user device (e.g., user device 1802 as shown in FIGS. 18-19) may be configured to receive a selection signal from a graphical user interface (GUI) element of a GUI view (e.g., as displayed on the UI 1806). The selection signal may be configured to represent a request for a summary of an electronic document. The electronic document may be stored in the Document store 1808 that may be communicatively coupled to the user device 1802.

At 2104, the electronic document may be provided to one or more servers (e.g., server 2001 that may, in response to the selection signal received from the GUI, incorporate analysis engine 1810 and/or semantic search engine 1816) that may process the electronic document and retrieve context information associated with such electronic document. In some non-limiting embodiments, the context information may include information that may represent a meaning and/or interpretation of document's content within the electronic document. For example, the electronic document's context may be a master purchase agreement between company A and company B and its content may relate to various terms and conditions associated therewith.

At 2106, the server(s) (e.g., server 2001) may be configured to generate a search query, based on the context information. In some non-limiting, example embodiments, the search query may be expressed in a natural language representation and may request a search for information within the electronic document. As can be understood, the query may be expressed in any desired representation and is not limited to the natural language representation.

The server(s) (e.g., server 2001) may generate one or more contextualized embeddings for the search query to form one or more search vectors, at 2108. A set of candidate document vectors that may be semantically similar to the search vector may be retrieved from a document index of contextualized embeddings for the electronic document, at 2110.

In some embodiments, the server(s) may be configured to send a request to a generative artificial intelligence (AI) model (e.g., Generative AI engine 1822 as shown in FIGS. 18 and 19) to generate, at 2112, an abstractive summary of document content for the set of candidate document vectors. The abstractive summary may likewise be expressed in a natural language representation. The Generative AI engine 1822 may be configured to generate the abstractive summary from the generative AI model, at 2114, and, for example, provide it to the user device 1802 and/or the server(s) 2001, which may further use it to process any additional queries.

FIG. 22 illustrates an exemplary process 2200 for generating responses to one or more additional queries associated with the electronic document that has been processed using process 2100, according to some embodiments of the current subject matter. Again, the process 2200 may be performed in accordance with the discussion of FIGS. 1-20 presented above.

At 1202, another selection signal may be transmitted from the GUI element or at least another GUI element of the GUI view of the UI 1806. This may be a result of the user pressing another button, sliding a slider, clicking a link, etc. The selection signal may be transmitted to the server 2001 and may represent a query looking for information about a particular aspect of the document. The query may be a standard query (e.g., as shown in FIG. 26) and/or any other type of query. The queries may be automatically generated, such as, for example, without involvement of the user.

In response to receiving the selection signal, the server 2001 may be configured to form one or more additional search queries, at 2204. The additional queries may be formed based on at least one of: the context information associated with the electronic document, the abstractive summary of document content, and any combination thereof. In some embodiments, the generated additional queries may also be presented (e.g., displayed) on the UI 1806, at 2206.

The server 2001 may trigger execution of the additional queries, at 2208, by transmitting the queries to the generative AI engine 1822 for generation of another abstractive summary of content in the electronic document that may be responsive to the additional search query, at 2210. For example, an additional query may seek more details about specific terms (e.g., termination terms) of a master purchase agreement. The engine 1822 may be configured to use determined context of the agreement, its abstractive summary and/or responses to prior queries, to generate a response to the additional query. Such additional abstractive summary (e.g., summary of termination terms of the master purchase agreement) may be transmitted from the engine 1822 to the user device 1802 and displayed, at 2212, on the UI 1806.

FIG. 23 illustrates another exemplary process 2300 for generating responses to one or more additional queries associated with the electronic document that has been processed using process 2100, according to some embodiments of the current subject matter. The process 2300 may be executed in accordance with the discussion of FIGS. 1-20 presented above.

In some embodiments, one or more additional search queries for information included within the electronic document may be received by the server 2001, at 2302. Such queries may be transmitted from the user device 1802 and/or automatically generated by the server 2001. The queries may be one or more standard queries (e.g., as shown in FIG. 26) and/or one or more custom queries, that may, for instance, be generated by the user of the user device 1802. The search queries may be related to at least one of: the context information associated with the electronic document, the abstractive summary of document content (which may have been previously generated by the generative AI engine 1822), and any combination thereof.

The additional search queries may be transmitted to the generative AI engine 1822 for generating another abstractive summary of document content in the electronic document that may be specifically responsive to one or more of such additional search queries, at 2304. Once the generative AI engine 1822 generates responses to such additional queries, the results (e.g., abstractive summaries of document content related to specific portions of the document) may be provided to the user device 1802 for display on the UI 1806, at 2306.

FIG. 24 illustrates another exemplary process 2400 for processing one or more electronic documents, according to some embodiments of the current subject matter. The process 2400 may be performed in accordance with one or more aspects of the current subject matter, as, for example, shown and discussed in one or more of FIGS. 1-20. In some non-limiting implementations, systems 1800 and/or 1900 shown in FIGS. 18 and 19, respectively, may be used to execute one or more aspects and/or operations of the process 2400. The process 2400 may likewise be executed using one or more processors, memories, and/or any other computing components.

In some embodiments, the process 2400 may be initiated upon retrieving context information associated with the electronic document in response to a selection signal representing a request for a summary of an electronic document. The selection signal may be received from a graphical user interface (GUI) element of UI 1806, for example. As discussed above, the selection signal may be triggered upon user of the user device 1802 pressing a button on the UI, clicking a link, sliding a slider, etc. The context information may include information that may represent various aspects of the electronic document's content that may be contained within the electronic document.

The process 2400 may then proceed to generating a search query based on the context information, at 2404. The search query may again be expressed in any desired format, including, but not limited to, a natural language representation. Such search query may seek to search information contained within electronic document. As discussed above, one or more contextualized embeddings for the search query may be generated and used to form a search vector, triggering retrieval of a semantically similar set of candidate document vectors from a document index of contextualized embeddings for the electronic document, at 2406-2408, respectively.

Once set of candidate document vectors has been retrieved (as may be accomplished using a server 2001 that may include the analysis engine 1810 and/or the semantic search engine 1816, as shown in FIGS. 18-20), the process 2400 may proceed to send a request to the generative AI engine 1822 to generate an abstractive summary of the document content, at 2410, and provide an appropriate response containing such abstractive summary, at 2412. The summary may be displayed on the UI 1806 of the user device 1802. Such abstractive summary may be expressed in any desired representation, including, but not limited to, a natural language representation, at 2410.

FIG. 25 illustrates yet another exemplary process 2500 for processing one or more electronic documents, according to some embodiments of the current subject matter. The process 2500 may also be executed using one or more components and/or operations as shown and discussed in FIGS. 1-20. At 2502, the process 2500 may be configured to execute an operation of generating a search query based on a context information associated with an electronic document that may be retrieved from a document store (e.g., document store 1808). The search query may be expressed in any desired representation (e.g., a natural language representation). The query may request a search for information within the document.

In operations 2504-2506, the process 2500 may be configured to perform generating a contextualized embedding for the search query, forming a search vector based on the generated contextualized embedding, and retrieving a set of candidate document vectors that may be semantically similar to the search vector from a document index of contextualized embeddings for the electronic document. The generative AI engine (e.g., engine 1822 shown in FIGS. 18-20) may be configured to receive a request, which may include the set of candidate document vectors, to generate an abstractive summary of document content, and present a response containing generated abstractive summary, at 2508-2510. The summary may be in any desired representation, including, for example, natural language representation.

FIG. 26 illustrates a GUI view 2600. The GUI view 2600 may comprise various GUI elements suitable for initiating the semantic search generator 702 of the search manager 124 to perform semantic searching of an electronic document. The GUI view 2700 may be presented on an electronic display of the server device 102 or the client devices 112, 116.

As depicted in FIG. 26, the GUI view 2600 may include a GUI element 2602 presenting a main GUI view with a sub-view of an electronic document 2604 having text information 2606. The GUI element 2602 may also include a GUI element 2608 with a sub-view of an AI assistant with a text description of an "AI Assistant Powered by DocuSign AI." The AI assistant sub-view may coalesce GUI elements that allow a user to interact with the underlying AI/ML features to perform semantic searches and summarization of the electronic document 2604.

The AI assistant sub-view shown by the GUI element 2608 may further include a GUI element 2610 comprising a search box with a text description to "Type to search or ask a question" with an icon to enter the search query. The GUI element 2608 further includes a GUI element 2612 that is a box with text information of "View document summary" and an arrow icon that when selected by a user presents a document summary of the text information 1806 for the electronic document 2604. The GUI element 2608 may also include a GUI element 2614 that is a box with text information of "Table of Contents" and an arrow icon that when selected by a user presents a table of contents for the text information 2606 of the electronic document 2604.

The GUI element 2608 may also include a GUI element 2616 with a text description of "Common Searches." Beneath the GUI element 2616 are three GUI elements 2618, 2620, and 2622 corresponding to lightning bolt icons with associated text descriptions "What are the payment terms?" and "What are the terms and conditions?" and "What is the contract duration?", respectively. When a user selects a GUI element 2618, 2620 or 2622, the GUI element automatically formulates and sends a search query 144 with the corresponding text to the search manager 124 to initiate a semantic search. Alternatively, the selection may surface search results 146 for the search query 144 that were previously stored in a data store 126.

FIG. 27 illustrates a GUI view 2700. The GUI view 2700 may comprise various GUI elements suitable for initiating the semantic search generator 702 of the search manager 124 to perform semantic searching of an electronic document.

The GUI view 2700 may be presented on an electronic display of the server device 102 or the client devices 112, 116.

As depicted in FIG. 27, the GUI view 2700 may comprise a GUI element 2702 which is a main view presenting an electronic document 2704 and text information 2706 for the electronic document 2706, similar to the GUI view 2600. In addition, the GUI view 2700 may include a GUI element 2722 that is a sub-view for a document summary 2712 of the entire text information 2706 of the electronic document 2704, such as an abstractive summary 148. The GUI element 2722 may replace the AI sub-view when the arrow icon for the GUI element 2612 is activated by a user. The GUI element 2722 further includes a GUI element 2714 that presents text information "Was this helpful?" with associated thumbs up and thumbs down icons that when selected by a user gives user feedback for the document summary 2712. The GUI element 2722 also includes a GUI element 2716 with a text description of "12 RELATED RESULTS" which when selected by a user presents a GUI view of related search results or alternative document summaries.

The GUI element 2722 further includes a GUI element 2718 presenting a search box with a text description of "Type to search or ask a question . . . " to receive a search query 144 and an icon to initiate a semantic search in response to the search query 144.

FIG. 28 illustrates a GUI view 2800. The GUI view 2700 may comprise various GUI elements suitable for initiating the semantic search generator 702 of the search manager 124 to perform semantic searching of an electronic document. The GUI view 2800 may be presented on an electronic display of the server device 102 or the client devices 112, 116.

As depicted in FIG. 28, the GUI view 2800 may comprise a GUI element 2802 which is a main view presenting an electronic document 2804 and text information 2806 for the electronic document 2804, similar to the GUI view 2600 and the GUI view 2700. In addition, the GUI view 2800 may include a GUI element 2826 that is a sub-view for a document summary 2812 of portions of the text information 2806 of the electronic document 2804 responsive to a search query 144 of "What is the governing law jurisdiction," such as an abstractive summary 148. The GUI element 2826 may replace the AI assistant sub-view when the search query 144 is entered into the search box of the GUI element 2610 or the GUI element 2718, and the associated arrow icon for the GUI element 2610 or the GUI element 2718, respectively, is activated by a user. The GUI element 2826 further includes a GUI element 2814 that presents text information "Was this helpful?" with associated thumbs up and thumbs down icons that when selected by a user gives user feedback for the document summary 2812.

The GUI element 2826 also includes a GUI element 2816 with a text description of "2 RELATED RESULTS" which when selected by a user presents a GUI view of related search results or alternative document summaries. The GUI element 2826 also includes a GUI element 2818 with a text box showing a text snippet of the text information 2806 of the electronic document 2804 related to the document summary 2812. The GUI element 2818 may include a GUI element 2824 that is an eye icon that when selected by a user changes a view of text information 2806 for the electronic document 2804 to a view that presents the text information associated with the text snippet. In this manner, a user may quickly navigate to source text information 2806 within the electronic document 2804 by selecting the GUI element 2824.

The GUI element 2826 further includes a GUI element 2820 presenting a search box with a text description of "Type to search or ask a question . . . " to receive a search query 144 and an icon to initiate a semantic search in response to the search query 144.

Figure 29:
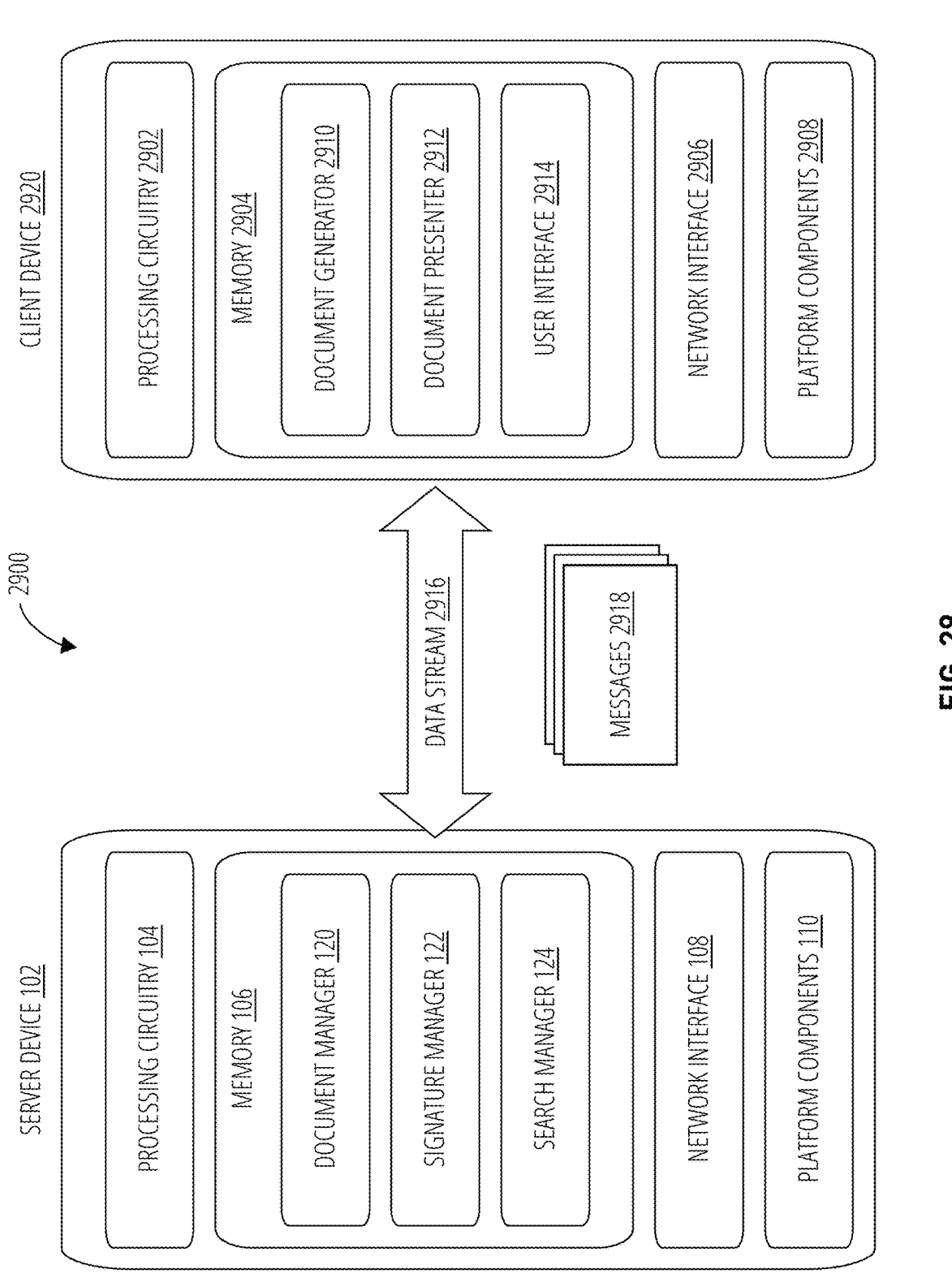
FIG. 29 illustrates a distributed system 2900 in accordance with one embodiment.

FIG. 29 illustrates a distributed system 2900. The distributed system 2900 may implement the server device 102 communicating a data stream 2916 to a client device 2920. The client device 2920 may comprise an example implementation for the client devices 112, the client devices 116, the client device 212, the client device 214 and/or the client device 218. The client device 2920 may comprise processing circuitry 2902 communicatively coupled to a memory 2904. The memory 2904 may store instructions that when executed by the processing circuitry 2902 may cause the processing circuitry 2902 to perform operations for a document generator 2910, a document presenter 2912 and a user interface 2914. A client 210 may interact with the client device 2920 via the user interface 2914 to generate an electronic document 142 using the document manager 120 of the server device 102. Control and media information to coordinate generation of the electronic document 142 may be transported by one or more messages 2918 over the data stream 2916 via the network interface 2906 over a wired or wireless communication medium. The client 210 may interact with the client device 2920 via the user interface 2914 to render or present an electronic document 142 on an input/output (I/O) device of the platform components 2908, such as touch screen of the client device 2920, to perform various operations on an electronic document 142, such as generate the electronic document 142, present the electronic document 142, attach an electronic signature to the electronic document 142, and so forth.

Figure 30:
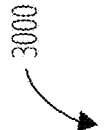
FIG. 30 illustrates a computer-readable storage medium 3002 in accordance with one embodiment.

FIG. 30 illustrates an apparatus 3000. Apparatus 3000 may comprise any non-transitory computer-readable storage medium 3002 or machine-readable storage medium, such as an optical, magnetic or semiconductor storage medium. In various embodiments, apparatus 3000 may comprise an article of manufacture or a product. In some embodiments, the computer-readable storage medium 3002 may store computer executable instructions with which circuitry can execute. For example, computer executable instructions 3004 can include instructions to implement operations described with respect to any logic flows described herein. Examples of computer-readable storage medium 3002 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 3004 may include any suitable type of code, such as source code, compiled code, interpreted code, executable code, static code, dynamic code, object-oriented code, visual code, and the like.

FIG. 31 illustrates an embodiment of a computing architecture 3100. Computing architecture 3100 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 3100 may have a single processor with one core or more than one processor. Note that the term "processor" refers to a processor with a single core or a processor package with multiple processor cores. In at least one embodiment, the computing architecture 3100 is representative of the components of the system 100. More generally, the computing architecture 3100 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 3100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in FIG. 31, computing architecture 3100 comprises a system-on-chip (SoC) 3102 for mounting platform components. System-on-chip (SoC) 3102 is a point-to-point (P2P) interconnect platform that includes a first processor 3104 and a second processor 3106 coupled via a point-to-point interconnect 3170 such as an Ultra Path Interconnect (UPI). In other embodiments, the computing architecture 3100 may be of another bus architecture, such as a multi-drop bus. Furthermore, each of processor 3104 and processor 3106 may be processor packages with multiple processor cores including core(s) 3108 and core(s) 3110, respectively. While the computing architecture 3100 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform may refers to a motherboard with certain components mounted such as the processor 3104 and chipset 3132. Some platforms may include additional components and some platforms may only include sockets to mount the processors and/or the chipset. Furthermore, some platforms may not have sockets (e.g., SoC, or the like). Although depicted as a SoC 3102, one or more of the components of the SoC 3102 may also be included in a single die package, a multi-chip module (MCM), a multi-die package, a chiplet, a bridge, and/or an interposer. Therefore, embodiments are not limited to a SoC.

The processor 3104 and processor 3106 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 3104 and/or processor 3106. Additionally, the processor 3104 need not be identical to processor 3106.

Processor 3104 includes an integrated memory controller (IMC) 3120 and point-to-point (P2P) interface 3124 and P2P interface 3128. Similarly, the processor 3106 includes an IMC 3122 as well as P2P interface 3126 and P2P interface 3130. IMC 3120 and IMC 3122 couple the processor 3104 and processor 3106, respectively, to respective memories (e.g., memory 3116 and memory 3118). Memory 3116 and memory 3118 may be portions of the main memory (e.g., a dynamic random-access memory (DRAM)) for the platform such as double data rate type 4 (DDR4) or type 5 (DDR5) synchronous DRAM (SDRAM). In the present embodiment, the memory 3116 and the memory 3118 locally attach to the respective processors (i.e., processor 3104 and processor 3106). In other embodiments, the main memory may couple with the processors via a bus and shared memory hub. Processor 3104 includes registers 3112 and processor 3106 includes registers 3114.

Computing architecture 3100 includes chipset 3132 coupled to processor 3104 and processor 3106. Furthermore, chipset 3132 can be coupled to storage device 3150, for example, via an interface (I/F) 3138. The I/F 3138 may be, for example, a Peripheral Component Interconnect-enhanced (PCIe) interface, a Compute Express Link® (CXL) interface, or a Universal Chiplet Interconnect Express (UCIe) interface. Storage device 3150 can store instructions executable by circuitry of computing architecture 3100 (e.g., processor 3104, processor 3106, GPU 3148, accelerator 3154, vision processing unit 3156, or the like). For example, storage device 3150 can store instructions for server device 102, client devices 112, client devices 116, or the like.

Processor 3104 couples to the chipset 3132 via P2P interface 3128 and P2P 3134 while processor 3106 couples to the chipset 3132 via P2P interface 3130 and P2P 3136. Direct media interface (DMI) 3176 and DMI 3178 may couple the P2P interface 3128 and the P2P 3134 and the P2P interface 3130 and P2P 3136, respectively. DMI 3176 and DMI 3178 may be a high-speed interconnect that facilitates, e.g., eight Giga Transfers per second (GT/s) such as DMI 3.0. In other embodiments, the processor 3104 and processor 3106 may interconnect via a bus.

The chipset 3132 may comprise a controller hub such as a platform controller hub (PCH). The chipset 3132 may include a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 3132 may comprise more than one controller hub such as a chipset with a memory controller hub, a graphics controller hub, and an input/output (I/O) controller hub.

In the depicted example, chipset 3132 couples with a trusted platform module (TPM) 3144 and UEFI, BIOS, FLASH circuitry 3146 via I/F 3142. The TPM 3144 is a dedicated microcontroller designed to secure hardware by integrating cryptographic keys into devices. The UEFI, BIOS, FLASH circuitry 3146 may provide pre-boot code. The I/F 3142 may also be coupled to a network interface circuit (NIC) 3180 for connections off-chip.

Furthermore, chipset 3132 includes the I/F 3138 to couple chipset 3132 with a high-performance graphics engine, such as, graphics processing circuitry or a graphics processing unit (GPU) 3148. In other embodiments, the computing architecture 3100 may include a flexible display interface (FDI) (not shown) between the processor 3104 and/or the processor 3106 and the chipset 3132. The FDI interconnects a graphics processor core in one or more of processor 3104 and/or processor 3106 with the chipset 3132.

The computing architecture 3100 is operable to communicate with wired and wireless devices or entities via the network interface (NIC) 180 using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. Wi-Fi networks use radio technologies called IEEE 802.11x (a, b, g, n, ac, ax, etc.) to provide secure, reliable, fast wireless connectivity. A Wi-Fi network can be used to connect computers to each other, to the Internet, and to wired networks (which use IEEE 802.3-related media and functions).

Additionally, accelerator 3154 and/or vision processing unit 3156 can be coupled to chipset 3132 via I/F 3138. The accelerator 3154 is representative of any type of accelerator device (e.g., a data streaming accelerator, cryptographic accelerator, cryptographic co-processor, an offload engine, etc.). One example of an accelerator 3154 is the Intel® Data Streaming Accelerator (DSA). The accelerator 3154 may be a device including circuitry to accelerate copy operations, data encryption, hash value computation, data comparison operations (including comparison of data in memory 3116 and/or memory 3118), and/or data compression. For example, the accelerator 3154 may be a USB device, PCI device, PCIe device, CXL device, UCIe device, and/or an SPI device. The accelerator 3154 can also include circuitry arranged to execute machine learning (ML) related operations (e.g., training, inference, etc.) for ML models. Generally, the accelerator 3154 may be specially designed to perform computationally intensive operations, such as hash value computations, comparison operations, cryptographic operations, and/or compression operations, in a manner that is more efficient than when performed by the processor 3104 or processor 3106. Because the load of the computing architecture 3100 may include hash value computations, comparison operations, cryptographic operations, and/or compression operations, the accelerator 3154 can greatly increase performance of the computing architecture 3100 for these operations.

The accelerator 3154 may include one or more dedicated work queues and one or more shared work queues (each not pictured). Generally, a shared work queue is configured to store descriptors submitted by multiple software entities. The software may be any type of executable code, such as a process, a thread, an application, a virtual machine, a container, a microservice, etc., that share the accelerator

3154. For example, the accelerator 3154 may be shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the accelerator 3154 via a non-posted write (e.g., a deferred memory write (DMWr)). One example of an instruction that atomically submits a work descriptor to the shared work queue of the accelerator 3154 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 3154. The dedicated work queue may accept job submissions via commands such as the movdir64b instruction.

Various I/O devices 3160 and display 3152 couple to the bus 3172, along with a bus bridge 3158 which couples the bus 3172 to a second bus 3174 and an I/F 3140 that connects the bus 3172 with the chipset 3132. In one embodiment, the second bus 3174 may be a low pin count (LPC) bus. Various devices may couple to the second bus 3174 including, for example, a keyboard 3162, a mouse 3164 and communication devices 3166.

Furthermore, an audio I/O 3168 may couple to second bus 3174. Many of the I/O devices 3160 and communication devices 3166 may reside on the system-on-chip (SoC) 3102 while the keyboard 3162 and the mouse 3164 may be add-on peripherals. In other embodiments, some or all the I/O devices 3160 and communication devices 3166 are add-on peripherals and do not reside on the system-on-chip (SoC) 3102.

FIG. 32 illustrates a block diagram of an exemplary communications architecture 3200 suitable for implementing various embodiments as previously described. The communications architecture 3200 includes various common communications elements, such as a transmitter, receiver, transceiver, radio, network interface, baseband processor, antenna, amplifiers, filters, power supplies, and so forth. The embodiments, however, are not limited to implementation by the communications architecture 3200.

As shown in FIG. 32, the communications architecture 3200 includes one or more clients 3202 and servers 3204. The clients 3202 may implement a client version of the server device 102, for example. The servers 3204 may implement a server version of the server device 102, for example. The clients 3202 and the servers 3204 are operatively connected to one or more respective client data stores 3208 and server data stores 3210 that can be employed to store information local to the respective clients 3202 and servers 3204, such as cookies and/or associated contextual information.

The clients 3202 and the servers 3204 may communicate information between each other using a communication framework 3206. The communications communication framework 3206 may implement any well-known communications techniques and protocols. The communications communication framework 3206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

(117) The communication framework 3206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11 network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 3202 and the servers 3204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The various elements of the devices as previously described with reference to FIGS. 1-32 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

The following examples pertain to further embodiments, from which numerous permutations and configurations will be apparent.

In one aspect, a method, includes receiving a search query for information within an electronic document in a natural language representation, generating a contextualized embedding for the search query to form a search vector, retrieving a set of candidate document vectors that are semantically similar to the search vector from a document index of contextualized embeddings for the electronic document, sending a request to a generative artificial intelligence (AI) model for an abstractive summary of document content for a subset of candidate document vectors, the abstractive summary to comprise a natural language representation, and receiving a response with the abstractive summary from the generative AI model.

The method may also include receiving the search query from a search box of a graphical user interface (GUI) on a web page or a click event on a GUI element on the web page.

The method may also include where the electronic document is an unsigned electronic agreement with metadata includes signature tag marker element (STME) information suitable to receive an electronic signature.

The method may also include where the contextualized embedding includes a vector representation of a sequence of words that includes contextual information for the sequence of words.

The method may also include training a bidirectional encoder representations from transformers (BERT) language model composed of multiple transformer encoder layers using training data from electronic documents associated with a defined entity and having an electronic signature.

The method may also include generating the contextualized embeddings using a transformer architecture, the transformer architecture to comprise a bidirectional encoder representations from transformers (BERT) language model composed of multiple transformer encoder layers.

The method may also include generating the contextualized embeddings using a bidirectional encoder representations from transformers (BERT) language model, indexing the contextualized embeddings for the electronic document to form the document index, and storing the document index in a database.

The method may also include where the contextualized embeddings are a word level vector, a sentence level vector, or a paragraph level vector.

The method may also include retrieving the set of candidate document vectors that are semantically similar to the search vector using a semantic ranking algorithm.

The method may also include generating a semantic similarity score for each candidate document vector in the set of candidate document vectors based on their semantic similarity to the search vector using a machine learning model, ranking the candidate document vectors in an ascending or descending order of similarity based on the semantic similarity scores, and selecting the subset of candidate document vectors from the ranked candidate document vectors.

The method may also include receiving the request by the generative AI model, generating the abstractive summary of document content for the subset of candidate document vectors in a natural language representation, and sending a response with the abstractive summary from the generative AI model.

The method may also include where the generative AI model is a natural language generation (NLG) model.

The method may also include where the generative AI model is a natural language generation (NLG) model, the NLG model to comprise a large language model (LLM) to generate the natural language representation for the abstractive summary, the LLM to comprise a deep neural network trained using supervised learning, unsupervised learning, or a combination of supervised and unsupervised learning.

The method may also include where the generative AI model is a natural language generation (NLG) model, the NLG model to comprise a large language model (LLM) to generate the natural language representation to for the abstractive summary, the LLM to comprise a deep neural network trained using a generative pre-trained transformer (GPT) language model.

The method may also include where the generative AI model is a natural language generation (NLG) model, includes training the NLG model in a first stage with a generative pre-trained transformer (GPT) language model and unsupervised training data to reach a first language modeling objective to set initial parameters, and training the NLG model in a second stage with a discriminative language model with supervised training data to reach a second language modeling objective that adapts the set of initial parameters to a specific task.

The method may also include selecting the subset of candidate document vectors from the set of candidate document vectors using a classifier.

The method may also include receiving the search vector as a first input to a classifier, receiving a candidate document vector as a second input to the classifier, generating a label to indicate whether a combination of the search vector and the candidate document vector is suitable for inclusion in the subset of candidate document vectors as an output from the classifier, and adding a candidate document vector to the subset of candidate document vectors based on the label.

The method may also include presenting the abstractive summary on a graphical user interface (GUI) of an electronic display of an electronic device.

The method may also include presenting document content of a candidate document vector on a graphical user interface (GUI) of an electronic display of an electronic device.

The method may also include presenting a portion of the unsigned electronic document with document content of a candidate document vector on a graphical user interface (GUI) of an electronic display of an electronic device.

The method may also include receiving the search query as a natural language representation of a human language in spoken form, and converting the spoken form to text form using a speech-to-text (STT) translator.

The method may also include reproducing the abstractive summary as synthesized speech over an electronic speaker. Other technical features may be readily apparent to one skilled in the art from the following figures, descriptions, and claims.

In one aspect, a method, includes receiving a search query to search for information within an electronic document by a cloud search service, the search query to comprise free form text in a natural language representation of a human language, generating a contextualized embedding for the search query to form a search vector, the contextualized embedding to comprise a vector representation of a sequence of words in the search query that includes contextual information for the sequence of words, searching a document index of contextualized embeddings for the electronic document with the search vector to retrieve a set of candidate document vectors that are semantically similar to the search vector, each contextualized embedding to comprise a vector representation of a sequence of words in the electronic document that includes contextual information for the sequence of words, sending a natural language generation (NLG) request to a generative artificial intelligence (AI) model, the NLG request to request an abstractive summary of document content for a subset of candidate document vectors from the set of candidate document vectors, the abstractive summary to comprise a natural language representation of the human language, and receiving a NLG response with the abstractive summary from the generative AI model.

In one aspect, a method, includes receiving an electronic document having document content, processing the document content to prepare for ingest by a machine learning model, splitting the document content into multiple information blocks, generating a contextualized embedding for each information block to form a corresponding document vector, each contextualized embedding to comprise a vector representation of a sequence of words in the electronic document that includes contextual information for the sequence of words, indexing the documents vectors in a document index, and storing the document index with the document vectors in a database.

In one aspect, a non-transitory computer-readable storage medium, the computer-readable storage medium including instructions that when executed by a computer, cause the computer to receive a search query for information within an electronic document in a natural language representation, generate a contextualized embedding for the search query to form a search vector, retrieve a set of candidate document vectors that are semantically similar to the search vector from a document index of contextualized embeddings for the electronic document, send a request to a generative artificial intelligence (AI) model for an abstractive summary of document content for a subset of candidate document vectors, the abstractive summary to comprise a natural language representation, and receive a response with the abstractive summary from the generative AI model.

The computer-readable storage medium may also include instructions that when executed by a computer cause the computer to receive the search query from a search box of a graphical user interface (GUI) on a web page or a click event on a GUI element on the web page.

The computer-readable storage medium may also include where the electronic document is an unsigned electronic agreement with metadata includes signature tag marker element (STME) information suitable to receive an electronic signature.

The computer-readable storage medium may also include where the contextualized embedding includes a vector representation of a sequence of words that includes contextual information for the sequence of words.

The computer-readable storage medium may also include instructions that when executed by a computer cause the computer to train a bidirectional encoder representations from transformers (BERT) language model composed of multiple transformer encoder layers using training data from electronic documents associated with a defined entity and having an electronic signature.

The computer-readable storage medium may also include instructions that when executed by a computer cause the computer to generate the contextualized embeddings using a transformer architecture, the transformer architecture to comprise a bidirectional encoder representations from transformers (BERT) language model composed of multiple transformer encoder layers.

The computer-readable storage medium may also include instructions that when executed by a computer cause the computer to generate the contextualized embeddings using a bidirectional encoder representations from transformers (BERT) language model, index the contextualized embeddings for the electronic document to form the document index, and store the document index in a database.

The computer-readable storage medium may also include where the contextualized embeddings are a word level vector, a sentence level vector, or a paragraph level vector.

The computer-readable storage medium may also include instructions that when executed by a computer cause the computer to retrieve the set of candidate document vectors that are semantically similar to the search vector using a semantic ranking algorithm.

The computer-readable storage medium may also include instructions that when executed by a computer cause the computer to generate a semantic similarity score for each candidate document vector in the set of candidate document vectors based on their semantic similarity to the search vector using a machine learning model, rank the candidate document vectors in an ascending or descending order of similarity based on the semantic similarity scores, and select the subset of candidate document vectors from the ranked candidate document vectors.

The computer-readable storage medium may also include instructions that when executed by a computer cause the computer to receive the request by the generative AI model, generate the abstractive summary of document content for the subset of candidate document vectors in a natural language representation, and send a response with the abstractive summary from the generative AI model.

The computer-readable storage medium may also include where the generative AI model is a natural language generation (NLG) model.

The computer-readable storage medium may also include where the generative AI model is a natural language generation (NLG) model, the NLG model to comprise a large language model (LLM) to generate the natural language representation for the abstractive summary, the LLM to comprise a deep neural network trained using supervised learning, unsupervised learn, or a combination of supervised and unsupervised learning.

The computer-readable storage medium may also include where the generative AI model is a natural language generation (NLG) model, the NLG model to comprise a large language model (LLM) to generate the natural language representation to for the abstractive summary, the LLM to comprise a deep neural network trained using a generative pre-trained transformer (GPT) language model.

The computer-readable storage medium may also include where the generative AI model is a natural language generation (NLG) model, includes train the NLG model in a first stage with a generative pre-trained transformer (GPT) language model and unsupervised training data to reach a first language modeling objective to set initial parameters, and train the NLG model in a second stage with a discriminative language model with supervised training data to reach a second language modeling objective that adapts the set of initial parameters to a specific task.

The computer-readable storage medium may also include instructions that when executed by a computer cause the computer to select the subset of candidate document vectors from the set of candidate document vectors using a classifier.

The computer-readable storage medium may also include instructions that when executed by a computer cause the computer to receive the search vector as a first input to a classifier, receive a candidate document vector as a second input to the classifier, generate a label to indicate whether a combination of the search vector and the candidate document vector is suitable for inclusion in the subset of candidate document vectors as an output from the classifier, and add a candidate document vector to the subset of candidate document vectors based on the label.

The computer-readable storage medium may also include instructions that when executed by a computer cause the computer to present the abstractive summary on a graphical user interface (GUI) of an electronic display of an electronic device.

The computer-readable storage medium may also include instructions that when executed by a computer cause the computer to present document content of a candidate document vector on a graphical user interface (GUI) of an electronic display of an electronic device.

The computer-readable storage medium may also include instructions that when executed by a computer cause the computer to present a portion of the unsigned electronic document with document content of a candidate document vector on a graphical user interface (GUI) of an electronic display of an electronic device.

The computer-readable storage medium may also include instructions that when executed by a computer cause the computer to receive the search query as a natural language representation of a human language in spoken form, and convert the spoken form to text form using a speech-to-text (STT) translator.

The computer-readable storage medium may also include instructions that when executed by a computer cause the computer to reproduce the abstractive summary as synthesized speech over an electronic speaker. Other technical features may be readily apparent to one skilled in the art from the following figures, descriptions, and claims.

In one aspect, a computing apparatus includes processing circuitry. The computing apparatus also includes a memory storing instructions that, when executed by the processing circuitry, cause the processing circuitry to receive a search query for information within an electronic document in a natural language representation, generate a contextualized embedding for the search query to form a search vector, retrieve a set of candidate document vectors that are semantically similar to the search vector from a document index of contextualized embeddings for the electronic document, send a request to a generative artificial intelligence (AI)

model for an abstractive summary of document content for a subset of candidate document vectors, the abstractive summary to comprise a natural language representation, and receive a response with the abstractive summary from the generative AI model.

The computing apparatus may also include the processing circuitry to receive the search query from a search box of a graphical user interface (GUI) on a web page or a click event on a GUI element on the web page.

The computing apparatus may also include where the electronic document is an unsigned electronic agreement with metadata includes signature tag marker element (STME) information suitable to receive an electronic signature.

The computing apparatus may also include where the contextualized embedding includes a vector representation of a sequence of words that includes contextual information for the sequence of words.

The computing apparatus may also include the processing circuitry to train a bidirectional encoder representations from transformers (BERT) language model composed of multiple transformer encoder layers using training data from electronic documents associated with a defined entity and having an electronic signature.

The computing apparatus may also include the processing circuitry to generate the contextualized embeddings using a transformer architecture, the transformer architecture to comprise a bidirectional encoder representations from transformers (BERT) language model composed of multiple transformer encoder layers.

The computing apparatus may also include the processing circuitry to generate the contextualized embeddings using a bidirectional encoder representations from transformers (BERT) language model, index the contextualized embeddings for the electronic document to form the document index, and store the document index in a database.

The computing apparatus may also include where the contextualized embeddings are a word level vector, a sentence level vector, or a paragraph level vector.

The computing apparatus may also include the processing circuitry to retrieve the set of candidate document vectors that are semantically similar to the search vector using a semantic ranking algorithm.

The computing apparatus may also include the processing circuitry to generate a semantic similarity score for each candidate document vector in the set of candidate document vectors based on their semantic similarity to the search vector using a machine learning model, rank the candidate document vectors in an ascending or descending order of similarity based on the semantic similarity scores, and select the subset of candidate document vectors from the ranked candidate document vectors.

The computing apparatus may also include the processing circuitry to receive the request by the generative AI model, generate the abstractive summary of document content for the subset of candidate document vectors in a natural language representation, and send a response with the abstractive summary from the generative AI model.

The computing apparatus may also include where the generative AI model is a natural language generation (NLG) model.

The computing apparatus may also include where the generative AI model is a natural language generation (NLG) model, the NLG model to comprise a large language model (LLM) to generate the natural language representation for the abstractive summary, the LLM to comprise a deep neural network trained using supervised learning, unsupervised learn, or a combination of supervised and unsupervised learning.

The computing apparatus may also include where the generative AI model is a natural language generation (NLG) model, the NLG model to comprise a large language model (LLM) to generate the natural language representation to for the abstractive summary, the LLM to comprise a deep neural network trained using a generative pre-trained transformer (GPT) language model.

The computing apparatus may also include where the generative AI model is a natural language generation (NLG) model, includes train the NLG model in a first stage with a generative pre-trained transformer (GPT) language model and unsupervised training data to reach a first language modeling objective to set initial parameters, and train the NLG model in a second stage with a discriminative language model with supervised training data to reach a second language modeling objective that adapts the set of initial parameters to a specific task.

The computing apparatus may also include the processing circuitry to select the subset of candidate document vectors from the set of candidate document vectors using a classifier.

The computing apparatus may also include the processing circuitry to receive the search vector as a first input to a classifier, receive a candidate document vector as a second input to the classifier, generate a label to indicate whether a combination of the search vector and the candidate document vector is suitable for inclusion in the subset of candidate document vectors as an output from the classifier, and add a candidate document vector to the subset of candidate document vectors based on the label.

The computing apparatus may also include the processing circuitry to present the abstractive summary on a graphical user interface (GUI) of an electronic display of an electronic device.

The computing apparatus may also include the processing circuitry to present document content of a candidate document vector on a graphical user interface (GUI) of an electronic display of an electronic device.

The computing apparatus may also include the processing circuitry to present a portion of the unsigned electronic document with document content of a candidate document vector on a graphical user interface (GUI) of an electronic display of an electronic device.

The computing apparatus may also include the processing circuitry to receive the search query as a natural language representation of a human language in spoken form, and convert the spoken form to text form using a speech-to-text (STT) translator.

The computing apparatus may also include the processing circuitry to reproduce the abstractive summary as synthesized speech over an electronic speaker.

Any of the computing apparatus examples given above may also be implemented as means plus function examples. Other technical features may be readily apparent to one skilled in the art from the following figures, descriptions, and claims.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:

receiving a selection signal from a graphical user interface (GUI) element of a GUI view, the selection signal to represent a request for a summary of an electronic document;

retrieving context information associated with the electronic document in response to the selection signal, the context information to comprise information representing a meaning or interpretation of document content within the electronic document;

generating a search query based on the context information, the search query expressed in a natural language representation to request a search for information within the electronic document;

generating a contextualized embedding for the search query to form a search vector;

retrieving a set of candidate document vectors that are semantically similar to the search vector from a document index of contextualized embeddings for the electronic document;

sending a request to a generative artificial intelligence (AI) model for an abstractive summary of document content for the set of candidate document vectors, the abstractive summary expressed in a natural language representation; and receiving a response with the abstractive summary from the generative AI model.

2. The method of claim 1, wherein the context information comprises at least one of the following: a metadata for the electronic document, a location information for the electronic document, an access history for the electronic document, usage statistics for the electronic document, one or more hyperlinks to one or more other electronic documents, a content summary, one or more labels or tags for the electronic document, a semantic context for the electronic document, one or more document types associated with the electronic document, one or more identification data associated with the electronic document, one or more user(s) information associated with the electronic document, and any combinations thereof.

3. The method of claim 1, wherein the selection signal is generated upon actuation of the GUI element.

4. The method of claim 3, further comprising receiving another selection signal from the GUI element or at least another GUI element of the GUI view;

in response to the receiving, forming one or more additional search queries based on at least one of: the context information associated with the electronic document, the abstractive summary of document content, and any combination thereof; and presenting, on the GUI view, the one or more additional search queries.

5. The method of claim 4, further comprising executing an additional search query in the one or more additional queries;

transmitting the additional search query to the one or more generative AI models for another abstractive summary of content in the electronic document responsive to the additional search query; and presenting, on the GUI view, the another abstractive summary of the content received from the one or more generative AI models.

6. The method of claim 1, further comprising receiving one or more additional search queries for information included within the electronic document, the one or more additional search queries being related to at least one of: the context information associated with the electronic document, the abstractive summary of document content, and any combination thereof; and transmitting the one or more additional search queries to the one or more generative AI models for another abstractive summary of document content in the electronic document responsive to the one or more additional search queries; and presenting, on the GUI view, the another abstractive summary of document content received from the one or more generative AI models.

7. The method of claim 1, wherein the abstractive summary of document content is generated based on at least one of the following: the context information associated with the electronic document, at least one external data source queried by the one or more generative AI models, and any combination thereof.

8. The method of claim 1, further comprising generating one or more table of contents associated with the electronic document based on at least one of the following: the context information associated with the electronic document, the abstractive summary of document content, and any combination thereof.

9. The method of claim 1, wherein the GUI view includes at least one of the following: one or more views of the electronic document, one or more views of text information associated with the electronic document, one or more views of graphical elements associated with one or more AI assistants, one or more views of one or more tables of contents associated with the electronic document, one or more views of common searches, one or more views of one or more defined search queries, one or more views of one or more document summaries associated with entireties of the electronic document, one or more views associated with one or more portions of the electronic document, one or more views of one or more feedback icons, one or more views of one or more search queries, one or more views of one or more text snippets associated with the electronic document and related to the abstractive summary of document content, and any combinations thereof.

10. The method of claim 1, wherein the contextualized embedding includes a vector representation of a sequence of words that includes contextual information for the sequence of words.

11. The method of claim 1, further comprising training a bidirectional encoder representation from transformers (BERT) language model composed of one or more transformer encoder layers using training data from the electronic document associated with one or more defined entities and having one or more electronic signatures.

12. The method of claim 1, further comprising generating the contextualized embeddings using one or more transformer architectures, the one or more transformer architectures including a bidirectional encoder representations from transformers (BERT) language model composed of one or more transformer encoder layers.

13. The method of claim 1, further comprising generating the contextualized embeddings using a bidirectional encoder representations from transformers (BERT) language model;

indexing the contextualized embeddings for the electronic document to form the document index; and storing the document index in at least one storage location.

14. The method of claim 1, wherein the contextualized embeddings include at least one of the following: one or more word level vectors, one or more sentence level vectors, one or more paragraph level vectors, and any combinations thereof.

15. The method of claim 1, further comprising retrieving the set of candidate document vectors that are semantically similar to the search vector using one or more semantic ranking algorithms.

16. The method of claim 11, wherein the electronic document includes at least one of the following: an unsigned electronic agreement with metadata including one or more signature tag marker element (STME) information suitable to receive one or more electronic signatures, a signed electronic document, and any combination thereof.

17. A system, comprising:

at least one processor; and at least one non-transitory storage media storing instructions, that when executed by the at least one processor, cause the at least one processor to retrieve context information associated with an electronic document in response to a selection signal representing a request for a summary of an electronic document, the context information to comprise information representing a meaning or interpretation of document content within the electronic document, the selection signal received from a graphical user interface (GUI) element of a GUI view;

generate a search query based on the context information, the search query expressed in a natural language representation to request a search for information within the electronic document;

generate a contextualized embedding for the search query to form a search vector;

retrieve a set of candidate document vectors that are semantically similar to the search vector from a document index of contextualized embeddings for the electronic document;

send a request to a generative artificial intelligence (AI) model for an abstractive summary of document content for the set of candidate document vectors, the abstractive summary expressed in a natural language representation; and receive a response with the abstractive summary from the generative AI model.

18. The system of claim 17, wherein the context information comprises at least one of the following: a metadata for the electronic document, a location information for the electronic document, an access history for the electronic document, usage statistics for the electronic document, one or more hyperlinks to one or more other electronic documents, a content summary, one or more labels or tags for the electronic document, a semantic context for the electronic document, one or more document types associated with the electronic document, one or more identification data associated with the electronic document, one or more user(s) information associated with the electronic document, and any combinations thereof.

19. The system of claim 17, wherein the at least one processor is configured to receive another selection signal from the GUI element or at least another GUI element of the GUI view;

in response to receiving the another selection, form one or more additional search queries based on at least one of: the context information associated with the electronic document, the abstractive summary of document content, and any combination thereof;

execute an additional search query in the one or more additional queries;

transmit the additional search query to the one or more generative AI models for another abstractive summary of content in the electronic document responsive to the additional search query; and present, on the GUI view, the another abstractive summary of the content received from the one or more generative AI models.

20. A computer program product comprising a non-transitory machine-readable medium storing instructions that, when executed by at least one programmable processor, cause the at least one programmable processor to:

generate a search query based on a context information, the search query expressed in a natural language representation to request a search for information within an electronic document, the context information being associated with an electronic document and includes information representing a meaning or interpretation of document content within the electronic document;

generate a contextualized embedding for the search query to form a search vector;

retrieve a set of candidate document vectors that are semantically similar to the search vector from a document index of contextualized embeddings for the electronic document;

send a request to a generative artificial intelligence (AI) model for an abstractive summary of document content for the set of candidate document vectors, the abstractive summary expressed in a natural language representation; and receive a response with the abstractive summary from the generative AI model.

* * * * *